US009043803B2

(12) United States Patent
Funaoka et al.

(10) Patent No.: US 9,043,803 B2
(45) Date of Patent: May 26, 2015

(54) CONVERTING DEPENDENCY RELATIONSHIP INFORMATION REPRESENTING TASK BORDER EDGES TO GENERATE A PARALLEL PROGRAM

(75) Inventors: Kenji Funaoka, Kanagawa (JP); Nobuaki Tojo, Tokyo (JP); Susumu Takeda, Kanagawa (JP); Akira Kuroda, Kanagawa (JP); Hidenori Matsuzaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 808 days.

(21) Appl. No.: 13/347,416

(22) Filed: Jan. 10, 2012

(65) Prior Publication Data

US 2012/0180067 A1    Jul. 12, 2012

(30) Foreign Application Priority Data

Jan. 12, 2011   (JP) ................................. 2011-004159

(51) Int. Cl.
*G06F 9/45*          (2006.01)
(52) U.S. Cl.
CPC ...................................... *G06F 8/456* (2013.01)
(58) Field of Classification Search
None
See application file for complete search history.

(56) References Cited

U.S. PATENT DOCUMENTS

2007/0038987 A1*  2/2007  Ohara et al. ................... 717/151
2009/0089560 A1*  4/2009  Liu et al. ........................ 712/226

OTHER PUBLICATIONS

G. Tournavitis et al., "Towards a Holistic Approach to Auto-Parallelization: Integrating Profile-Driven Parallelism Detection and Machine-Learning Based Mapping", PLDI 2009, pp. 177-187.

* cited by examiner

*Primary Examiner* — Eric C Wai
(74) *Attorney, Agent, or Firm* — Nixon & Vanderhye, P.C.

(57) ABSTRACT

According to an embodiment, based on task border information, and first-type dependency relationship information containing N number of nodes corresponding to data accesses to one set of data, containing edges representing dependency relationship between the nodes, and having at least one node with an access reliability flag indicating reliability/unreliability of corresponding data access; task border edges, of edges extending over task borders, are identified that have an unreliable access node linked to at least one end, and presentation information containing unreliable access nodes is generated. According to dependency existence information input corresponding to the set of data, conversion information indicating absence of data access to the unreliable access nodes is output. According to the conversion information, the first-type dependency relationship information is converted into second-type dependency relationship information containing M number of nodes (0≤M≤N) corresponding to data accesses to the set of data and containing edges representing inter-node dependency relationship.

8 Claims, 43 Drawing Sheets

3: label_1:

4: a=2;
5: s=*p;

6: label_2:

7: c=3;
8: *q=4;
9: c=5;

10: label_3:

```
task-border
  label_2
  label_3
```
~110

4:  label_1:

5:  a=2;
6:  s=*p;

7:  label_2:

8:  c=3;
9:  *q=4;
10: c=5;

11: label_3:

```
1:   task1{
2:     get_token(TOKID_1);
3:     c=3;
4:     *q=4;
5:     put_token(TOKID_2);
6:     c=5;
7:     put_token(TOKID_3);
8:   }
9:   task2{
10:    get_token(TOKID_2);
11:    t=a;
12:    u=b;
13:    get_token(TOKID_3);
14:    v=a+c;
15: }
16: task3{
17:    a=0;
18:    b=1;
19:    a=2;
20:    s=*p;

21: put_token(TOKID_1);
22: }
```
～111'

FIG.44

```
1:  Task1{
2:    if(...){
3:      p=&a;
4:      valid_node(VAR_ID_1, NODE_ID_2);
5:      valid_node(VAR_ID_1, NODE_ID_3);
6:      invalid_node(VAR_ID_2, NODE_ID_1);
7:      invalid_node(VAR_ID_2, NODE_ID_3);
8:    }else{
9:      p=&b;
10:     valid_node(VAR_ID_2, NODE_ID_1);
11:     valid_node(VAR_ID_2, NODE_ID_3);
12:     invalid_node(VAR_ID_1, NODE_ID_2);
13:     invalid_node(VAR_ID_1, NODE_ID_3);
14:   }
15:   a=2;
16:   post_sync(VAR_ID_1, NODE_ID_1);//a access
17:   c=*p;
18:   post_sync(VAR_ID_3, NODE_ID_1);//c access
19:   post_sync(VAR_ID_1, NODE_ID_2);//*p access
20:   post_sync(VAR_ID_2, NODE_ID_1);//*p access
21: }

22: Task2{
23:   wait_sync(VAR_ID_3, NODE_ID_2);
24:   c=3;
25:   wait_sync(VAR_ID_2, NODE_ID_2);
26:   b=4;
27:   post_sync(VAR_ID_2, NODE_ID_2);
28:   c=5;
29: }

30: Task3{
31:   wait_sync(VAR_ID_1, NODE_ID_3);
32:   wait_sync(VAR_ID_2, NODE_ID_3);
33:   *p=t;
34:   u=v+3;
35:   v=s+5;
36: }
```

116"

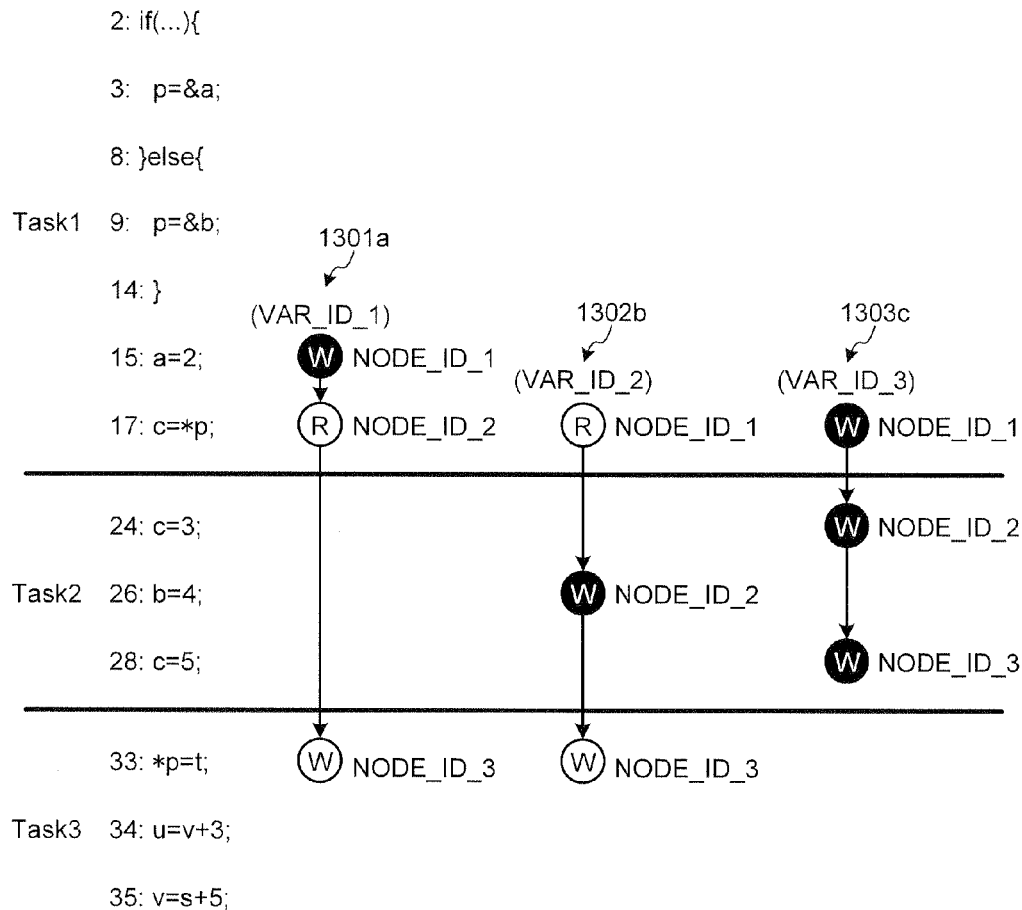

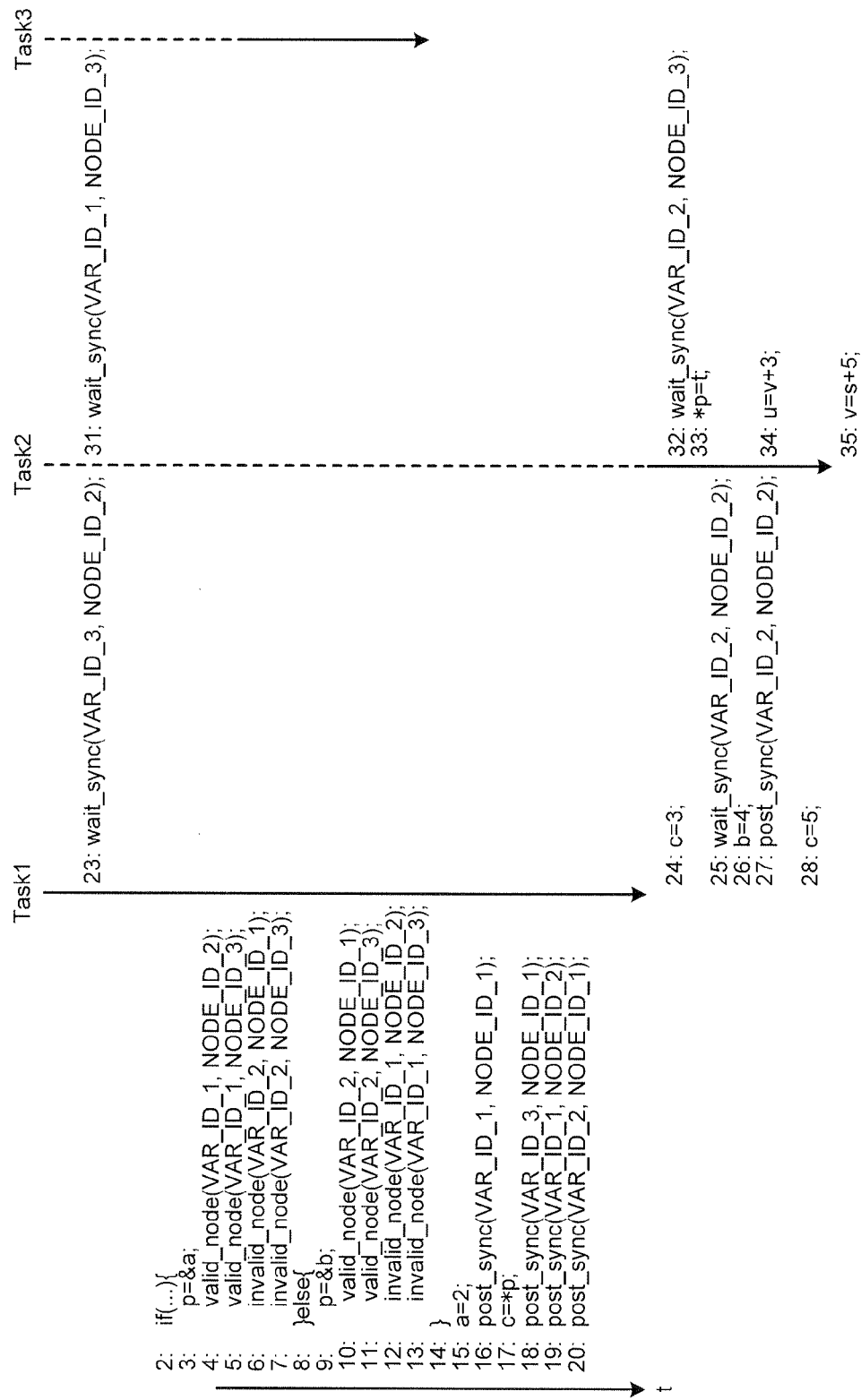

FIG.50

```
        2: if(...){
        3:   p=&a;
        8: }else{
Task1   9:   p=&b;            1301a-3
        14: }                     ↓
                             (VAR_ID_1)      1302b-1         1303c-1
        15: a=2;              Ⓦ NODE_ID_1       ↓               ↓
                                             (VAR_ID_2)      (VAR_ID_3)
        17: c=*p;             Ⓡ NODE_ID_2                    Ⓦ NODE_ID_1
        ─────────────────────────────────────────────────────────────────
        24: c=3;                                              Ⓦ NODE_ID_2
Task2   26: b=4;                              Ⓦ NODE_ID_2         │
                                                                  ↓
        28: c=5;                                              Ⓦ NODE_ID_3
        ─────────────────────────────────────────────────────────────────
        33: *p=t;             Ⓦ NODE_ID_3
Task3   34: u=v+3;
        35: v=s+5;
```

FIG.57

|  | 1602' |
|---|---|
| MONITORING POSITION | valid_node |
| 3: p=&a | VAR_ID_1, NODE_ID_2<br>VAR_ID_1, NODE_ID_3 |
| 9: p=&b | VAR_ID_2, NODE_ID_1<br>VAR_ID_2, NODE_ID_3 |

FIG.58

Task1
```
1:  if(...){
2:     p=&a;
3:     valid_node(VAR_ID_1, NODE_ID_2);
4:     valid_node(VAR_ID_1, NODE_ID_3);
5:  }else{
6:     p=&b;
7:     valid_node(VAR_ID_2, NODE_ID_1);
8:     valid_node(VAR_ID_2, NODE_ID_3);
9:  }
10: a=2;
11: c=*p;
```
1800

Task2
```
12: c=3;
13: b=4;
14: c=5;
```
1810

Task3
```
15: *p=t;
16: u=v+3;
17: v=s+5;
```

CONVERTING DEPENDENCY RELATIONSHIP INFORMATION REPRESENTING TASK BORDER EDGES TO GENERATE A PARALLEL PROGRAM

CROSS-REFERENCE TO RELATED APPLICATION(S)

This application is based upon and claims the benefit of priority from Japanese Patent Application No. 2011-004159, filed on Jan. 12, 2011; the entire contents of which are incorporated herein by reference.

FIELD

Embodiments described herein relate generally to an information processing apparatus and a computer program product.

BACKGROUND

A technology is known in which a computer program written for a sequential computing device is parallelized in such a way that it can be processed in parallel by a plurality of cores or processors. While performing parallelization of such a computer program, it is common to parallelize the loops accounting for the majority of the computation time in the computer program. While parallelizing a program containing loops; if it is not clear whether there is dependency between iterations of a loop, a technology is already known that enables performing parallelization when the developer determines that there exists no dependency between the iterations of the loop.

However, in the conventional technology, parallelization of a computer program having data dependency between iterations of a loop is a difficult task. On the other hand, it can also be an option to perform parallelization while ignoring the dependency between iterations. However, in that case, the developer has to insert synchronizations manually by taking into account the dependency relations of all of the data. That puts a lot of burden on the developer. Besides, the method in which the developer determines whether or not to perform parallelization is not practical unless the instructions for parallelization issued by the developer are confined to a loop-by-loop basis. In that regard, there has been a demand for a method or an apparatus that would generate a sophisticated parallel program at a low cost.

BRIEF DESCRIPTION OF THE DRAWINGS

FIG. 3 is a diagram illustrating a program code that is used in the explanation of the first embodiment;

FIG. 4 is a diagram illustrating task border information according to the first embodiment;

FIG. 25 is a diagram illustrating a computer program that is used in the explanation of the first embodiment;

FIG. 32 is a diagram illustrating a program code that is used in the explanation of the second embodiment;

FIG. 44 is a diagram illustrating a parallel program according to the third embodiment;

FIG. 45 is a diagram in which an identifier is associated to each dependency graph and to each node specified according to the third embodiment;

FIG. 46 is a diagram illustrating relationship information according to the third embodiment;

FIG. 47 is a diagram illustrating an execution image of the program code according to the third embodiment;

FIG. 50 is a diagram illustrating the second-type dependency relationship information that has been changed according to the third embodiment;

FIG. 57 is a diagram illustrating relationship information according to the fourth embodiment;

FIG. 58 is a diagram illustrating an example of a profile program according to the fourth embodiment;

DETAILED DESCRIPTION

According to an embodiment, an information processing apparatus includes an input unit, a generating unit, an instructing unit, and a converting unit. The input unit is configured to receive task border information about task borders of a plurality of tasks and receive first-type dependency relationship information that contains N number of nodes (N is an integer equal to or greater than 1) corresponding to data accesses to a single set of data and that contains edges representing a first-type dependency relationship expressing restrictions on an order of data accesses between the nodes. At least one of the nodes has an access reliability flag that indicates whether corresponding data access is reliable or unreliable. The generating unit is configured to, based on the first-type dependency relationship information, identify task border edges, out of edges extending over the task borders, which have an unreliable access node with unreliable data access linked to at least one end thereof, and configured to generate presentation information containing at least one of the unreliable access nodes that are linked to the task border edges. The instructing unit is configured to receive dependency existence information, which indicates existence of a dependency relationship among the data accesses corresponding to the single set of data, and configured to, according to the dependency existence information, output, to the unreliable access node, conversion information that contains information indicating absence of data access to the unreliable access node. The converting unit is configured to, according to the conversion information, convert the first-type dependency relationship information into second-type dependency relationship information that contains M number of nodes ($0 \leq M \leq N$) corresponding to the data accesses to the single set of data and contains edges representing a second dependency relationship between the nodes.

Various embodiments will be described hereinafter with reference to the accompanying drawings.

First Embodiment

Figure 1:
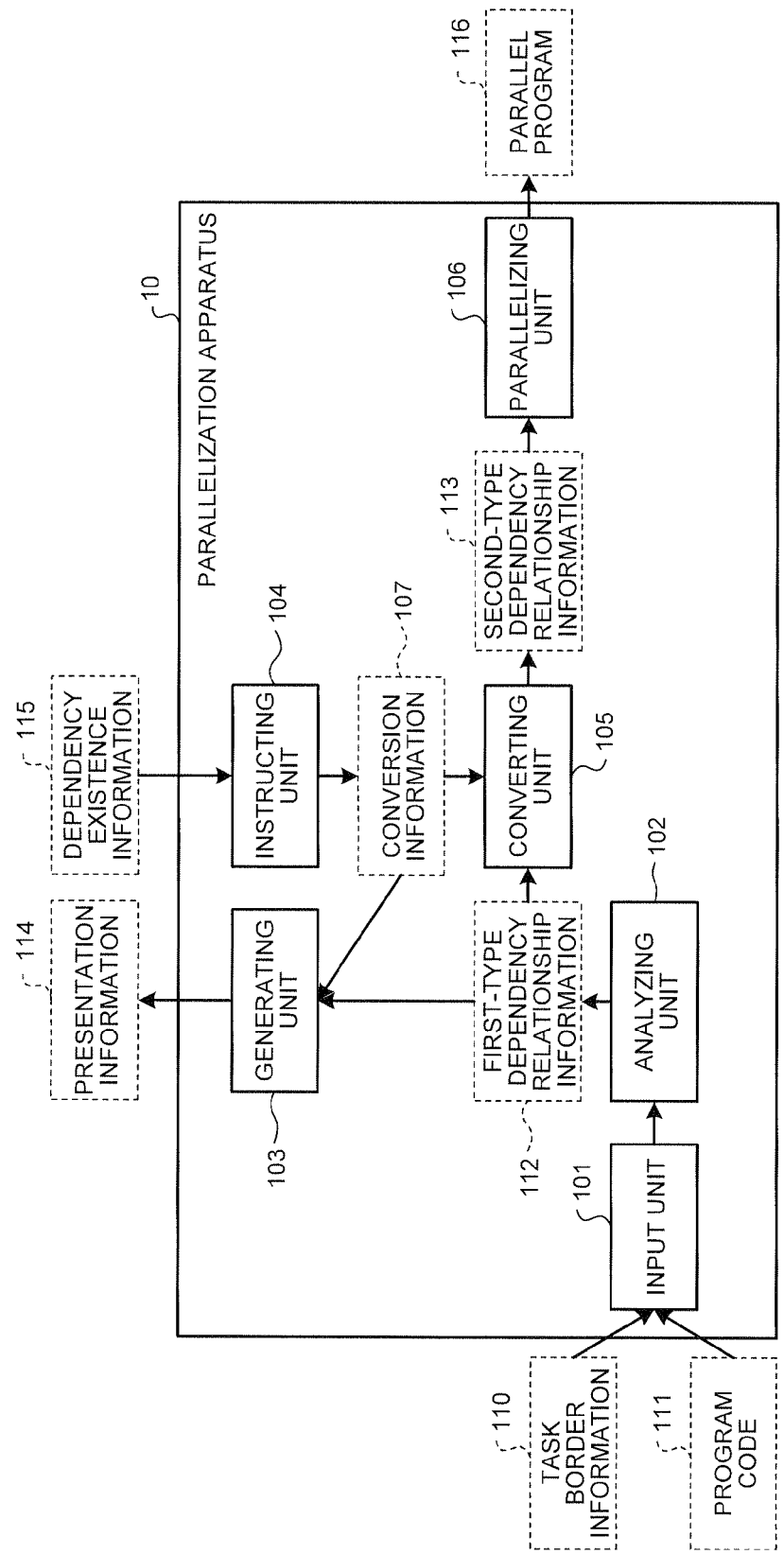
FIG. 1 is a functional block diagram of a parallelization apparatus according to a first embodiment.

FIG. 1 is an exemplary functional block diagram for explaining the functions of a parallelization apparatus 10 functioning as an information processing apparatus according to a first embodiment. The parallelization apparatus 10 parallelizes a program code input thereto and generates a parallel program as the output. The parallelization apparatus 10 includes an input unit 101, an analyzing unit 102, a generating unit 103, an instructing unit 104, a converting unit 105, and a parallelizing unit 106.

Figure 2:
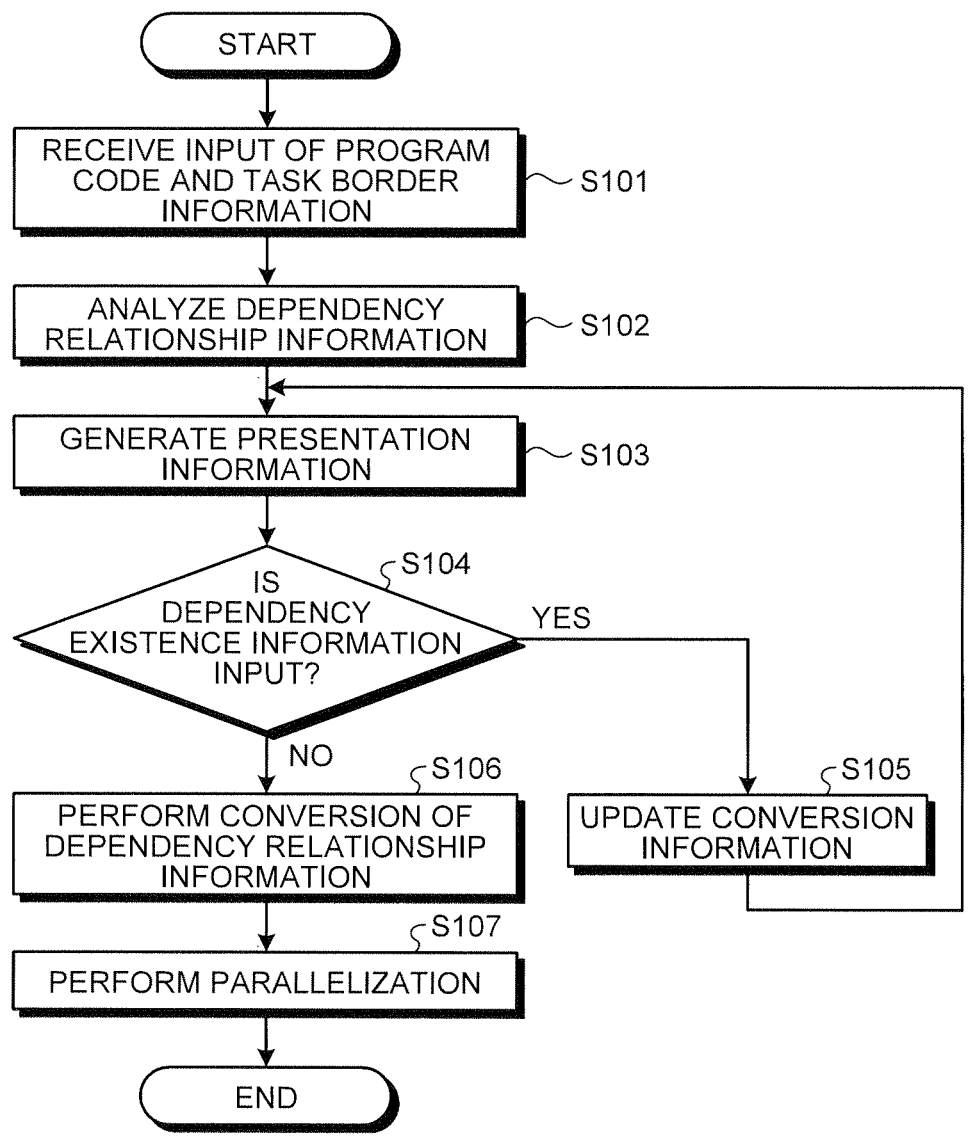
FIG. 2 is a flowchart for explaining a program parallelization operation according to the first embodiment.

FIG. 2 is a flowchart for schematically illustrating an example of a program parallelization operation according to the first embodiment. Firstly, to the input unit 101, a program code 111 that is to be parallelized and task border information 110 that indicates task borders in a computer program corresponding to the program code 111 are input (S101). The analyzing unit 102 analyzes the program code 111 that has been input and obtains dependency relationship information related to data accesses (S102). The dependency relationship information output by the analyzing unit 102 is hereinafter referred to as first-type dependency relationship information 112.

Subsequently, based on the task border information 110 and based on the first-type dependency relationship information 112 analyzed by the analyzing unit 102, the generating unit 103 generates presentation information 114 for the purpose of presentation (S103). The instructing unit 104 determines whether dependency existence information 115 has been input (S104); and, when the dependency existence information 115 is determined to have been input, the system control moves to S105. The instructing unit 104 refers to the dependency existence information 115 and generates or updates conversion information 107 (S105), and the system control returns to S103. The generating unit 103 reflects, in the presentation information 114, the conversion information 107 that has been updated based on the dependency existence information 115.

On the other hand, when it is determined that the input of the dependency existence information 115 has completed and that there is no input of the dependency existence information 115 at Step S104, the system control moves to S106. The converting unit 105 refers to the conversion information 107 that is generated or updated by the instructing unit 104, and converts the first-type dependency relationship information 112 that is analyzed by the analyzing unit 102 into second-type dependency relationship information 113 (S106). Subsequently, the parallelizing unit 106 refers to the second-type dependency relationship information 113 that is obtained by conversion by the converting unit 105, and generates a parallel program 116 having synchronizations inserted therein (S107).

In the following description, the explanation of each functional block of the parallelization apparatus 10 is given for the most basic configuration in which the functional blocks are tandemly connected in the sequence illustrated in FIG. 1. However, the first embodiment is not limited to that case. Alternatively, for example, the first embodiment can be implemented for a configuration in which a plurality of functional blocks operate in a coordinated manner; or can be implemented for a configuration in which the sequence of some functional blocks is interchanged; or can be implemented for a configuration in which a particular functional block is divided into a plurality of functional blocks; or can be implemented for a configuration having a combination of the abovementioned three configurations. Besides, the first embodiment can also be implemented by dividing the functional blocks into a plurality of units.

Explained below in detail are the operations performed by various constituent elements of the parallelization apparatus 10. The input unit 101 receives the program code 111 and the task border information 110 into the parallelization apparatus 10. FIG. 3 illustrates an example of the program code 111 and FIG. 4 illustrates an example of the task border information 110.

The program code 111 illustrated in FIG. 3 is written in a pseudo-language imitating C language, which is a commonly used programming language. In the program code 111, a digit and a colon ":" written at the start of each line represent a line number that is assigned to enable identification of that line during the explanation. In the example illustrated in FIG. 3, the program code 111 has data access expressions "a", "b", "c", "s", "t", "u", "v", "p", "q", "*p", and "*q"; has the assignment operator "="; and has the addition operator "+". The data access expressions are broadly divided into direct access expressions and indirect access expressions. In the following example, each indirect access expression has an asterisk "*" attached thereto. Thus, the indirect access expressions can be distinguished from the direct access expressions.

Herein, the direct access expressions represent those data access expressions which do not make use of dynamic data for determining the position of data to be accessed. For example, with the direct access expression "a", data "a" is accessed without the use of dynamic data. In contrast, the indirect access expressions represent those data access expressions which make use of dynamic data for determining the position of data to be accessed. For example, with the indirect access expression "*p" written in the fifth line, such data is accessed that is present at the position indicated by dynamic data "p". Herein, the data present at the position indicated by dynamic data "p" means, for example, that the memory address of that particular data is held by the dynamic data "p".

With a direct access expression, the data to be accessed is certainly identifiable. In contrast, with an indirect access expression, there are times when the data to be accessed is not identifiable. Hence, the data accessed with the indirect access expression "*p" is sometimes abstractly expressed as data "*p".

Figure 5:
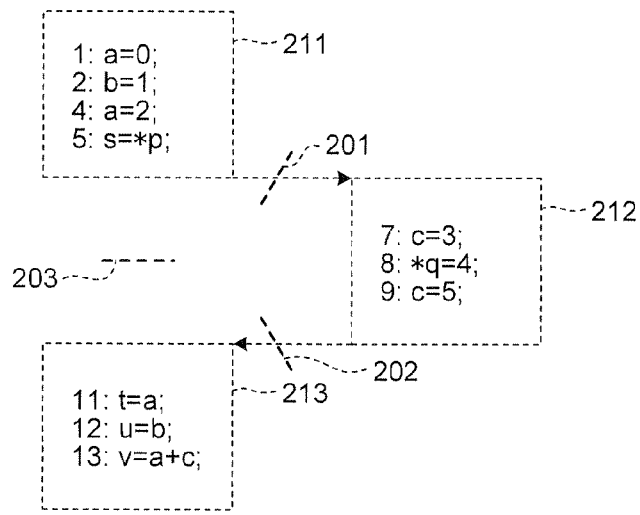
FIG. 5 is a diagram illustrating an example of a task division result according to the first embodiment.

The task border information 110 illustrated in FIG. 4 indicates that labels "label_2" and "label_3", which are respectively written in the sixth and tenth lines in the program code 111 illustrated in FIG. 3, represent task borders. FIG. 5 schematically illustrates an example when the program code 111, illustrated in FIG. 3, is divided into tasks using the task border information 110 illustrated in FIG. 4. In this example, according to the task border information 110, the operations of the program code 111 are divided into a task 211, a task 212, and a task 213. Meanwhile, a task represents a unit of operations executed by a central processing unit (CPU), and includes one or more operations. Moreover, a task border represents information that indicates a border for dividing an operation, such as data accesses expressed by the program code, into tasks.

In the program code 111 illustrated in FIG. 3; the operations are performed in the order of the task 211, the task 212, and the task 213. For convenience of diagrammatic illustration and explanation, the following explanation is given under the assumption that a task border is present at the border between any two different tasks. In the example illustrated in FIG. 5, a task border 201 is present as the border between the task 211 and the task 212; a task border 202 is present as the border between the task 212 and the task 213; and a task border 203 is present as the border between the task 211 and the task 213. Meanwhile, in the task border information 110 in FIG. 4, the information corresponding to the task border 203 is not included. Thus, it is not necessary to include information corresponding to all task borders in the task border information, and it is also possible that a task border is present in an implicit manner.

Herein, the task border information 110 is input, for example, by the user (the developer) from a user interface (UI). However, alternatively, based on an analysis result obtained by analyzing the program code 111, the task border information 110 can be generated automatically for the input purpose.

Figure 6:
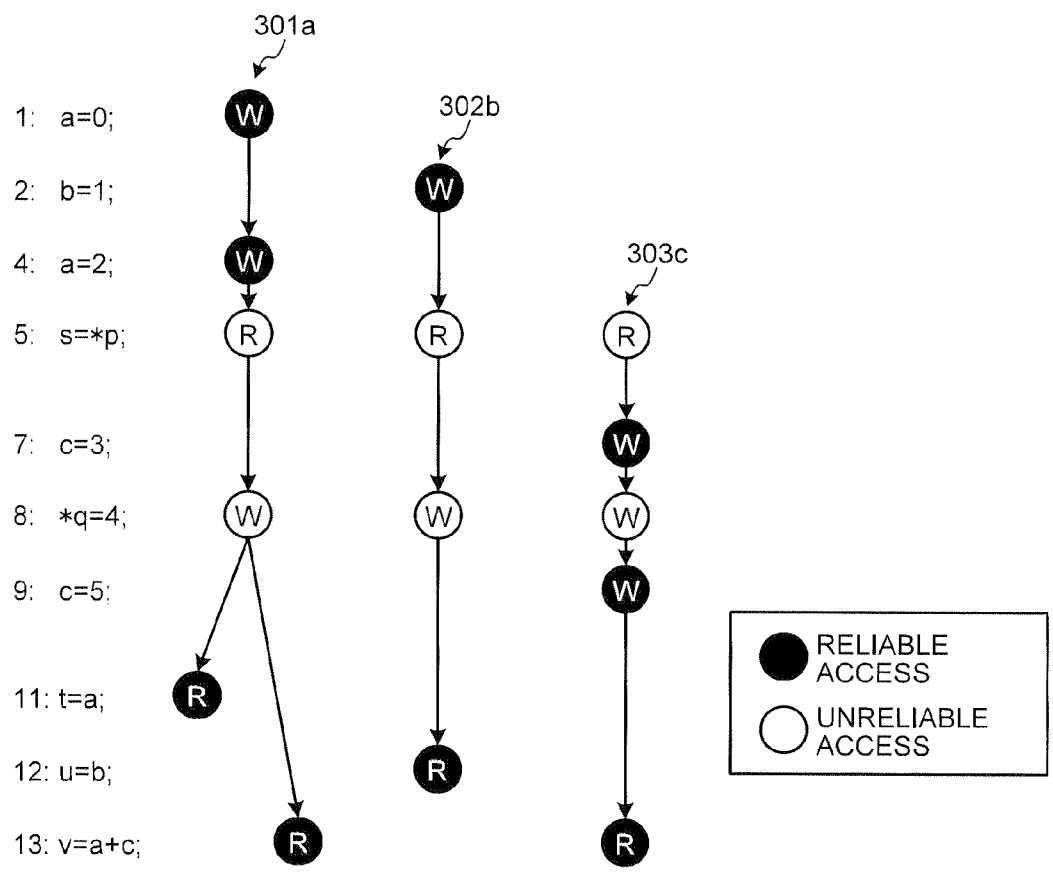
FIG. 6 is a diagram illustrating dependency relationship information obtained by analyzing the program code according to the first embodiment.

The analyzing unit 102 analyzes the program code 111 and outputs dependency relationship information. FIG. 6 illustrates an example of the dependency relationship information obtained by analyzing the program code 111 illustrated in FIG. 3. Herein, as described above, the dependency relationship information output by the analyzing unit 102 is referred to as the first-type dependency relationship information 112.

With respect to each set of data written in the program code 111; the analyzing unit 102 considers, as nodes, the data access expressions which are likely to access that set of data, and generates a dependency graph that expresses, with edges between the nodes, the order that needs to be followed in order to obtain a correct execution result. Herein, as long as it is not analyzed that any particular data will not be accessed, it is analyzed that the particular data is likely to be accessed.

A node represents information corresponding to the data accesses to a single set of data and having an access reliability flag that indicates whether the particular data access is reliable or unreliable. For a single set of data, N number of nodes (where N is an integer equal to or greater than 1) is present. An edge represents information expressing restrictions on the order of data access that needs to be followed in order to obtain a correct execution result.

In FIG. 6, the data "a", data "b", and data "c" in the program code 111 are respectively illustrated by a dependency graph 301a, a dependency graph 302b, and a dependency graph 303c. For convenience of explanation, it is assumed that the dependency relationships between the other data do not become dependency relationships between tasks. In FIG. 6 and in similar diagrams referred to hereinafter, if a node has the alphabet "W" written therein, that node indicates a write access; and a node has the alphabet "R" written therein, that node indicates a read access.

In FIG. 6, as edges are illustrated a true dependence representing reading after writing; an anti-dependence representing writing after reading; and an output dependence representing writing after writing. For example, "a=0" written in the first line and "a=2" written in the fourth line indicate that values "0" and "2" are respectively substituted in the data "a". In the dependency graph 301a, the output dependence representing writing after writing is illustrated as an edge that links the node corresponding to "a=0" with the node corresponding to "a=2".

The analyzing unit 102 analyzes the data accessed by each node of a dependency graph and accordingly sets the access reliability flag to each node. The access reliability flag is set to have either a value indicating "reliable" or a value indicating "unreliable". A node that is assigned with the value indicating "reliable" in the access reliability flag is referred to as a reliable access node, and a node that is assigned with the value indicating "unreliable" in the access reliability flag is referred to as an unreliable access node. In FIG. 6 and in similar diagrams referred to hereinafter, the reliable access nodes are illustrated with a "• (filled circle)" and the unreliable access nodes are illustrated with a "○ (open circle)". Moreover, in the following explanation, when a value indicating "reliable" or "unreliable" is set in an access reliability flag, it is described as "setting of a value of an access reliability flag to "reliable" (or "unreliable")".

When it can be regarded that, with respect to the at least one external input value of the program code 111 being analyzed, a node accesses the data corresponding to the external input value; and the analyzing unit 102 sets the node to have "reliable" as the value of the access reliability flag; while, on the other hand, when it cannot be regarded that a node accesses the data, the analyzing unit 102 sets the node to have "unreliable" as the value of the access reliability flag. Herein, an external input points to data for which the values are input from the outside of the program code 111; and an external input value points to the value of the data that is input by means of the external input. In the example of the program code 111 illustrated in FIG. 3, the data "p" and data "q" written in the fifth and eighth line, respectively, are input by means of the external input.

In a direct access expression, since the data to be accessed is identifiable irrespective of the external input values, the access reliability flag is set to the value "reliable". In contrast, in an indirect access expression, the value of the access reliability flag is set according to the analysis result of the dynamic data that is used in deciding the access destination.

In the example illustrated in FIG. 6, regarding the access reliability flag of the nodes corresponding to indirect access expressions; it cannot be determined whether the dynamic data "p" and the data "q", which are used in deciding the access destinations, take arbitrary values or take limited values. Hence, in each of the data "a", the data "b", and the data "c"; the node corresponding to the data access expression "*p" as well as the node corresponding to a data access expression "*q" is generated as an unreliable access node.

Meanwhile, in a case when the dynamic data used in deciding the access destination of an indirect access expression could be analyzed, it is possible either to generate the node corresponding to that indirect access expression as a reliable access node or not to generate that node. Since a dependency graph is constructed for each set of data; there is a possibility that, with respect to a single indirect access expression, the type or the existence criterion is different for the node corresponding to each set of data.

In response to an instruction issued by the user in an interactive manner using the generating unit 103 and the instructing unit 104; the parallelization apparatus 10 generates the conversion information 107, which is put to use by the converting unit 105. Herein, the user points either to a person using the parallelization apparatus 10 or to another apparatus. For example, the user can be the developer of the parallel program or can be a dependency existence determining apparatus that automatically determines existence of dependency in the data accesses of data.

Figure 7:
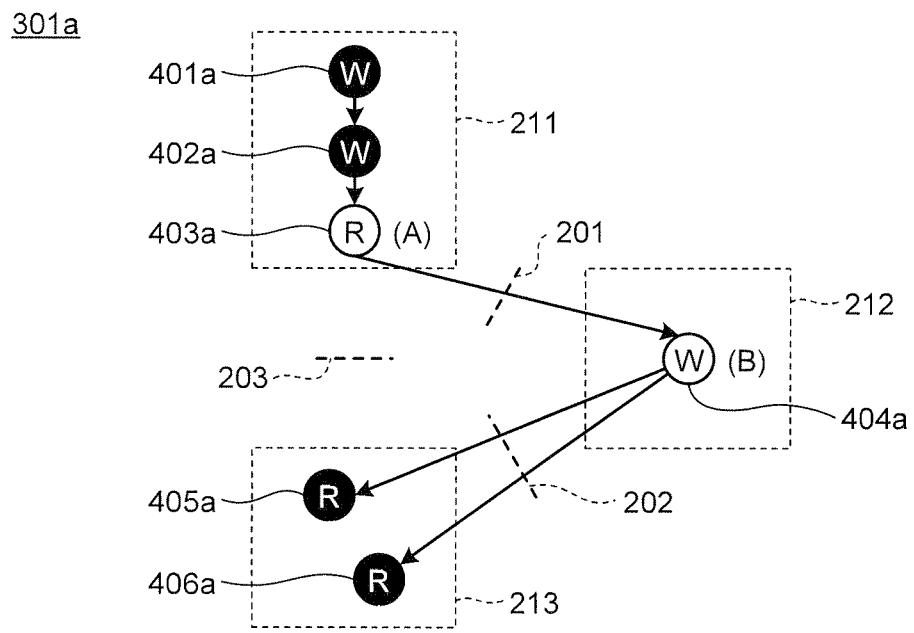
FIG. 7 is a diagram illustrating first-type dependency relationship information according to the first embodiment.
Figure 8:
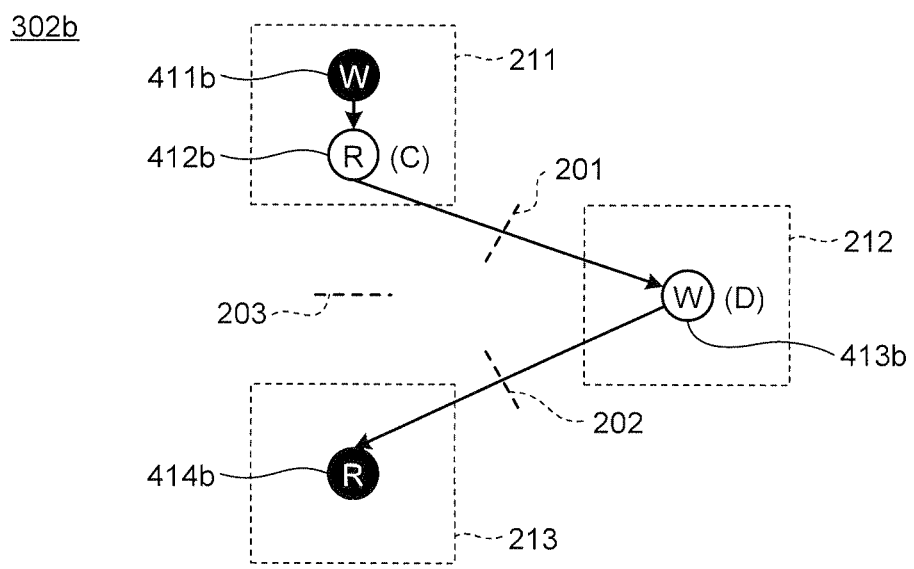
FIG. 8 is a diagram illustrating the first-type dependency relationship information according to the first embodiment.
Figure 9:
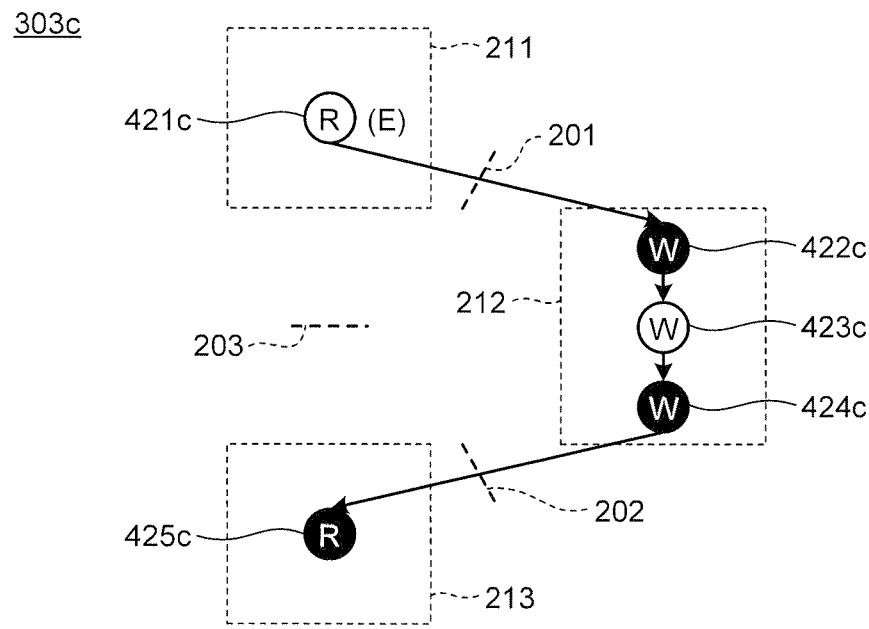
FIG. 9 is a diagram illustrating the first-type dependency relationship information according to the first embodiment.

The generating unit 103 generates the presentation information 114 by referring to the first-type dependency relationship information 112 generated by the analyzing unit 102 and by referring to the task border information 110 input from the input unit 101. FIGS. 7 to 9 illustrate examples in which the first-type dependency relationship information 112 and the task border information 110 is combined regarding the data "a", the data "b", and the data "c", respectively. Thus, in FIGS. 7 to 9; the task border information 110 is added while expressing the dependency graphs 301a, 302b, and 302c that are illustrated in FIG. 6 corresponding to the data "a", the data "b", and the data "c", respectively.

In the example illustrated in FIG. 7, regarding the dependency graph 301a related to the data "a"; nodes 401a, 402a, 403a, 404a, 405a, and 406a respectively represent the data access expression "a" of "a=0" written in the first line in the program code 111, the data access expression "a" of "a=2" written in the fourth line in the program code 111, the data access expression "*p" of "s=*p" written in the fifth line in the program code 111, the data access expression "*q" of "*q=4" written in the eighth line in the program code 111, the data access expression "a" of "t=a" written in the 11-th line in the program code 111, and the data access expression "a" of "v=a+c" written in the 13-th line in the program code 111.

In an identical manner, in the example illustrated in FIG. 8, regarding the dependency graph 302b related to the data "b"; nodes 411b, 412b, 413b, and 414b respectively represent the data access expression "b" of "b=1" written in the second line in the program code 111, the data access expression "*p" of "s=*p" written in the fifth line in the program code 111, the data access expression "*q" of "*q=4" written in the eighth line in the program code 111, and the data access expression "b" of "u=b" written in the 12-th line in the program code 111.

Moreover, in the example illustrated in FIG. 9, regarding the dependency graph 302c related to the data "c"; nodes 421c, 422c, 423c, 424c, and 425c respectively represent the data access expression "*p" of "s=*p" written in the fifth line in the program code 111, the data access expression "c" of "c=3" written in the seventh line in the program code 111, the data access expression "*q" of "*q=4" written in the eighth line in the program code 111, the data access expression "c" of "c=5" written in the ninth line in the program code 111, and the data access expression "c" of "v=a+c" written in the 13-th line in the program code 111.

The generating unit 103 does not convert all of the first-type dependency relationship information 112 into the presentation information 114, but limits the first-type dependency relationship information 112 that is to be converted into the presentation information 114. That enables the user to easily or speedily conclude the task of issuing instructions for generating the conversion information 107.

Explained below is a method for limiting the first-type dependency relationship information 112 that is to be converted into the presentation information 114. Hereinafter, an edge extending over a task border is referred to as a task border edge; a node linked to a task border edge is referred to as a task border node; and an edge having at least one unreliable access node linked thereto is referred to as an unreliable edge. Besides, an edge that is not only a task border edge but also an unreliable edge is referred to as an unreliable task-border edge.

In order to enable the user to easily or speedily conclude the task of issuing instructions, the generating unit 103 generates such presentation information 114 that is related to at least one unreliable access node linked to at least one unreliable task-border edge. Thus, if the user goes on sequentially issuing instructions regarding at least one unreliable access node linked to at least one unreliable task-border edge, it becomes possible to eliminate the unreliable task-border edges with the least number of user instructions.

On the other hand, as far as an unreliable access node not linked to an unreliable task-border edge is concerned, a corresponding instruction may go to waste depending on the result of an instruction issued regarding a node lying closer to the task border than that particular unreliable access node.

Explained below is an example in which the generating unit 103 generates presentation information related to the dependency graph 301a. In the dependency graph 301a illustrated in FIG. 7, the nodes 403a and 404a are present as unreliable access nodes. Besides, as a task-border edge that extends over a task border and that is linked to at least one of the nodes 403a and 404a; there exist three unreliable task-border edges, namely, a single unreliable task-border edge that intersects the task border 201 and two unreliable task-border edges that intersect the task border 202.

Figure 10:
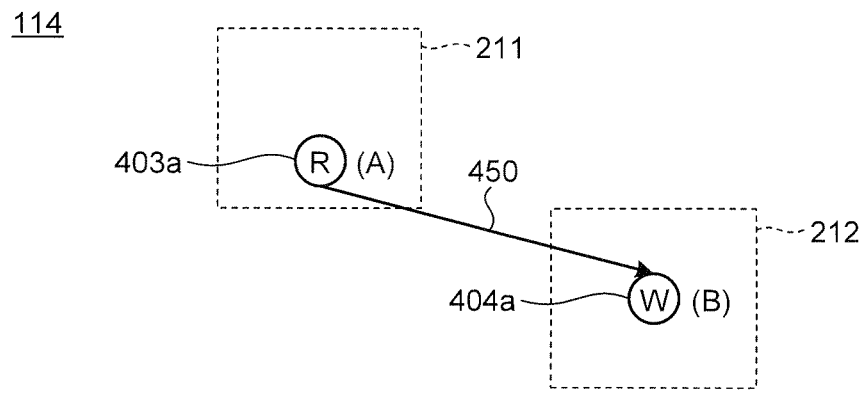
FIG. 10 is a diagram illustrating presentation information that represents information related to task border nodes according to the first embodiment.

FIG. 10 illustrates an example of the presentation information 114 that represents the information related to task border nodes of the unreliable task-border edge extending over the task border 201. In the example illustrated in FIG. 10, the presentation information 114 shows the nodes 403a and 404a that are unreliable access nodes, and an unreliable task-border edge 450 that is linked to the nodes 403a and 404a.

Meanwhile, the presentation information 114 is, for example, display information generated from a rendering application programming interface (API) of an operating system (OS) while the parallelization apparatus 10 is running as a computer program. For example, the presentation information 114 is transmitted to the user in the form of image information that is displayed on a display. Alternatively, the presentation information 114 can also be transmitted in the form of data in a file or in a memory.

As described above, it is only necessary to generate the presentation information 114 related to at least one unreliable access node that is linked to an unreliable task-border edge. Hence, as illustrated in the example in FIG. 10, the node 403a and the node 404a that are positioned on either side of the unreliable task-border edge 450 are not presented. Rather, for example, the presentation information 114 can be generated related only to the node 403a while excluding the node 404a.

Even regarding the nodes that are not directly linked to an unreliable task-border edge, the generating unit 103 can be configured to recognize the nodes that may get involved with task-border edges and the nodes that will not get involved with task-border edges, and to accordingly provide different methods of generating the presentation information.

For example, the node 401a illustrated in FIG. 7 or the node 423c illustrated in FIG. 9 is not linked to any task border edge and does not get involved in any task border edge. For that reason, the method of presentation can be so changed that the node 401a or the node 423c is excluded from the presentation information 114, or the node 401a or the node 423c is displayed in a different display color than the display color of the other nodes. In this way, if the method of presentation for the nodes not involved with a task border edge is set to be different than the method of presentation for the nodes that are likely to get involved with a task boarder edge, it becomes possible to generate such presentation information 114 that is helpful to the user in issuing instructions.

Explained below is an exemplary method that enables the generating unit 103 to detect nodes that do not get linked to task boundary edges. The generating unit 103 identifies all reliable write nodes, which point to the reliable access nodes performing the write operation. In the example illustrated in FIG. 7, the nodes 401a and 402a are reliable write nodes.

When there exists at least a single node identified as a reliable write node in at least a single path from a node N, which is included in a task $T_1$, into another task $T_2$; it is determined that the node N would not get linked to the task border edge between the task $T_1$ and the task $T_2$.

For example, in the example illustrated in FIG. 7, in a path that reaches the task 212 from the node 401a via the nodes 402a and 403a, there exists the node 402a identified as a reliable write node. Hence, the node 401a is not linked to the task border edge of the task border 201. In an identical manner, it can be determined that the node 401a is not linked to any of the task borders included in the dependency graph 301a illustrated in FIG. 7. Similarly, it can also be determined that the node 423c illustrated in FIG. 9 is not linked to any of the task borders included in the dependency graph 303c.

Herein, a path can be followed only via the edges having the same orientation. In the example illustrated in FIG. 9, while reaching the node 421c from the node 425c via the nodes 424c, 423c, and 422c; the node 421c can be reached via only those edges which have the same orientation. Hence, that case confirms with the abovementioned explanation of a path. In contrast, while reaching the node 404a from the node 403a via the node 402a illustrated in FIG. 7; the node 402a needs to be reached from the node 403a and the node 404a needs to be reached from the node 402a via the node 403a. In this case, the edge heading from the node 403a toward the node 402a and the edge heading from the node 402a toward the node 404a via the node 403a have different orientations. Hence, that case does not confirm with the above-mentioned explanation of a path.

Regarding a method for the generating unit 103 to detect a node that does not get linked to a task border edge as described above, the following method can be considered if the attention is paid to two threads and a task border therebetween. That is, in this method, firstly, with respect to one task direction adjacent to a task border edge, a reliable write node having the least task border distance is identified. It is determined whether or not at least a single reliable write node that has been identified is present on at least one of the paths leading to task border edges from each node included in the first-type dependency relationship information 112 (dependency graph). If no reliable write node that has been identified is determined to be present, it is determined that there is a possibility of a link between the identified node and a task border edge. On the other hand, if a reliable write node that has been identified is determined to be present, it is determined that the identified node does not get linked to a task border edge.

Herein, the task border distance, which is the distance from a single node or from a single edge up to a single task border, is defined as the least number of nodes that are passed while reaching the task border from the single node or from the single edge. With respect to a single node, the task border distance is defined to be equal to the number of task borders. For example, in the example illustrated in FIG. 9, from the node 422c up to the task border 201, the task border distance is "0"; while from the node 422c up to the task border 202, the task border distance is "2".

The instructing unit 104 receives the dependency existence information 115 and generates the conversion information 107. Herein, the dependency existence information 115 represents the information regarding the existence of nodes or edges that are elements of dependency graphs. The conversion information 107 represents the information illustrating a method for the converting unit 105 to convert the first-type dependency relationship information 112 into the second-type dependency relationship information 113.

Figure 11:
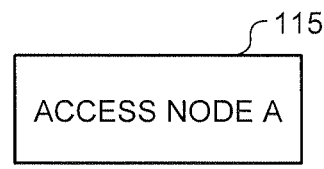
FIG. 11 is a diagram illustrating dependency existence information according to the first embodiment.

FIG. 11 illustrates an example of the dependency existence information. In a dependency graph related to a particular set of data, the dependency existence information 115 represents the information regarding the existence of an access from an unreliable access node (assumed to be node A) to that particular data. More particularly, "access node A" illustrated as the dependency existence information 115 in FIG. 11 refers to FIG. 10 and indicates that the data "a" corresponding to the dependency graph 301a is accessed by the node A, that is, accessed by the node 403a that is an element of the dependency graph 301a.

Figure 12:
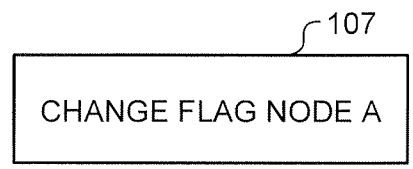
FIG. 12 is a diagram illustrating conversion information generated from the dependency existence information according to the first embodiment.

From the dependency existence information 115, the instructing unit 104 generates the conversion information 107 so as to enable reversal of values of the access reliability flags of the nodes that are included in the dependency existence information 115. FIG. 12 illustrates an example of the conversion information 107 generated from the dependency existence information 115 illustrated in FIG. 11. In the example illustrated in FIG. 12, from the dependency existence information 115 illustrated in FIG. 11, "change flag node A" is generated as the conversion information 107 that enables reversal of value of the access reliability flag of the node A (the node 403a). For example, depending on the information related to the task border nodes of the unreliable task-border edge extending over the task border 201, the user operates the UI of the instructing unit 104 and selects a node for which the value of the access reliability flag is to be reversed.

In the examples illustrated in FIGS. 11 and 12, the dependency existence information 115 and the conversion information 107 is illustrated to be having different formats. However, alternatively, it is also possible to have the same format for the dependency existence information 115 and the conversion information 107.

Figure 13:
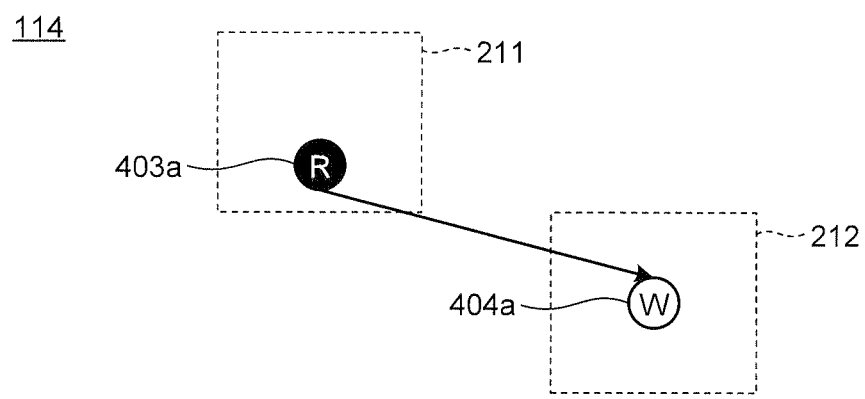
FIG. 13 is a diagram illustrating presentation information that is updated by reflecting the conversion information according to the first embodiment.

Until the generating unit 103 and the instructing unit 104 finish inputting the dependency existence information 115 to the instructing unit 104, the user keeps on communicating with the parallelization apparatus 10. Thus, the conversion information 107 generated by the instructing unit 104 is input to the generating unit 103. By reflecting that conversion information in the presentation information 114, the generating unit 103 updates the presentation information 114. FIG. 13 illustrates an example of new presentation information 114 that is updated by reflecting the conversion information 107 illustrated in FIG. 12 in the presentation information 114 illustrated in FIG. 10. In this example, it is illustrated that the conversion information 107 illustrated in FIG. 12 reverses the value of the access reliability flag of the node A (the node 403a). Thus, in the new presentation information 114 illustrated in FIG. 13, the node A (the node 403a) is updated to a reliable access node from an unreliable access node.

Figure 14:
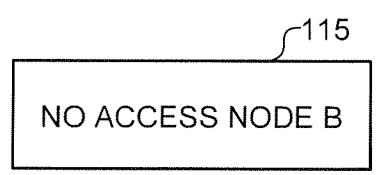
FIG. 14 is a diagram illustrating the dependency existence information according to the first embodiment.

Moreover, as illustrated in FIG. 14, assume that "no access node B" is input to the instructing unit 104 as the dependency existence information 115 indicating that the node B (the node 404a) does not access the data "a". According to the dependency existence information 115 that has been input, the instructing unit 104 adds a command for deleting the node B (the node 404a) in the conversion information 107 illustrated in FIG. 12 and updates the conversion information 107. The updated conversion information 107 is input to the generating unit 103, which reflects that conversion information 107 in the presentation information 114 and updates the presentation information 114.

Figure 15:
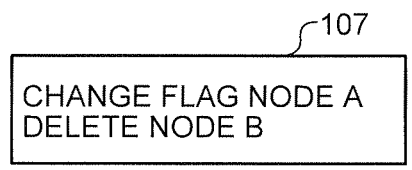
FIG. 15 is a diagram illustrating the conversion information generated from the dependency existence information according to the first embodiment.

With the update of the presentation information 114 as illustrated in FIG. 15, the unreliable task-border nodes related to the data "a" are eliminated. Hence, the focus is moved to performing the operation of generating the conversion information 107 and the presentation information 114 for the subsequent set of data (for example, the data "b"). Depending on the presentation information 114, the user sequentially inputs the dependency existence information 115. Once inputting of the dependency existence information 115 for the dependency graphs of all sets of data (in the example illustrated in FIG. 6, for the data "a", the data "b", and the data "c") and updating of the conversion information 107 is complete, it is determined that the dependency existence information 115 has been completely input. That marks the end of the communication with the user.

Figure 16:
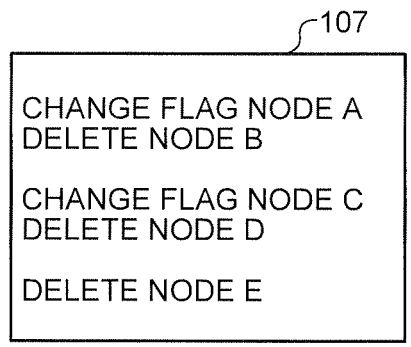
FIG. 16 is a diagram illustrating the conversion information generated for all of the data according to the first embodiment.

FIG. 16 illustrates an example in which the conversion information 107 is updated based on the dependency existence information 115 that are input for the data "a", the data "b", and the data "c".

With the use of the conversion information 107 generated by the instructing unit 104, the converting unit 105 converts the first-type dependency relationship information 112 into the second-type dependency relationship information 113. That is, according to the conversion information 107, the converting unit 105 converts the first-type dependency relationship information 112 into the second-type dependency relationship information 113 that contains M number of nodes ($0 \leq M \leq N$) corresponding to the data accesses to a single set of data and that contains edges indicating a second dependency relationship between those nodes.

In the conversion information 107, the nodes indicated with a "change flag" instruction are subjected to a reversal in the values of the respective access reliability flags. For example, if an access reliability flag has the value "unreliable", that value is changed to the value "reliable" due to the "change flag" instruction. Moreover, the nodes indicated with a "delete" instruction are deleted. In the example illustrated in FIG. 16, regarding the data "a" in the conversion information 107; it is illustrated that the access reliability flag of the node A (the node 403a) is reversed, and the node B (the node 404a) is deleted. Regarding the data "b", it is illustrated that the access reliability flag of a node C (the node 412b) is reversed, and a node D (the node 413b) is deleted. Regarding the data "c", it is illustrated that a node E (the node 421c) is deleted.

Figure 17:
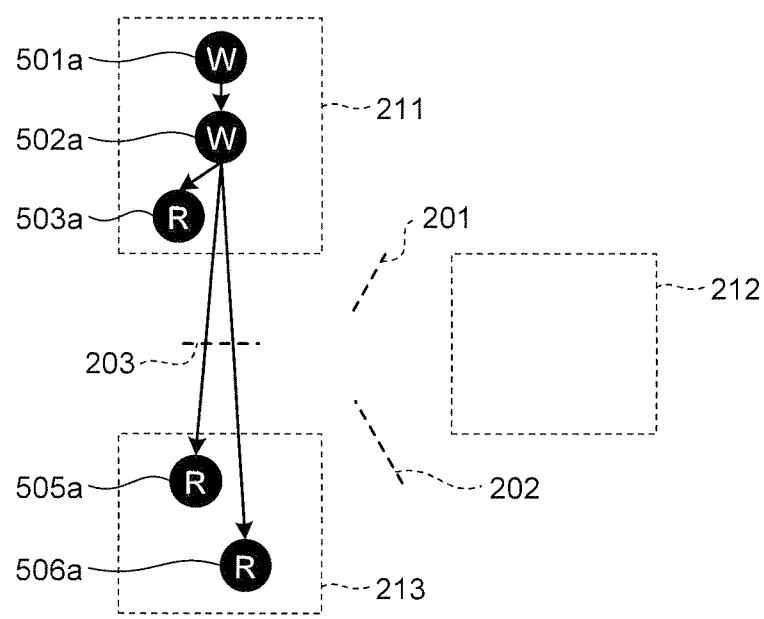
FIG. 17 is a diagram illustrating a dependency graph based on second-type dependency relationship information according to the first embodiment.
Figure 18:
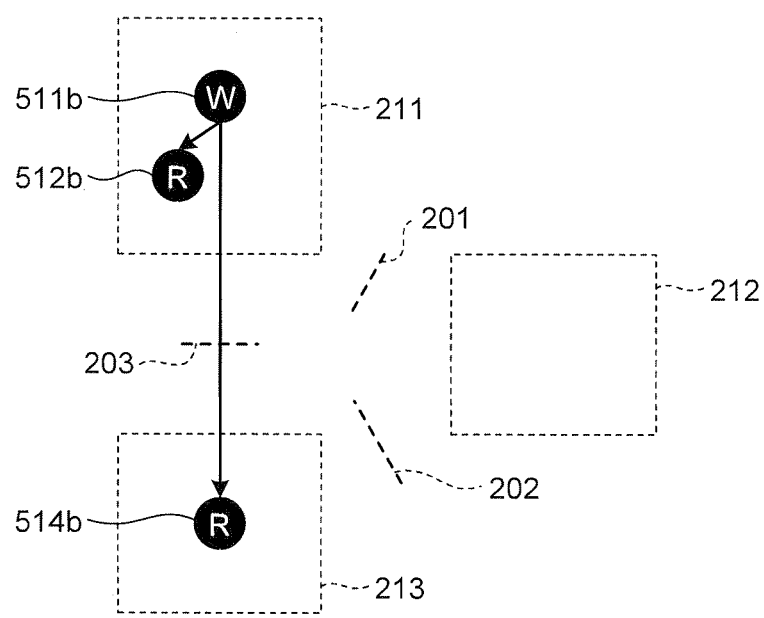
FIG. 18 is a diagram illustrating a dependency graph based on the second-type dependency relationship information according to the first embodiment.
Figure 19:
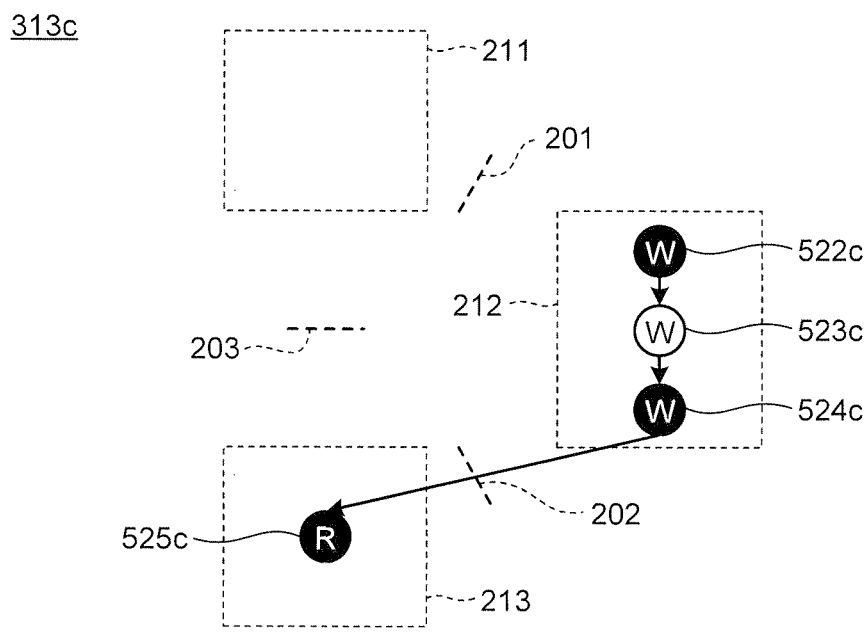
FIG. 19 is a diagram illustrating a dependency graph based on the second-type dependency relationship information according to the first embodiment.

FIGS. 17, 18, and 19 illustrate examples in which the dependency graphs 301a, 302b, and 303c that are based on the first-type dependency relationship information 112 illustrated in FIGS. 7, 8, and 9, respectively, are converted using the conversion information 107 into dependency graphs 311a, 312b, and 313c, respectively, that are based on the second-type dependency relationship information 113. As a result of the conversion operation performed by the converting unit 105, in the conversion information 107 illustrated in FIG. 17, the unreliable access nodes for which the "change flag" instruction is issued are converted into reliable access nodes and the nodes for which the "delete" instruction is issued are deleted. The dependency relationships around the deleted nodes are converted so as to rebuild correct dependency relationships with the nodes that remain without getting deleted.

With reference to FIG. 17, regarding the data "a", the access reliability flag of the node 403a illustrated in FIG. 7 is reversed to have the value "reliable" (a node 503a) according to "change flag node A" written in the conversion information 107 illustrated in FIG. 16. Moreover, the node 404a illustrated in FIG. 7 is deleted (see the task 212 in FIG. 17) according to "delete node B". Along with the reversal of the value of the access reliability flag of the node 403a and the deletion of the node 404a, edge information related to the node 403a and the node 404a is also changed. Where, a node 501a corresponds to the node 401a illustrated in FIG. 7.

With reference to FIG. 18, regarding the data "b", the access reliability flag of the node 412b illustrated in FIG. 8 is reversed to have the value "reliable" (node 512b) according to "change flag node C" written in the conversion information 107 illustrated in FIG. 16. Moreover, the node 413b illustrated in FIG. 8 is deleted (see the task 212 in FIG. 18) according to "delete node D". Along with the reversal of the value of the access reliability flag of the node 412b and the deletion of the node 413b, edge information related to the node 412b and the node 413b is also changed.

With reference to FIG. 19, regarding the data "c", the node 421c illustrated in FIG. 9 is deleted (see the task 211 in FIG. 19) according to "delete node E" written in the conversion information 107 illustrated in FIG. 16, and edge information related to the node 421c is also changed. Where, a node 522c corresponds to the node 422c illustrated in FIG. 9; and a node 523c corresponds to the node 423c illustrated in FIG. 9.

In this way, the parallelizing unit 106 makes use of the second-type dependency relationship information 113 that obtained by conversion by the converting unit 105 based on the conversion information 107, and determines the positions of synchronizations and generates the parallel program 116 having synchronizations inserted therein.

Figure 20:
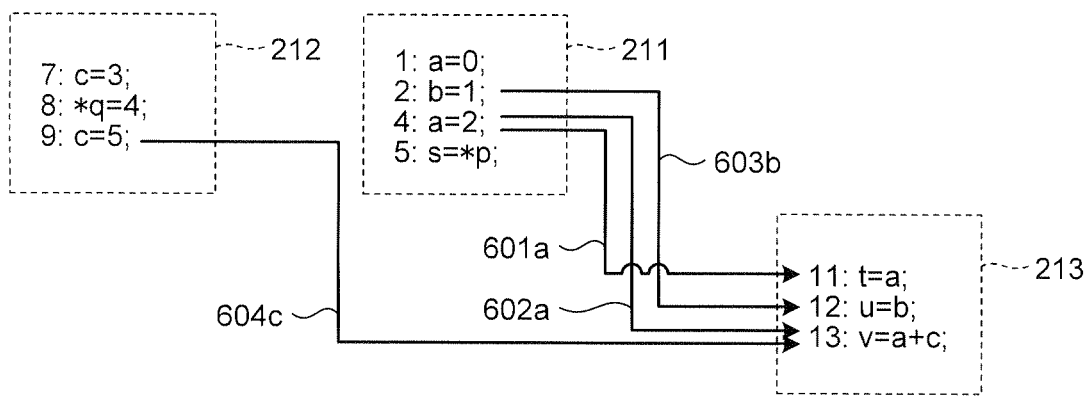
FIG. 20 is a diagram in which the task border edges are associated with the program code according to the first embodiment.

The parallelizing unit 106 extracts the task border edges included in the second-type dependency relationship information and analyzes execution order restrictions that need to be followed at the time of execution. FIG. 20 illustrates an example in which the task border edges illustrated in FIGS. 17, 18, and 19 are associated with the program code 111 illustrated in FIG. 3.

Herein, task border edges 601a, 602a, and 603b are the edges between the task 211 and the task 213. The task border edge 601a links a node 502a and a node 505a from the node 502a toward the node 505a; the task border edge 602a links the node 502a and a node 506a from the node 502a toward the node 506a; and the task border edge 603b links a node 511b and a node 514b from the node 511b toward the node 514b. Besides, a task border edge 604c is the edge between the task 212 and the task 213, and links a node 524c and a node 525c from the node 524c toward the node 525c.

The execution order restrictions are applied according to the orientations of the task border edges. Since no task border edge is present in between the task 211 and the task 212, no execution order restrictions are applied. In contrast, between the task 211 and the task 213 are present the execution order restrictions of the task border edges 601a, 602a, and 603b. Similarly, between the task 212 and the task 213 is present the execution order restriction of the task border edge 604c. In order to obtain a correct calculation result, such order restrictions need to be followed.

Figure 21:
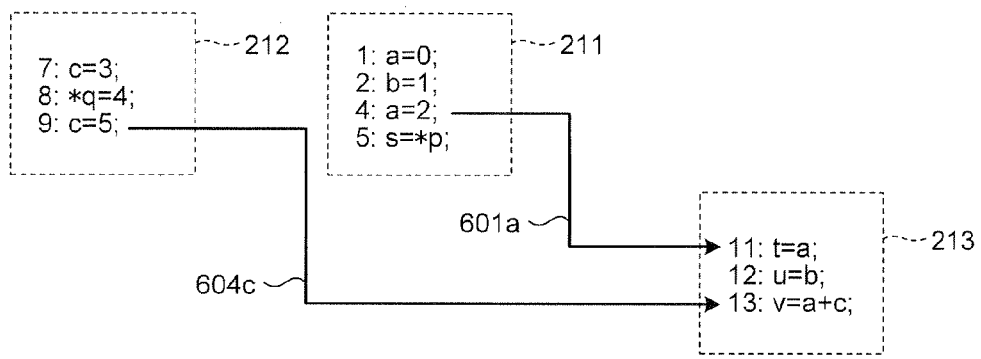
FIG. 21 is a diagram illustrating requisite minimum execution order restrictions between tasks according to the first embodiment.

Meanwhile, the parallelizing unit 106 can also be configured to perform optimization of the synchronizations that are output. For example, a method of inserting the requisite minimum synchronizations is known. The execution order restrictions have an inclusion relation between them. Thus, there are times when a particular execution order restriction is satisfied, the other execution order restrictions are also satisfied. In the example illustrated in FIG. 20, if the execution order restriction represented by the task border edge 601a is followed, the execution order restrictions represented by the task border edges 602a and 603b are also followed. Hence, as illustrated in FIG. 21, the requisite minimum execution order restrictions between tasks are only regarding the task border edges 601a and 604c.

Explained below is an example of an inclusion relation detecting algorithm for detecting the inclusion relation between such execution order restrictions. Consider the case of the task A, the task B, and two dependency relationships $D_1$ and $D_2$ oriented from the task A toward the task B. Compare the start points and the end points of the two dependency relationships $D_1$ and $D_2$. When the execution order of the start point of the dependency relationship $D_1$ is either same as or later than the execution order of the start point of the dependency relationship $D_2$ and when the execution order of the end point of the dependency relationship $D_1$ is either same as or earlier than the execution order of the end point of the dependency relationship $D_2$, the dependency relationship $D_1$ includes the dependency relationship $D_2$. As a result, once the execution order restriction represented in the dependency relationship $D_1$ is satisfied, the execution order restriction represented in the dependency relationship $D_1$ also gets satisfied.

Figure 24:
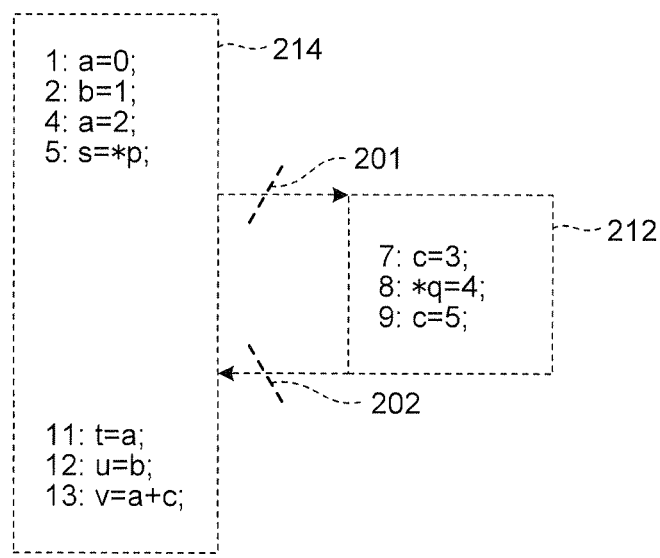
FIG. 24 is a diagram illustrating discontinuous tasks each containing a plurality of operations according to the first embodiment.

This represents the inclusion relationship detecting algorithm for a simple example as illustrated in FIG. 20. However, in a case when the tasks are divided at a plurality of locations as illustrated in FIG. 24 or when taking into consideration the local variables of the C language, it is necessary to implement an inclusion relationship detecting algorithm according to the input-output information supported by the parallelization apparatus.

Figure 22:
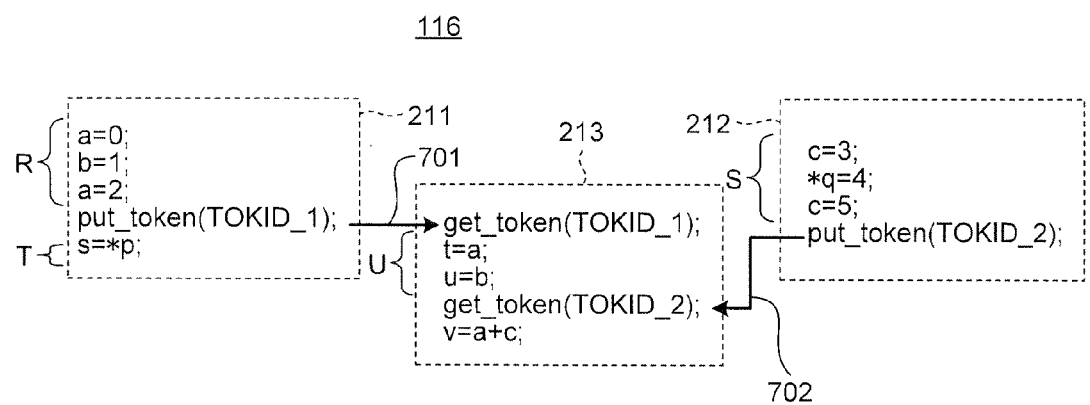
FIG. 22 is a diagram illustrating a parallel program according to the first embodiment.

The parallelizing unit 106 outputs the parallel program 116 having synchronizations inserted therein that satisfy the execution order restrictions represented by the task border edges. FIG. 22 illustrates an example of the parallel program 116 that is generated by extracting the requisite minimum task border edges from the task border edges illustrated in FIG. 21. An execution order restriction is expressed by transfer of a token (TOKID_x: where ID_x is an identifier), and the task border edge 601a corresponds to a token 701 and the task border edge 604c corresponds to a token 702. The tokens correspond to commands put_token and get_token having the same identifier; and after the command put_token is executed, it is guaranteed that the corresponding command get_token is spared from execution.

According to the first embodiment, in the generating unit 103 and the instructing unit 104, such dependency relationship information is provided which enables the user to determine the positions for inserting synchronizations not by having to refer to all of the information but only by referring to the individual information. That makes it possible to easily insert synchronizations of high quality.

Figure 23:
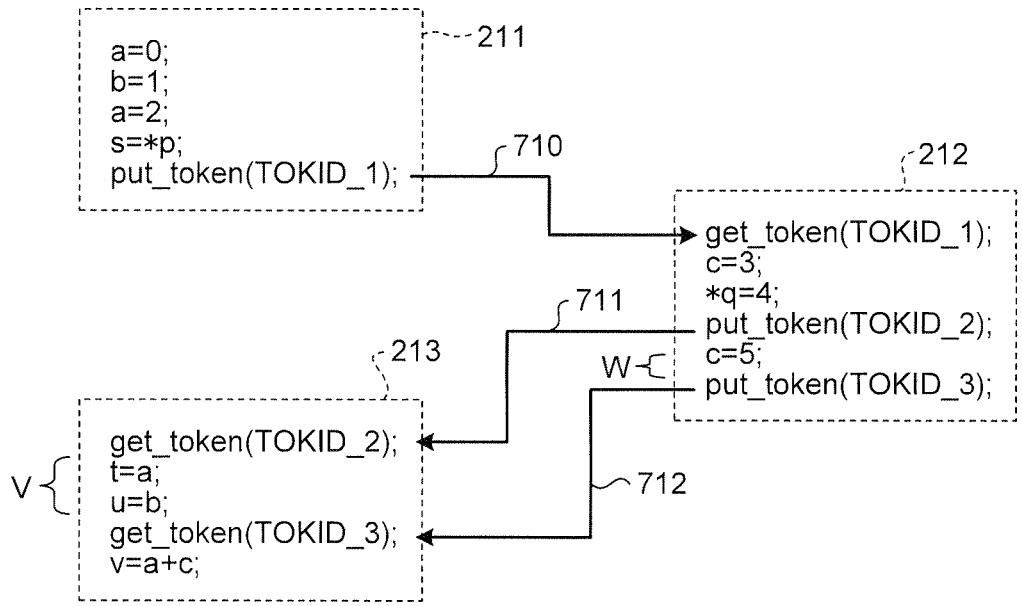
FIG. 23 is a diagram illustrating a parallel program not according to the first embodiment.

FIG. 23 illustrates an example of a parallel program for a case when the parallelization apparatus 10 according to the first embodiment is not used. For example, consider the case when the generating unit 103, the instructing unit 104, and the converting unit 105 are not used; and when the analysis result (the first-type dependency relationship information 112) obtained by the analyzing unit 102 is directly used by the parallelizing unit 106. In that case, the execution order restrictions of all task border edges illustrated in FIGS. 7 to 9 need to be satisfied. For that reason, from the program code illustrated in FIG. 5, a parallel program is generated that makes use of tokens 710, 711, and 712 as illustrated in FIG. 23.

As compared to the parallel program 116 illustrated in FIG. 22 according to the first embodiment, the parallel program illustrated in FIG. 23 has fewer parts that can be subjected to parallel execution. In the parallel program 116 illustrated in FIG. 22, a part R and a part S can be subjected to parallel execution; a part T and a part U can be subjected to parallel execution; the part T and the part S can be subjected to parallel execution; and the part S and the part U can be subjected to parallel execution. Moreover, the part T and "v=a+c" in the task 213 can also be subjected to parallel execution. In contrast, in the parallel program not according to the first embodiment, only a part V and a part W illustrated in FIG. 23 can be subjected to parallel execution. Hence, as compared to the parallel program not according to the first embodiment, the parallel program 116 according to the first embodiment can be said to be sophisticated from the perspective of parallelization.

Meanwhile, the first embodiment is not confined to the abovementioned example. Alternatively, the program code 111 can be provided as a text file having stored therein text data written in a programming language such as C language or Java (registered trademark). Besides, the program code 111 can be provided as a file of text data written in an independent programming language. Moreover, the program code 111 need not be text data having easily comprehensible structure for a person, but can be a binary file having binary data stored therein.

Furthermore, all the information of the program code 111 need not be stored in a single file, but can be dividedly stored in a plurality of files. Moreover, the program code 111 need not be in the format of a file, and can be in the form of data stored in a memory. For example, as the program code 111, it is possible to input a syntactic tree that represents data generated in a memory by a syntactic parsing apparatus of C language. Meanwhile, the program code 111 need not have the description of all the necessary operations, but can also be a part of a larger program code.

The task border information 110 is provided, for example, as a text file having stored therein text data indicating the task border positions in the program code 111. However, the task border information 110 need not be a file of text data having easily comprehensible structure for a person, but can be a binary file having binary data stored therein.

Moreover, the task border information 110 need not be in the format of a file, and can be in the form of data stored in a memory. For example, a task-border-position specifying apparatus with a graphical user interface (GUI) can be provided for generating the task border information 110. In that case, for example; the task-border-position specifying apparatus displays the program code 111 on a screen so that intended positions of the task borders can be specified using a pointing device such as a mouse, and the specified positions can be output as task borders to the memory. Meanwhile, the task border information 110 need not be specified by the user, but can be output by a different apparatus upon analyzing the program code 111. For example, with the use of a task-border-information generating apparatus, a "label_1", the label "label_2", and the label "label_3" illustrated in FIG. 3 can be recognized as task borders and the positions thereof can be output to the memory. Moreover, for example, the program code 111 written in C language can be analyzed and searched for the positions of loops, and the task borders can be recognized to be at such positions that are half of the loop iteration frequency, and those positions can be output to the memory.

Meanwhile, the program code 111 and the task border information 110 can be combined to be a single set of data. For example, in an example in which a portion of the program code 111 is bracketed off in a labeled curly bracket and the curly bracket is used to separate a task; the program code 111 and the task border information 110 get combined.

A task is a portion of the operation for expressing the program code 111. One task can contain a plurality of discontinuous operations. For example, in the example illustrated in FIG. 5, the task 211 and the task 212 are illustrated to be different tasks. However, alternatively, as illustrated in FIG. 24, the task 211 and the task 213 can also be considered to be a single task 214. When the task 211 and the task 213 are considered to be the single task 214, it is not possible to perform parallel execution of the task 211 and the task 213. In that case, there is no need to take into consideration the dependency between the task 211 and the task 213. Hence, the task border 201, which is the border between the anterior half of the task 214 and the task 212, as well as the task border 202, which is the border between the task 212 and the posterior half of the task 214, serve as the task borders in the program code 111.

Besides, the program code 111 or the task border information 110 can also hold parent-child information of the tasks included therein. For example, in the case of parallelizing only the loop portions of the program code 111 including pre-processing, loops, and post-processing; child tasks for performing parallel execution of the loops are started from parent tasks including pre-processing and post-processing. By taking into consideration the dependency relationships only between the child tasks to be subjected to parallel execution, the parallelizing unit 106 either can be spared from optimizing the dependency relationships between the parent tasks and the child tasks or can be configured to perform optimization by taking into consideration the dependency relationships between the parent tasks and the child tasks. Meanwhile, the relationship between the parent tasks and the child tasks is not confined to two levels, but can be of an arbitrary number of levels. That is, the child tasks can further start grandchild tasks.

A task border partitions not the program code 111 but the operations expressed by the program code 111. There are examples, as illustrated in the example in FIG. 5, when partitioning of the program code 111 and partitioning of the operations expressed by the program code 111 is equivalent. However, there are times when partitioning of the program code 111 and partitioning of the operations expressed by the program code 111 is not equivalent. For example, if loops of C language are included with respect to the program code 111, partitioning of the program code 111 and partitioning of the operations expressed by the program code 111 becomes not equivalent. The inside of a loop written in C language represents operations for only a single iteration in the program code 111. However, in actuality, the operations may be performed for a plurality of iterations. Hence, it is also possible to specify a task border midway of loop iteration. For example, if the loop has 100 iterations, a task border can be specified at the end of the fiftieth iteration. By specifying the task border in this way, it becomes possible to implement data partitioning parallelization using arrays.

As long as the task borders represent the information that enables identification of the tasks to which the data accesses belong, there is no restriction on the format of the task borders. For example, by holding the information of the task to which the data accesses belong, the portion at which the belonging task changes can be considered to be the task border edge.

There are various types to data access expressions. Apart from the data access expressions used in the example illustrated in FIG. 3, for example, function calls of C language can also become a type of data access expression. In a case when the data "a" and the data "b" are accessed in a function f( ) either the function call f( ) can be considered to be a data access expression of the data "a" and the data "b", or, instead of considering the function call f( ) as a data access expression, a data access expression in the function can be directly used. As in the case of considering the function call f( ) to be a data access expression of the data "a" and the data "b", it is possible that a single data access expression accesses a plurality of sets of data.

A direct access expression and an indirect access expression differ according to the type of the program code 111. In the example illustrated in FIG. 3, the data access expression "a" is classified as a direct access expression. However, it is not the only case. Alternatively, for example, in C++ language, depending on the type definition of a variable "a"; the data access expression "a" illustrated in FIG. 3 may be an indirect access expression.

Meanwhile, it is not necessary that the identifier constituting a data access expression has a correspondence relation of 1:1 with the data to be accessed. In the example illustrated in FIG. 3, although the data access expression "a" is assumed to access the data "a", the same correspondence relation is not present in C language. Rather, in C language, the identifier "a" itself does not enable determining whether the data access expression "a" access a local variable "a" or a global variable "a". Hence, it is also necessary to analyze the variable declaration given in the program code 111. If the analyzing unit 102 is configured to be capable of analyzing C language, it becomes possible to determine, without having to using dynamic data, whether the data access expression "a" accesses a local variable "a" or a global variable "a". With that, the data access expression and the data can be related to each other.

In the description given above, a dependency graph is expressed with a structure in which the true dependence, the anti-dependence, and the output dependence are represented as edges. However, that is not the only possible case. Alternatively, as long as a dependency graph, that is, the first-type dependency relationship information 112 is expressed equivalently to the structure thereof, it is also possible to express a stricter dependence. For example, in a definition usage tree expressing the relationship between definitions of data and usage of data as well as expressing the order relation of definitions; the anti-dependence is not demonstratively represented as edges. However, it is possible to derive the anti-dependence from the order relation of definitions. For example, in an order array in the program code 111 that represents the order relation of data accesses; in addition to the fact that the order relation of read accesses are expressed, it is also possible to insert synchronizations either by deriving the dependency relationship from that order relation or by using only the order relation.

In the description given above, as illustrated in FIG. 6, dependency graphs are constructed regarding the data that is accessed only by direct access expressions. However, that is not the only case. That is, dependency graphs can also be constructed regarding the data that is accessed by indirect access expressions. For example, in FIG. 6, there is a possibility that the data access expression "*p" written in the fifth line as well as the data access expression "*q" written in the eighth line reads data "z" that is not expressed in the program code. Hence, by constructing dependency graphs related to the data "*p" and the data "*q", a correct parallel program can be generated even when the data "z" is accessed by the data "*p" and the data "*q".

Meanwhile, the nodes of a dependence graph may not hold the information that indicates a write access or a read access. Even when there is no read/write information, there are times when the generating unit 103 or the parallelizing unit 106 can make use of the read/write information depending on the method of presenting the information or depending on the method of parallelizing. For example, using the order relation as the dependency relationship information falls under that case.

The edges of a dependency graph can also be made to express loop dependency or control dependency. The parallelizing unit 106 can recognize the edges representing loop dependency or control dependency, and insert synchronizations in an appropriate manner.

In a dependency graph, it is sufficient if at least one node has the access reliability flag. If a particular node does not have the access reliability flag, it is possible to treat that node to be equivalent to a node having the access reliability flag or to supplement the information about the access reliability flag from other information. For example, regarding a read access node not having the access reliability flag, a read access node in the dependency graph for an indirect access expression can be treated to be the node having "unreliable" as the access reliability flag. In this example, as the dependency existence information, it is also possible to input the data corresponding to each read access node in the dependency graphs for indirect access expressions.

Regarding the access reliability flag depending on an external input value that has not been analyzed, the analyzing unit 102 can set "reliable" as that access reliability flag. For example, as compared to the program code 111 illustrated in FIG. 3, a program code 2002 illustrated in FIG. 25 has the following if statement added therein: "if data "z" has value "0", data "p" points to data "a". According to the program code 2002 illustrated in FIG. 25; if the data "z" has the value "0", the data access expression "*p" accesses the data "a". In that case, in a precise sense, the value "0" of the external input "z" may not be obtained. Hence, in the dependency relationship information of the data "a", "unreliable" is set as the access reliability flag of the node corresponding to the data access expression "*p". However, since the if statement in the program code 2002 illustrated in FIG. 25 can be interpreted to have been written under the assumption that the condition of having "0" as the value of the data "z" is satisfied, the node corresponding to the data access expression "*p" of the data "a" can also be considered to be a reliable access node.

Figure 26:
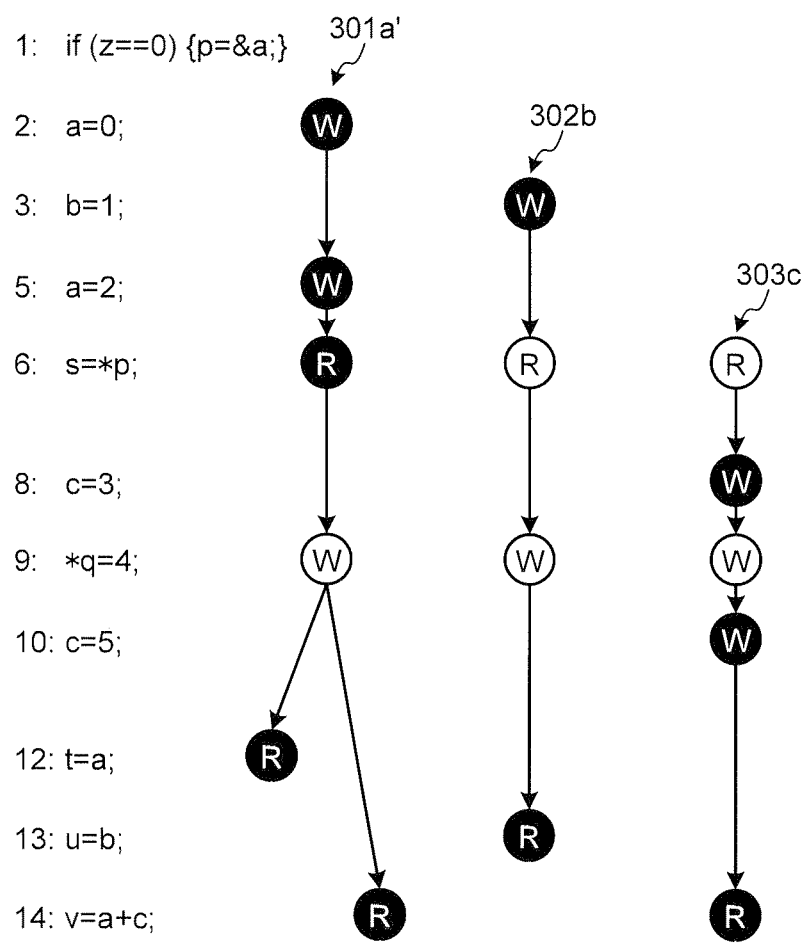
FIG. 26 is a diagram illustrating dependency graphs based on the first-type dependency relationship information according to the first embodiment.

FIG. 26 illustrates an example of the first-type dependency relationship information 112 based on the program code 2002 illustrated in FIG. 25. As compared to the dependency graph

301a of the data "a" in the first-type dependency relationship information illustrated in FIG. 6 based on the program code 111 illustrated in FIG. 3; in a dependency graph 301a' in the example illustrated in FIG. 26, the node corresponding to "s=*p" is considered to have "reliable" as the access reliability flag and that node is treated to be a reliable access node. Regarding the dependency graph 302b and the dependency graph 303c corresponding to the data "b" and the data "c", respectively; the case is identical to that illustrated in FIG. 6.

Figure 27:
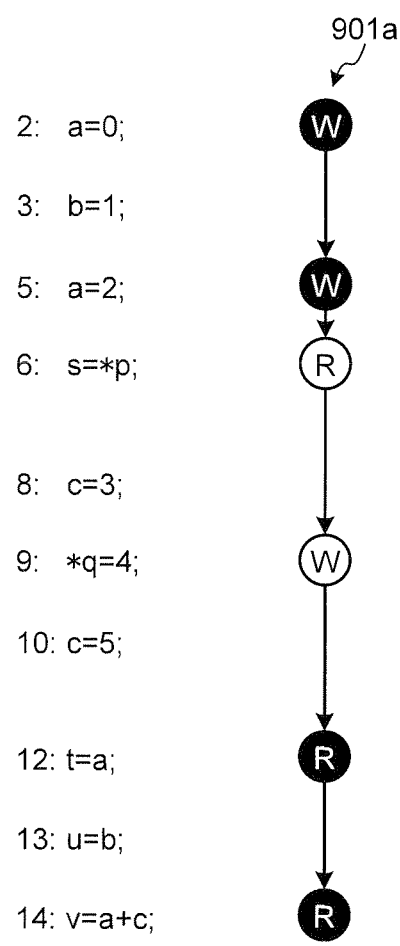
FIG. 27 is a diagram illustrating another example of the first-type dependency relationship information according to the first embodiment.
Figure 28:
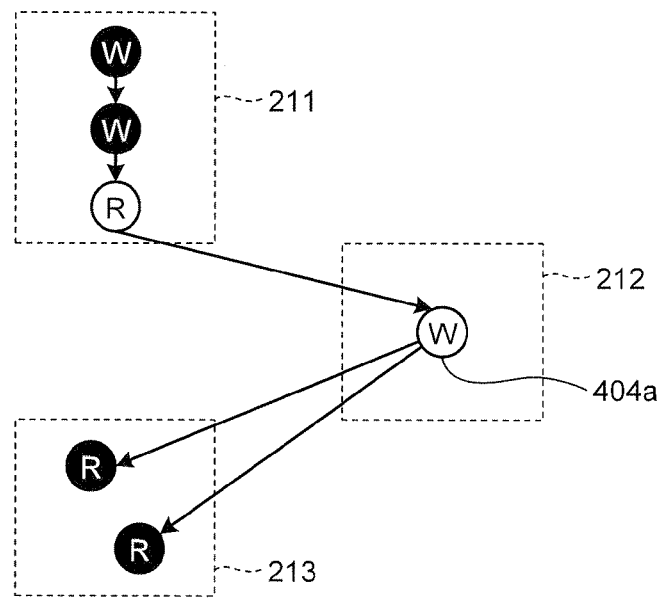
FIG. 28 is a diagram illustrating a dependency graph divided on a task-by-task basis according to the first embodiment.

In the description given above, the presentation information 114 and the first-type dependency relationship information 112 express the same structure. However, that is not the only case, and it is also possible that the presentation information 114 and the first-type dependency relationship information 112 express different structures. For example, as a dependency graph 901a illustrated in FIG. 27, the first-type dependency relationship information 112 related to the data "a" is held as the order array of data accesses; and, in the presentation information 114, can be converted into a dependency graph 3000 divided on a task-by-task basis as illustrated in FIG. 28. In this way, when the presentation information 114 and the first-type dependency relationship information 112 express different structures; the instructing unit 104 can receive the dependency existence information 115 with respect to the presentation information 114, but needs to appropriately convert the dependency existence information 115 into the conversion information 107.

Figure 29:
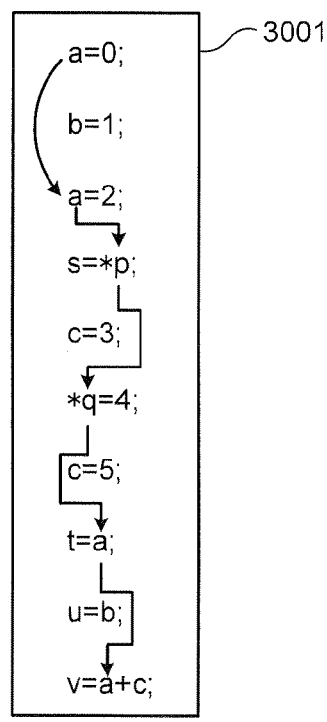
FIG. 29 is a diagram illustrating the presentation information containing the program code according to the first embodiment.

The generating unit 103 may not contain some portion held by the first-type dependency relationship information 112 in the presentation information 114. For example, even if the first-type dependency relationship information 112 is holding the read/write information of nodes, it is possible for the generating unit 103 not to contain that read/write information in the presentation information 114. For example, by limiting the elements of a dependency graph that can provide the dependency existence information 115, it becomes possible to not contain the access reliability flags in the presentation information 114 and to make them function as the parallelization apparatus 10. More particularly, even if the information about nodes is not directly included in the presentation information 114; as illustrated in FIG. 29, a program code 3001 can be included in the presentation information 114 and the edges linking the data access expressions in the program code 3001 can be included in the presentation information 114. As another example, without including the information about edges in the presentation information 114, only the information about nodes can be included.

Besides, supplementary information of the presentation information 114 can be received from the input unit 101, and the generating unit 103 can include that supplementary information in the presentation information 114. The examples of the supplementary information with respect to the presentation information 114 include critical path information and execution path information.

The generating unit 103 can identify at least one node and, at the time of generating the presentation information 114 of each node depending on whether or not the identified node is present in at least one of the paths leading to task border edges from the nodes included in the first-type dependency relationship information, can treat the identified node to be different from a reliable write node. Irrespective of the type of the identified node, the method of generating the presentation information 114 can be changed with the identified node considered to be a border. For example, only the nodes on the task border side of the identified node can be included in the presentation information 114. Meanwhile, instead of identifying nodes, the same result can be achieved by identifying edges.

Regarding the method that is employed by the generating unit 103 for identifying at least one node and generating the presentation information 114 depending on whether or not the identified node is present in at least one of the paths leading to a task border edge from the nodes included in the first-type dependency relationship information 112; the method of expression differs depending on what type of data structure is used at the time of holding the first-type dependency relationship information 112, and there are a plurality of methods which, in essence, perform the same operations.

For example, when the order relation is used as the first-type dependency relationship information 112, the presentation information 114 can be generated depending on the order relation between each node and the task border. That method is same as the method of generating the presentation information 114 depending on whether or not an identified node is present in at least one of the paths. Thus, if the order relation is in the order of a particular node, at least one of the identified nodes, and the task border, the identified node lies in at least one of the paths leading to the task border from the particular node. In contrast, if the order relation is in the order of all identified nodes, a particular node, and the task border, the identified nodes do not lie on any of the paths leading to the task border from the particular node.

Meanwhile, the generating unit 103 can generate the presentation information 114 by selecting the information to be presented as well as selecting the method of presentation. As a first example thereof, a presentation policy can be considered in which only the information related to a single selected unreliable task-border edge is presented. As a second example, a presentation policy can be considered in which all of the dependency relationship information related only to the data "a" is not presented. As a third example, a presentation policy can be considered in which the task border edges are displayed in an accented color such as red and the other edges are displayed in an unaccented color such as black. As a fourth example, a presentation policy can be considered in which only those nodes or edges are presented for which the dependency existence information 115 needs to be input from the instructing unit 104. As a fifth example, a presentation policy can be considered in which the sizes of nodes are changed according to the distances from task borders. These five presentation policies are only exemplary, and it is also possible to implement other presentation policies or implement a combination of a plurality of presentation policies. Besides, a presentation policy either can be incorporated in the generating unit 103 or can be input from outside.

Moreover, the generating unit 103 can also be configured to implement a combination of the method of identifying at least one node and generating the presentation information 114 depending on whether or not the identified node is present in at least one of the paths leading to a task border edge from the nodes included in the first-type dependency relationship information 112; and the method of generating the presentation information of each node according to the presentation policy. For example, it is possible to think of a method in which only the unreliable access nodes on the inside of the identified task are included in the presentation information 114.

Herein, whether or not the identified node is present corresponds to distinguishing the operations with respect to the node between portions requiring human judgment and portions not requiring human judgment. Besides, by distinguishing between portions requiring human judgment and portions not requiring human judgment according to the presentation policy, it becomes possible to perform the operations in an easier and speedier manner.

Meanwhile, as the dependency existence information 115, the instructing unit 104 can receive the dependency existence information not of the nodes but of the edges. For example, in the dependency graph 301a illustrated in FIG. 7, by issuing an instruction that the two edges extending over the task border 202 are not present; it becomes possible to analyze the fact that the node 404a does not access the data "a".

Alternatively, as the dependency existence information 115, the instructing unit 104 can receive the dependency existence information of a plurality of nodes or edges. For example, the instructing unit 104 can receive dependency existence information which indicates that none of the unreliable access nodes in the dependency graph 301a illustrated in FIG. 7 is involved in dependency. In that case, from the dependency graph 301a, the node 403a and the node 404a can be deleted.

Still alternatively, as the dependency existence information 115, the instructing unit 104 can input data and correspondence information of the data. For example, if "data "*p" and data "a" do not have correspondence relation" is input as the dependency existence information 115, the converting unit 105 can remove the node of the data access expression "*p" from the dependency graph of the data "a" and remove the node of the data access expression "a" from the dependency graph of the data "*p".

In the instructing unit 104, the input of the dependency existence information 115 can be completed while in the state of not receiving an instruction related to any unreliable task-border edge, and the system control may proceed to the conversion of dependency relationship information performed at S105 illustrated in FIG. 2. In this case, there is a possibility that a task border edge has an unreliable access node linked thereto. The manner in which that unreliable access node is treated depends on the mounting policy of the entire apparatus. For example, if it is to be considered that data is accessed from the unreliable access node, that unreliable access node is converted into a reliable access node. On the other hand, if it is to be considered that data is not accessed from the unreliable access node, that unreliable access node is deleted and the dependency relationship information is reconstructed. Moreover, in this case, since there is a possibility of incorrect operations, a warning can also be issued.

Meanwhile, the parallel program 116 is, for example, an executable file. Alternatively, the parallel program 116 can also be a text file in which is stored the text data written in a programming language such as C language or Java (registered trademark) or a text file in which is stored the text data written in an independent programming language of the parallelization apparatus 10. Regarding the parallel program 116, all of the information need not be stored in a single file but can be dividedly stored in a plurality of files. Moreover, the parallel program 116 need not be in the format of a file, and can be in the form of data stored in a memory. For example, the parallel program 116 can be executable data that has been output by a compiler during execution and that is stored in memory. Furthermore, the parallel program 116 need not have the description of all the necessary operations. Rather, the parallel program 116 can be an object file that is used in combination with other object files.

As described above, according to the first embodiment, from among a huge amount of data access related information that is included in the program code 111, the requisite minimum information is selected and presented. That enables the user to easily and speedily issue a change instruction regarding the dependency relationship of data accesses between tasks. As a result, a sophisticated parallel program can be generated at a low cost.

Moreover, according to the first embodiment, only the requisite minimum nodes are presented, and the information on the respective surrounding nodes is also presented. That enables the user to know the information related to the surrounding nodes as well.

Second Embodiment

Figure 30:
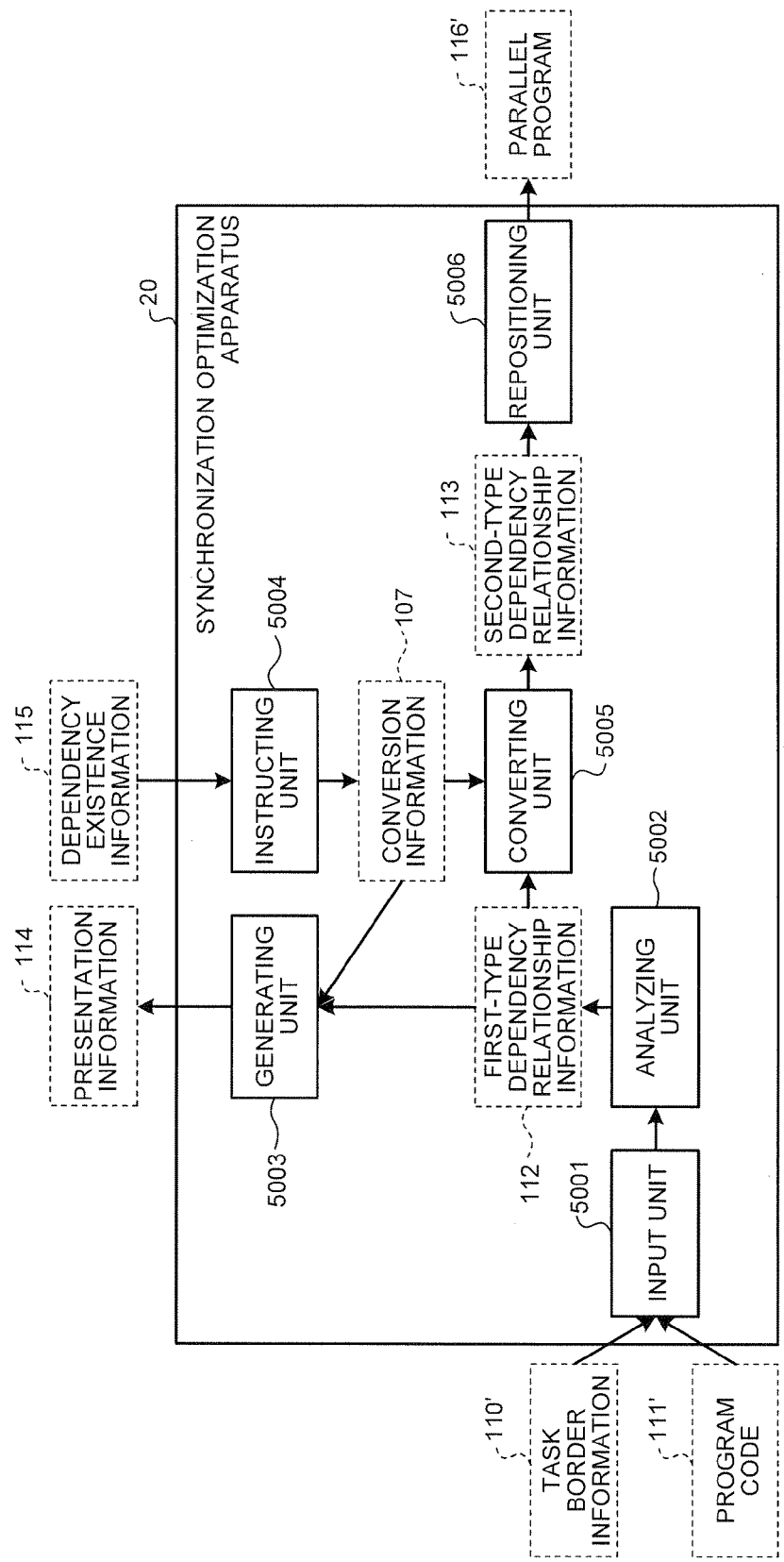
FIG. 30 is a diagram illustrating an exemplary configuration of a synchronization optimization apparatus according to a second embodiment.

FIG. 30 illustrates an exemplary configuration of a synchronization optimization apparatus 20 functioning as an information processing apparatus according to a second embodiment. In FIG. 30, the common constituent elements with FIG. 1 are referred to by the same reference numerals, and the detailed explanation thereof is not repeated. The synchronization optimization apparatus 20 performs a synchronization optimization operation on a parallel program that has been input thereto, and generates and outputs a parallel program 116' in which the synchronizations are optimized. The synchronization optimization apparatus 20 includes an input unit 5001, an analyzing unit 5002, a generating unit 5003, an instructing unit 5004, a converting unit 5005, and a repositioning unit 5006.

Figure 31:
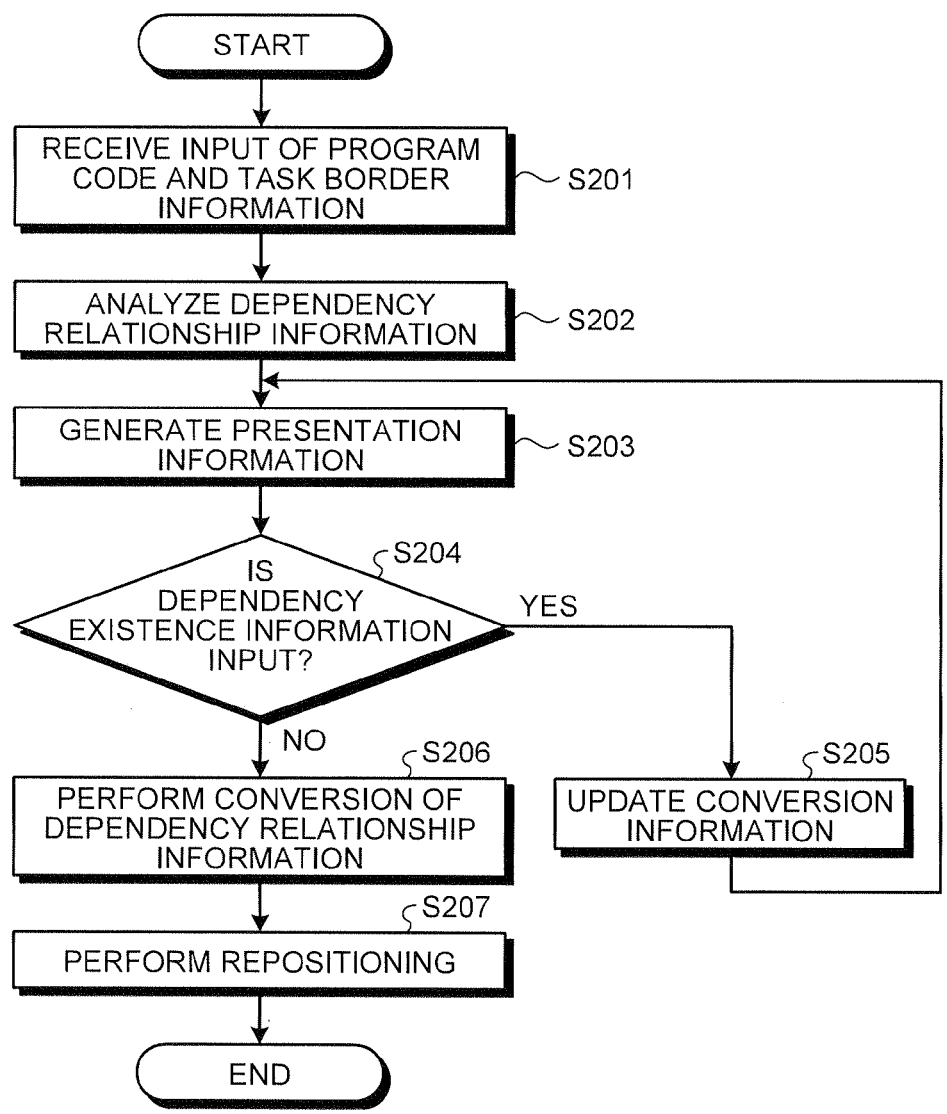
FIG. 31 is a flowchart for explaining a synchronization optimization operation according to the second embodiment.

FIG. 31 is a flowchart for schematically illustrating an example of the synchronization optimization operation according to the second embodiment. Firstly, to the input unit 5001 is input a program code 111' as the target of synchronization optimization and is input task border information 110' that indicates task borders for a computer program corresponding to the program code 111' (S201). The analyzing unit 5002 analyzes the program code 111' that has been input thereto and obtains dependency relationship information related to data accesses (i.e., obtains the first-type dependency relationship information 112) (S202).

Subsequently, based on the task border information 110' and based on the first-type dependency relationship information 112 analyzed by the analyzing unit 5002, the generating unit 5003 generates the presentation information 114 for the purpose of presentation (S203). The instructing unit 5004 determines whether the dependency existence information 115 has been input (S204) and, when the dependency existence information 115 is determined to have been input, the system control moves to S205. The instructing unit 5004 refers to the dependency existence information 115 and generates or updates the conversion information 107 (S205), and the system control returns to S203. The generating unit 5003 reflects, in the presentation information 114, the conversion information 107 that has been updated based on the dependency existence information 115.

On the other hand, when it is determined that the input of the dependency existence information 115 has completed and that there is no input of the dependency existence information 115 at Step S204, the system control moves to S206. The converting unit 5005 refers to the conversion information 107 that is generated or updated by the instructing unit 5004, and converts the first-type dependency relationship information 112 that is analyzed by the analyzing unit 5002 into the second-type dependency relationship information 113 (S206). Subsequently, the repositioning unit 5006 refers to the second-type dependency relationship information 113 that is obtained by conversion by the converting unit 5005, and generates and outputs the parallel program 116' having repositioned synchronizations (S207).

In the following description, the explanation of each functional block of the synchronization optimization apparatus 20 is given for the most basic configuration in which the functional blocks are tandemly connected in the sequence illustrated in FIG. 30. However, the second embodiment is not limited to that case. Alternatively, for example, the second embodiment can be implemented for a configuration in which a plurality of functional blocks operate in a coordinated manner; or can be implemented for a configuration in which the sequence of some functional blocks is interchanged; or can be implemented for a configuration in which a particular functional block is divided into a plurality of functional blocks; or can be implemented for a configuration having a combination of the above-mentioned three configurations. Besides, the second embodiment can also be implemented by dividing the functional blocks into a plurality of units.

The input unit 5001 receives the program code 111' and the task border information 110' into the synchronization optimization apparatus 20. Herein, the program code 111' represents a parallel program that is already divided on a task-by-task basis using some known method and that has the tasks subjected to parallelization. Thus, the program code 111' contains the task border information 110'.

FIG. 32 illustrates an example of the program code 111' containing the task border information 110'. The program code 111' illustrated in FIG. 32 is a parallel program code having three tasks. In the program code 111', a code "task1", a code "task2", and a code "task3" along with the accompanying curly brackets "{ . . . }" represent the task border information 110'. The code written within a particular curly bracket "{ . . . }" belongs to a single task. Each task is executed in parallel while achieving synchronization by using the commands put_token and get_token.

The analyzing unit 5002 analyzes the program code 111' and the task border information 110', and outputs the first-type dependency relationship information 112.

The analyzing unit 5002 refers to synchronization information specified in the program code 111' and analyzes execution order restrictions applied on the computer program by the program code 111'. In the example illustrated in FIG. 32, the synchronization information contains the commands put_token and get_token and contains identifiers for identifying tokens that are transferred using those commands. The command put_token is a command for delivering a token, while the command get_token is a command for receiving a token. The analyzing unit 5002 analyzes that the commands put_token and get_token having the same identifier are in a correspondence relation.

Figure 33:
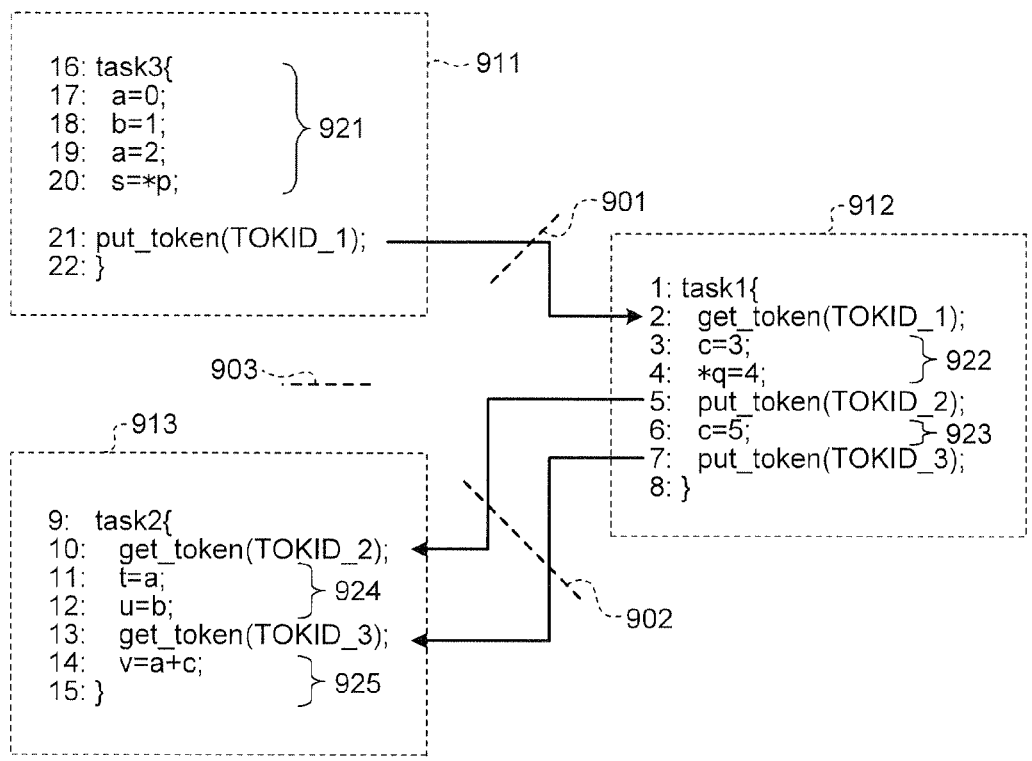
FIG. 33 is a diagram illustrating a result of analyzing correspondence relation of synchronization information according to the second embodiment.

FIG. 33 schematically illustrates a result of analyzing the correspondence relation of the synchronization information in the program code 111' illustrated in FIG. 32. Meanwhile, the line numbers illustrated in FIG. 33 are the line numbers specified in the original program code 111'. Herein, the program code 111' is divided into a task 912 that is defined by a code "task1", a task 913 that is defined by a code "task2", and a task 911 that is defined by a code "task3". The border between the tasks 911 and 912 is referred to as a task border 901, the border between the tasks 912 and 913 is referred to as a task border 902, and the border between the tasks 911 and 913 is referred to as a task border 903.

Herein, the term "block" refers to consecutive processing not containing a synchronization code. The analyzing unit 5002 extracts such a block from each task in the program code 111'. In the example illustrated in FIG. 33, the 17-th to 20-th lines in the task 911 constitute a single block 921. Similarly, the third line and the fourth line in the task 912 constitute a single block 922, while the sixth line in the task 912 constitutes a single block 923. Moreover, the 11-th line and the 12-th line in the task 913 constitute a single block 924, while the 14-th line in the task 913 constitutes a single block 925.

In FIG. 33, the command put_token and the command get_token that are in a correspondence relation are linked with arrows indicating synchronization positions. The analyzing unit 5002 refers to the correspondence relation of the synchronization information illustrated in FIG. 33 and analyzes execution order restrictions in the program code 111' illustrated in FIG. 32.

Figure 34:
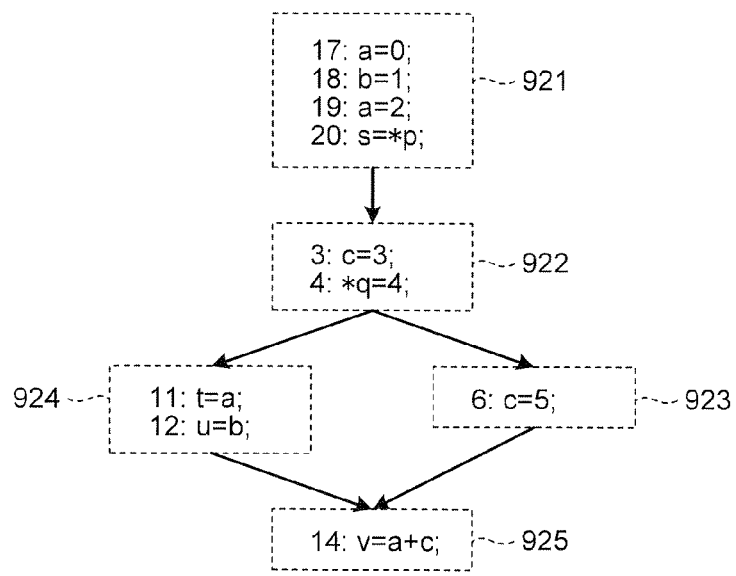
FIG. 34 is a diagram illustrating execution order restrictions that are analyzed according to the second embodiment.

FIG. 34 illustrates an example of the execution order restrictions that are analyzed from the program code 111'. In order to analyze the execution order restrictions, the analyzing unit 5002 follows the rules given below:

(1) An execution order restriction is applied in which the blocks included in the same task are to be executed in downward sequence from above (i.e., from the blocks having smaller line numbers to the blocks having larger line numbers).

(2) An execution order restriction is applied in which, for blocks included in different tasks, the operation prior to the corresponding command put_token is followed by the operation subsequent to the command get_token.

For example, the block 921 included in the task 911 and the block 922 included in the task 912 are included in different tasks. Hence, between the block 921 and the block 922, the execution order restriction (2) is applied by the commands put_token and get_token having TOKID_1 as the identifier. In contrast, between the blocks 922 and 923 that are included in the same task 912, the execution order restriction (1) is applied in which execution is performed in downward sequence from above.

In this way, by analyzing the execution order restrictions in the program code 111', the execution order restrictions among the blocks are obtained as illustrated in FIG. 34. There, the execution is performed in the sequence of the block 921 and the block 922. After executing the block 922, the block 923 and the block 924 are executed. After executing the blocks 923 and 924, the block 925 is executed.

Figure 35:
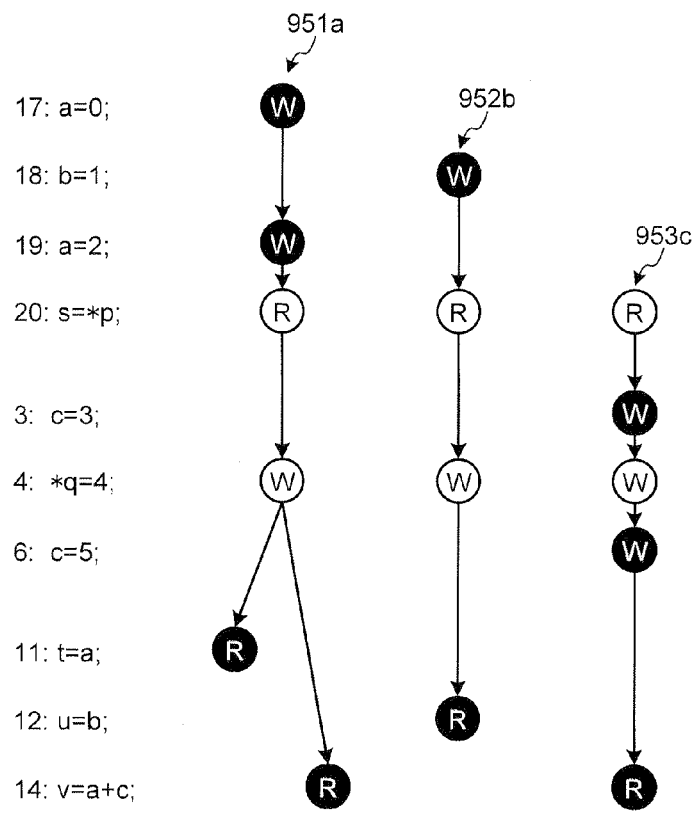
FIG. 35 is a diagram illustrating the first-type dependency relationship information that is analyzed by referring to the execution order restrictions according to the second embodiment.

The analyzing unit 5002 refers to the execution order restrictions that have been analyzed and analyzes the first-type dependency relationship information 112. FIG. 35 illustrates an example of the first-type dependency relationship information 112 that is analyzed by referring to the execution order restrictions illustrated in FIG. 34. In FIG. 35, the program code illustrated on the left side is given only for the purpose of enabling greater understanding of the correspondence relation of each node. In actuality, the first-type dependency relationship information 112 does not hold the information regarding the program code.

Once the data access expressions are executed in the order of the execution order restrictions, the analyzing unit 5002 generates a dependency graph by referring to the execution order of the data access expressions. For example, in the block 921, "a=0", "a=2", and "s=*p" are accessed in that particular order; then in the block 922, "*q=4" is accessed; then in the block 924, "t=a" is accessed; and then in the block 925, "v=a+c" is accessed. From such an access order, a dependency graph 951a illustrated in FIG. 35 is generated. Regarding the data "b" and the data "c", dependency graphs 952b and 953c are respectively generated in an identical manner.

When the nodes that are linked to the edges specified in the first-type dependency relationship information 112 belong to different tasks, the analyzing unit 5002 analyzes that task borders are present at such edges. In the example illustrated in FIG. 33, as described above, the task border between the tasks 911 and 912 is referred to as the task border 901, the task border between the tasks 912 and 913 is referred to as the task border 902, and the task border between the tasks 911 and 913 is referred to as the task border 903.

Meanwhile, the generating unit 5003, the instructing unit 5004, and the converting unit 5005 have identical functions to the functions of the generating unit 103, the instructing unit 104, and the converting unit 105, respectively, illustrated in FIG. 1 according to the first embodiment. Moreover, the operations are also identical to the operations performed in the parallelization apparatus 10 according to the first embodiment. Hence, the explanation thereof is not repeated.

The repositioning unit 5006 refers to the second-type dependency relationship information 113 obtained by conversion by the converting unit 5005, re-determines the positions of synchronizations, and generates the parallel program 116' having the re-determined synchronizations inserted therein. The operations performed by the repositioning unit 5006 differ from the operations performed by the parallelizing unit 106 in the parallelization apparatus 10 in the following points:

(1) Unnecessary pre-optimization synchronizations are deleted.
(2) The parallelization operation need not be performed.

Figure 36:
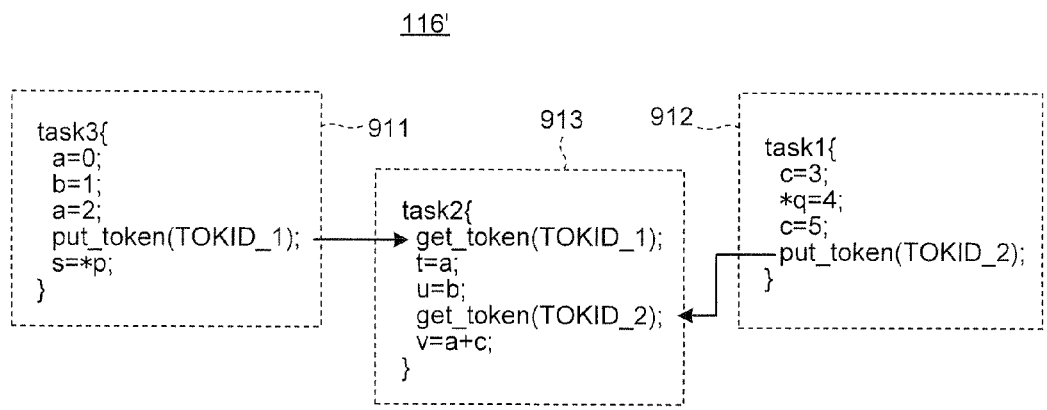
FIG. 36 is a diagram illustrating a parallel program in which synchronizations are optimized according to the second embodiment.

For example, the dependency existence information 115 identical to that explained in the first embodiment is provided to the program code 111' containing the task border information 110'; and, the conversion information 107 illustrated in FIG. 16 is generated based on the dependency existence information 115. With respect to the second-type dependency relationship information 113, which is obtained by the converting unit 5005 by converting the first-type dependency relationship information 112 on the basis of the conversion information 107; the repositioning unit 5006 analyzes necessary synchronizations in an identical manner to that explained in the first embodiment and outputs the parallel program 116' having optimized synchronizations as illustrated in FIG. 36.

In this way, according to the second embodiment, instead of inputting a sequential program, even if a parallel program that has already been subjected to parallelization is input; it is still possible to perform meaningful processing. That is, with respect to the parallel program that has been input, synchronizations are optimized so as to enable achieving enhancement in the performance of the parallel program.

Third Embodiment

In a third embodiment, while a parallel program is running, a runtime library is configured to change dependency relationship information that indicates the dependency relationship of data accesses in a parallel program.

Figure 37:
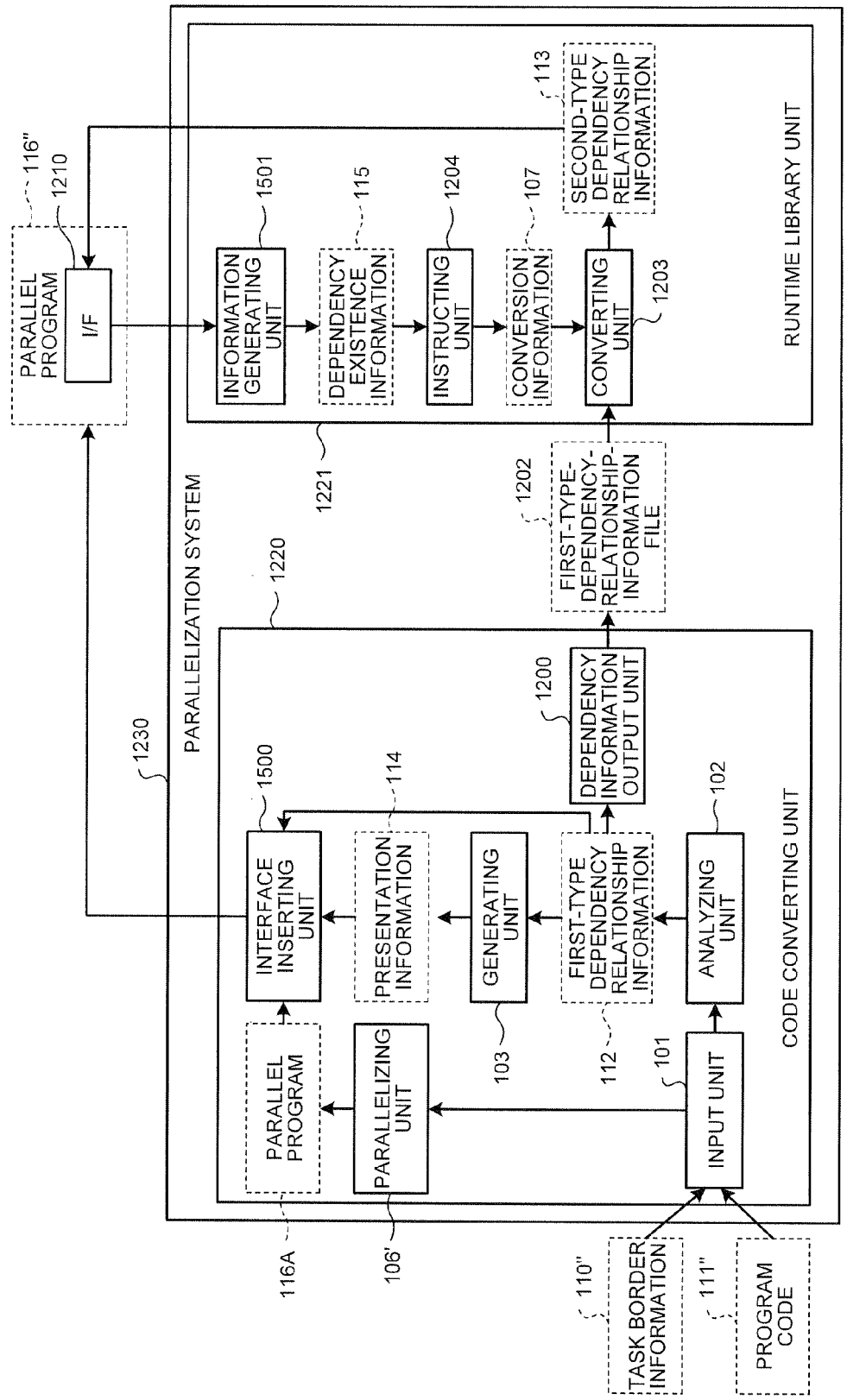
FIG. 37 is a functional block diagram of a parallelization system according to a third embodiment.

FIG. 37 is an exemplary functional block diagram for explaining the functions of a parallelization system 1230 functioning as an information processing apparatus according to the third embodiment. The parallelization system 1230 includes a code converting unit 1220 and a runtime library unit 1221, and includes an interface (I/F) 1210 inside a parallel program 116". In FIG. 31, the common constituent elements with FIG. 1 are referred to by the same reference numerals, and the detailed explanation thereof is not repeated.

If the parallelization system 1230 illustrated in FIG. 37 is compared to the parallelization apparatus 10 according to the first embodiment, some constituent elements of the parallelization apparatus 10 are included in the code converting unit 1220 and the other constituent elements are included in the runtime library unit 1221. The interface 1210 included in the parallel program 116" is, for example, an API of the runtime library unit 1221. Via the interface 1210, the parallel program 116" can communicate with the runtime library unit 1221.

Moreover, as compared to the parallelization apparatus 10 illustrated in FIG. 1, the parallelization system 1230 illustrated in FIG. 37 has an interface (I/F) inserting unit 1500 and an information generating unit 1501 added therein.

In the third embodiment, in the code converting unit 1220, the parallelizing unit 106' refers to task border information 110" and generates a parallel program 116A by parallelizing a program code 111". The interface inserting unit 1500 refers to the first-type dependency relationship information 112, which is analyzed by the analyzing unit 102 on the basis of the program code 111" and the task border information 110", as well as refers to the presentation information 114, which is obtained by the generating unit 103 by converting the first-type dependency relationship information 112; and generates the parallel program 116" by inserting the interface 1210 in the parallel program 116A that is generated by the parallelizing unit 106'.

Moreover, between the program code 111" that is input as a sequential program and the parallel program 116A that is obtained by conversion of the program code 111", mutually and functionally equivalent memory access is performed. For example, in the program code 111", if the indirect access expression "*p" accesses the data "a", even in the parallel program 116A that is obtained by parallelizing the program code 111", the indirect access expression "*p" refers to the same data "a".

Figure 38:
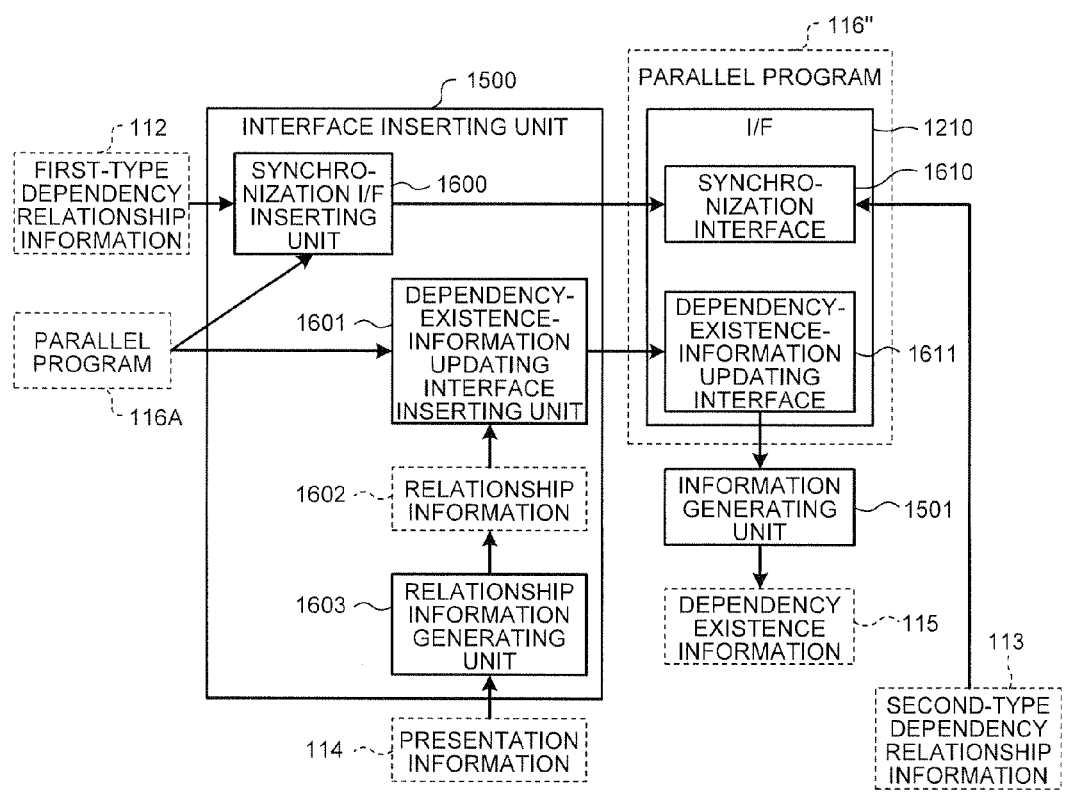
FIG. 38 is a diagram illustrating an example of a configuration of an interface inserting unit according to the third embodiment.

FIG. 38 illustrates details of an example of a configuration of the interface inserting unit 1500. Herein, the interface inserting unit 1500 includes a synchronization interface (I/F) inserting unit 1600, a dependency-existence-information updating interface inserting unit 1601, and a relationship information generating unit 1603.

The synchronization interface inserting unit 1600 refers to the first-type dependency relationship information 112 and inserts a synchronization interface 1610 in the parallel program 116". The relationship information generating unit 1603 receives the presentation information 114 and generates relationship information 1602 that expresses a correspondence relation between write accesses for the dynamic data, which is used in deciding the access destinations of indirect access expressions, and nodes corresponding to indirect access expressions for which the existence of access is determined by the write accesses. Based on the relationship information 1602, the dependency-existence-information updating interface inserting unit 1601 inserts a dependency-existence-information updating interface 1611 in the parallel program 116".

The interface 1210 includes the synchronization interface 1610 and the dependency-existence-information updating interface 1611 that are inserted in the parallel program 116" by the interface inserting unit 1500.

The first-type dependency relationship information 112 generated in the code converting unit 1220 is delivered to the runtime library unit 1221 via a first-type-dependency-relationship-information file 1202 that expresses the dependency relationship between data accesses using the extensible markup language (XML) format. The first-type dependency relationship information 112 generated by the analyzing unit 102 is first stored in the first-type-dependency-relationship-information file 1202 by a dependency information output unit 1200, and delivered to the runtime library unit 1221 and input to a converting unit 1203.

In the first embodiment, the user generates the dependency existence information 115 and inputs it using the instructing unit 104. In contrast, in the third embodiment, the dependency existence information 115 is generated by the information generating unit 1501 via the dependency-existence-information updating interface 1611 of the parallel program 116", and is input to an instructing unit 1204.

The runtime library unit 1221 and the parallel program 116" are compiled to an executable state and are executed in a program execution environment of a processor. The parallel program 116" is executed along with the runtime library unit 1221 in, for example, an execution environment that is partially or entirely common with the runtime library unit 1221. Once the execution starts, the converting unit 1203 in the runtime library unit 1221 reads the first-type dependency relationship information 112 that is stored in the first-type-dependency-relationship-information file 1202.

Meanwhile, along with the execution of the parallel program 116", the execution result of the dependency-existence-information updating interface 1611 that has been inserted is delivered to the information generating unit 1501 in the runtime library unit 1221. The execution result of the dependency-existence-information updating interface 1611 contains, for example, the information indicating whether or not the interface 1210 has been executed. Depending on the execution result for the interface 1210, the information generating unit 1501 generates the dependency existence information 115. That dependency existence information 115 is input to the instructing unit 1204.

From the dependency existence information 115 input thereto, the instructing unit 1204 generates the conversion information 107. Subsequently, based on the conversion information 107, the converting unit 1203 converts the first-type dependency relationship information 112, which has been read from the first-type-dependency-relationship-information file 1202, into the second-type dependency relationship information 113. The second-type dependency relationship information 113 is input to the synchronization interface 1610 in the parallel program 116". The synchronization interface 1610 reflects the second-type dependency relationship information 113 during synchronization of tasks of the parallel program 116".

The parallelization system 1230 according to the third embodiment can have a number of variations. For example, the code converting unit 1220 can be included in the execution environment of the parallel program 116". Besides, regarding the method of transferring the first-type dependency relationship information 112 between the code converting unit 1220 and the execution environment, various methods can be implemented. For example, the first-type dependency relationship information 112 can be transferred not only by storing it in a file but also as data in a memory. Similarly, regarding the method of inserting the interface 1210 in the parallel program 116", various methods can be implemented. For example, the interface 1210 can be inserted not only on a line-by-line basis in the program code but also on a block-by-block basis, where each block has a plurality of lines in the program code.

Moreover, the operations of the interface 1210 and the runtime library unit 1221, which serves as the function of the interface 1210, can also be performed in many ways. For example, there can be separate interfaces for deleting unreliable access nodes and for changing unreliable access nodes into reliable access nodes, or there can be a single interface performing both of those functions.

According to the third embodiment, the parallelization system 1230 monitors the execution of the parallel program 116" by inserting the interface 1210. However, that is not the only possible case. That is, the execution of the parallel program 116" can also be monitored by implementing some other method. For example, a method can be implemented in which, instead of inserting anything in the parallel program 116", the OS is instructed to monitor the execution of the program code of the parallel program 116"; and, when a CPU command under monitoring is executed, synchronization or dependency existence is updated. In the case of instructing the OS to monitor the execution status; the relationship information 1602 is referred to for setting, in the OS, the commands to be monitored by the OS and the operations to be performed in response to the execution of those commands.

Meanwhile, the functions of the parallelization system 1230 illustrated in FIG. 37 can also be implemented using hardware or using software running in the CPU. Alternatively, the functions can be implemented by a combination of hardware and software. Moreover, regarding the program code 111", the task border information 110", the input unit 101, the analyzing unit 102, the first-type dependency relationship information 112, and the information generated and used by those components; a number of variations are possible as described in the first embodiment.

Besides, the method of using the second-type dependency relationship information 113, which is obtained by conversion by the runtime library unit 1221, is also not limited to the explanation given above. For example, each time the second-type dependency relationship information 113 is updated, the updating details can be stored as trace information, which can be put to use at the time of generating the parallel program as dependency relationship information that reflects dynamic information.

Figure 39:
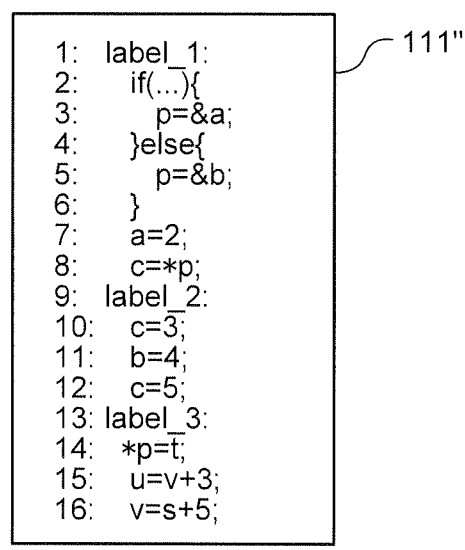
FIG. 39 is a diagram illustrating a program code that is used in the explanation of the third embodiment.

Explained below with reference to a sample code is the configuration of the parallel program or the operations of the runtime library unit 1221. FIG. 39 illustrates an example of the program code 111" that is input to the code converting unit 1220. In the program code 111", the data represents the dynamic data used in deciding the access destination of the indirect access expression "*p"; and a data access by the indirect access expression "*p" points to an unreliable access node. In this program code 111', the data accessed by the data "p" is decided depending on the branching of the if statement condition written between the second line and the sixth line.

When the if statement yields "true", the code "p=&a" is executed and the indirect access expression "*p" accesses the data "a". In contrast, when the if statement yields "false", the code "p=&b" is executed and the indirect access expression "*p" accesses the data "b". Thus, the access to the node of the indirect access expression "*p" can be decided according to the result of the if statement condition.

Figure 40:
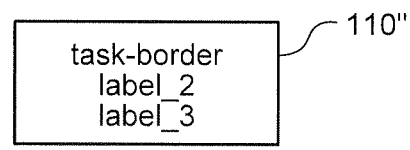
FIG. 40 is a diagram illustrating an example of task border information according to the third embodiment.

FIG. 40 illustrates an example of the task border information 110" corresponding to the program code 111". In this example, in the program code 111", it is illustrated that the code "label_2" written in the ninth line and the code "label_3" written in the 13-th line are task borders. With that, it can be understood that the program code 111" is divided into three tasks.

Figure 41:
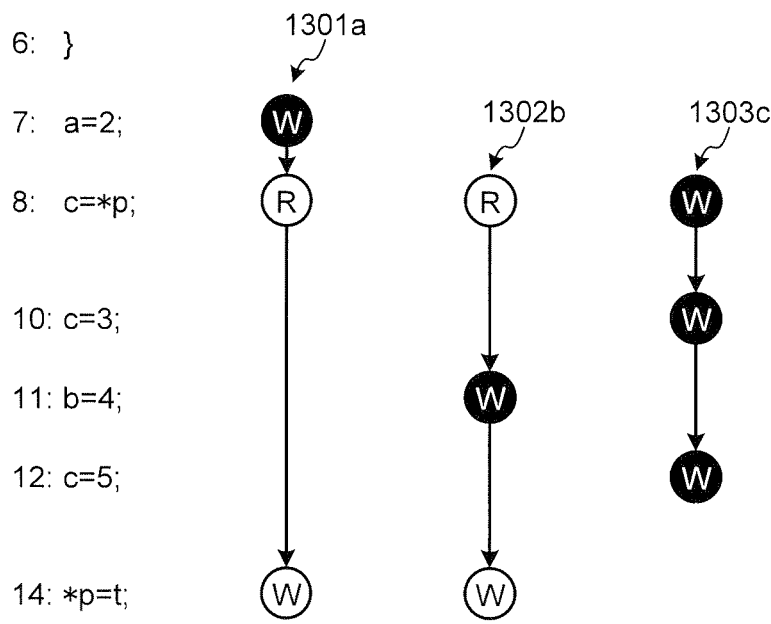
FIG. 41 is a diagram illustrating data access dependency relationship on a variable-by-variable basis according to the third embodiment.

FIG. 41 illustrates an example when the analyzing unit 102 analyzes the program code 111" and expresses data access dependency relationship on a variable-by-variable basis. In the first-type dependency relationship information 112, the dependency relationship is analyzed for each of the data "a", the data "b", and the data "c"; and dependency graphs 1301a, 1302b, and 1303c are respectively obtained. Within the if statement, the codes "p=&a" and "p=&b" indicate that the pointer variable "p" is substituted with the address of either the variable "a" or the variable "b". Thus, the indirect access expression "*p" accesses only the data "a" or the data "b". Hence, only in the dependency graphs for the data "a" and the data "b", the indirect access expression "*p" is present as an unreliable access node.

Figure 42:
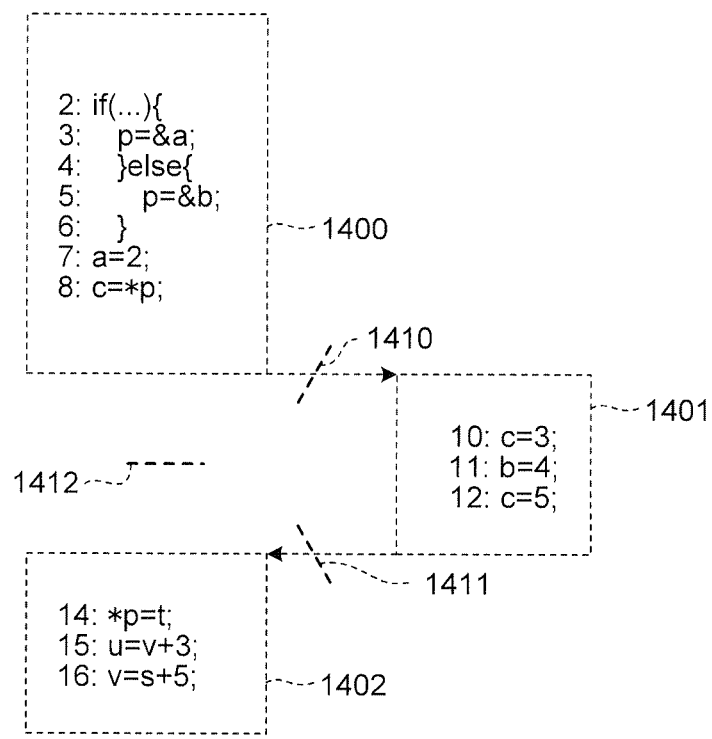
FIG. 42 is a diagram illustrating task division by referring to the task border information according to the third embodiment.

FIG. 42 schematically illustrates an example when the program code 111", illustrated in FIG. 39, is divided into tasks by referring to the task border information 110" illustrated in FIG. 40. In this example, according to the task border information 110", the operations of the program code 111" are divided into three tasks, namely, a task 1400, a task 1401, and a task 1402. The border between the task 1400 and the task 1401 is referred to as a task border 1410; the border between the task 1401 and the task 1402 is referred to as a task border 1411; and the border between the task 1400 and the task 1402 is referred to as a task border 1412.

Figure 43:
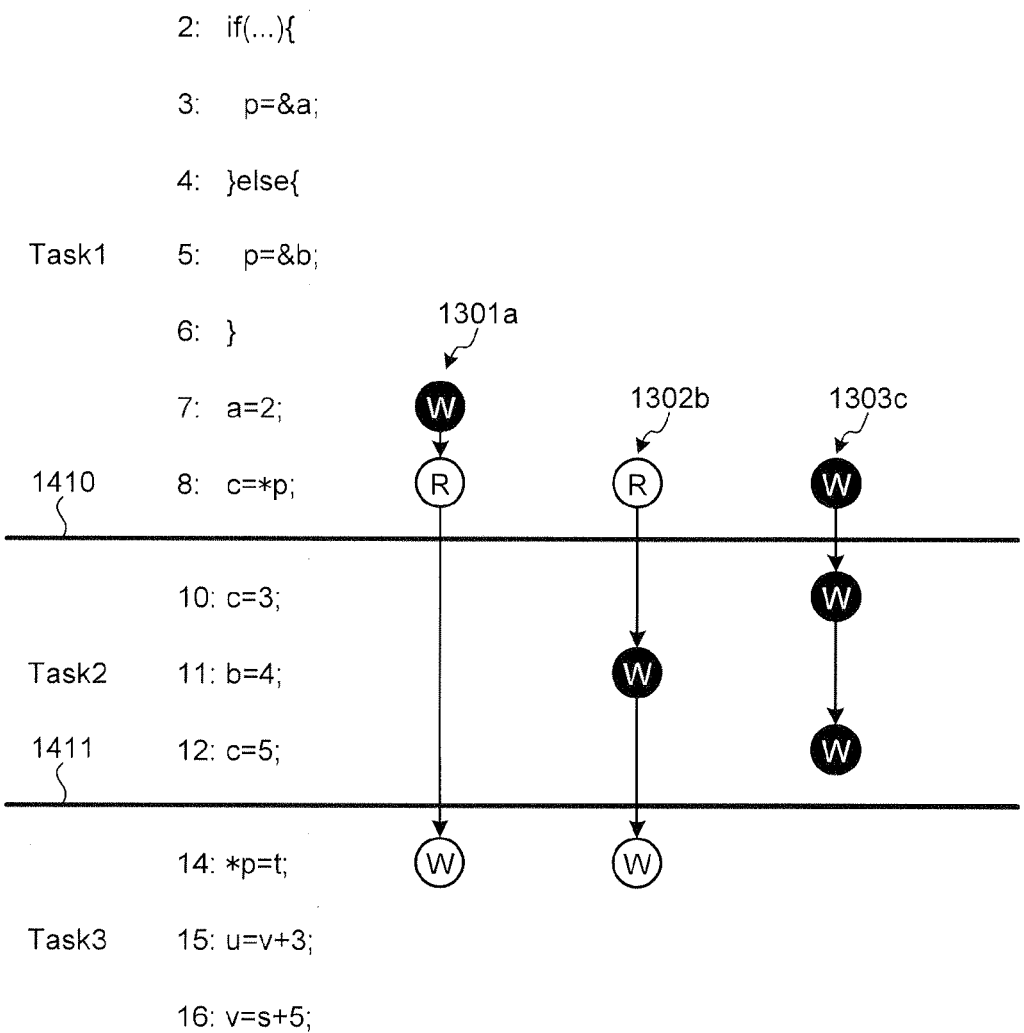
FIG. 43 is a diagram illustrating first-type dependency relationship information that corresponds to the program code according to the third embodiment.

FIG. 43 illustrates an example of the first-type dependency relationship information 112 that corresponds to the program code 111" and that is generated by the analyzing unit 102 based on the information explained with reference to FIGS. 40 to 42. In FIG. 43, a task Task1 represents the task 1400, a task Task2 represents the task 1401, and a task Task3 represents the task 1402. The borders between the tasks 1400 to 1402 are illustrated in the form of horizontal lines representing the task borders 1410 and 1411. In this example, the task border 1412 is indirectly expressed by an edge that passes through the task Task2 having no nodes.

By referring to the edges extending over the task borders 1410 to 1412, the analyzing unit 102 can identify the dependency relationship between the respective tasks. At that time, if no node of the target data exists in a particular task, even if an edge is present at the task border related to that particular task, there is no dependency relationship between that particular task and the data. For example, in the example illustrated in FIG. 43, regarding the data "a", it is illustrated that an unreliable task-border edge is present between the task Task1 and the task Task3. Regarding the data "c", it is illustrated that an unreliable task-border edge is present between the task Task1 and the task Task2.

On the basis of the task border information 110', the parallelizing unit 106' converts the program code 111" into the parallel program 116A. For example, the parallelizing unit 106' converts the program code 111" into the parallel program 116A that is divided on a task-by-task basis. In the parallel program 116A; the tasks Task1, Task2, and Task3 are defined by codes "Task1", "Task2", and "Task3", respectively, along with curly brackets "{ . . . }".

With respect to the parallel program 116A generated by the parallelizing unit 106', the interface inserting unit 1500 inserts commands or functions valid_node( ), invalid_node( ), post_sync( ), and wait_sync( ); and generates the parallel program 116". FIG. 44 illustrates an example of the parallel program 116" generated on the basis of the program code 111" illustrated in FIG. 39. In the following explanation, for the sake of convenience, the commands or functions valid_node( ), invalid_node( ), post_sync( ), and wait_sync( ) are explained as commands.

The commands valid_node( ) and invalid_node( ) represent dependency-existence-information updating interfaces. The commands post_sync( ) and wait_sync( ) represent synchronization interfaces. A dependency-existence-information updating interface inserted in the parallel program 116A is the dependency-existence-information updating interface 1611. In an identical manner, a synchronization interface inserted in the parallel program 116A is the synchronization interface 1610. These commands are the interfaces (APIs) that are used in communicating with the runtime library unit 1221 and that constitute the interface 1210.

The dependency-existence-information updating interface 1611 monitors the write accesses to the dynamic data that is used in deciding the access destinations of indirect access expressions included in the parallel program 116", and sends the monitoring result to the runtime library unit 1221.

The commands valid_node( ) and invalid_node( ) that constitute the dependency-existence-information updating interface 1611 are interfaces for updating the dependency existence information related to the unreliable task-border nodes. The commands valid_node( ) and invalid_node( ) update the information regarding unreliable nodes as well as change the unreliable nodes into reliable nodes or delete unreliable nodes. The commands valid_node( ) and invalid_node( ) are inserted by the interface inserting unit 1500 at the access locations for those variables which are responsible for unreliable task-border nodes. Herein, variables affecting the state of unreliable task-border nodes are the variables used in deciding the access destinations of the abovementioned indirect access expressions. More particularly, in a programming language such as C language, pointers or array indices represent such variables.

The relationship information generating unit 1603 generates the relationship information 1602 that is related to the existence of accesses between unreliable task-border nodes included in the presentation information 114 and the data accesses that decide the existence of accesses of those unreliable task-border nodes. Herein, the relationship information 1602 is referred to for inserting the commands valid_node( ) and invalid_node( ).

The relationship information 1602 that is generated by the relationship information generating unit 1603 contains position information indicating the positions in the parallel program 116A for inserting the commands valid_node( ) and invalid_node( ) and contains arguments to be assigned to those commands. An argument contains identifiers for identifying the node to which the corresponding command points to. Herein, a variable access represents, for example, substitution of an address in a pointer variable that is an indirect access expression.

FIG. 45 illustrates an example in which an identifier is associated to each dependency graph and to each node specified in the first-type dependency relationship information 112 illustrated in FIG. 43. In FIG. 45, an identifier "VAR_ID_x" identifies each set of data using the value "x". In this example, an identifier "VAR_ID_1" represents the data "a"; an identifier "VAR_ID_2" represents the data "b"; and an identifier "VAR_ID_3" represents the data "c". Moreover, an identifier "NODE_ID_x" assigns the value "x" sequentially from the root of the dependency graph of each set of data and identifies the node. The identifiers "VAR_ID_x" and "NODE_ID_x" are used in combination as the argument of each of the commands valid_node( ), invalid_node( ), post_sync( ), and wait_sync( ); and accordingly the nodes of the dependency graphs are identified. These identifiers are assigned to each node that is analyzed from the program code 111" by the analyzing unit 102 of the code converting unit 1220, and are appended to the first-type dependency relationship information 112 as well as used at the time of inserting commands in the parallel program 116". Herein, arbitrarily, using the identifier "VAR_ID_x" and the identifier "NODE_ID_x", a node is specified as "node(VAR_ID_x, NODE_ID_x)".

FIG. 46 illustrates an example of the relationship information 1602 in FIG. 45. The relationship information 1602 contains monitoring position information indicating the positions in the parallel program 116A for inserting the commands valid_node( ) and the invalid_node( ), and contains the arguments to be assigned to those commands. As illustrated in FIG. 46, the relationship information 1602 holds arguments, such as an identifier "VAR_ID_1, NODE_ID_2", that are assigned to the commands valid_node( ) and invalid_node( ), and holds the monitoring position information in a mutually corresponding manner. Thus, the arguments assigned to the commands valid_node( ) and invalid_node( ) represent the information that enables identification of unreliable access nodes to be subjected to information updating in response to the commands.

The dependency-existence-information updating interface inserting unit 1601 analyzes the accesses with respect to the variables in the program code and extracts such data accesses that exert influence on the existence of the data accesses with respect to those variables or affect changing of the access reliability flag from "unreliable" to "reliable" of unreliable access nodes. At that time, the dependency-existence-information updating interface inserting unit 1601 performs this type of analysis regarding all types of accesses, such as a direct access expression and an indirect access expression, related to a particular variable.

The following explanation is given with reference to the program code 111" that is a sequential program illustrated in FIG. 39. As is the case in the third line in the program code 111", when the code is written so as to set the data "a" in the indirect access expression "*p"; the interface inserting unit 1500 refers to the relationship information 1602 illustrated in FIG. 46. More particularly, from the relationship information 1602 illustrated in FIG. 46, the dependency-existence-information updating interface inserting unit 1601 can obtain the information regarding the commands valid_node( ) and invalid_node( ) that are to be inserted as dependency-existence-information updating interfaces. The dependency-existence-information updating interface inserting unit 1601 refers to the relationship information 1602 and, for example, inserts the dependency-existence-information updating interfaces that are associated with the monitoring position information on the code "p=&a".

As illustrated in FIG. 45, regarding the data "a", there exist two unreliable task-border nodes, namely, a node identified by the identifiers "VAR_ID_1" and "NODE_ID_2" and a node identified by the identifiers "VAR_ID_1" and "NODE_ID_3". Thus, as written in the fourth and fifth lines in the parallel program 116" illustrated in FIG. 44, commands valid_node(VAR_ID_1, NODE_ID_2) and valid_node (VAR_ID_1, NODE_ID_3) are inserted with the aim of changing those nodes into reliable access nodes. Similarly, regarding the data "b", there exist two unreliable task-border nodes, namely, a node identified by the identifiers "VAR_ID_2" and "NODE_ID_1" and a node identified by the identifiers "VAR_ID_2" and "NODE_ID_3". Regarding these nodes, as written in the sixth line in the parallel program 116" in FIG. 44, commands invalid_node(VAR_ID_2, NODE_ID_1) and invalid_node(VAR_ID_2, NODE_ID_3) are inserted with the aim of deleting those nodes.

Meanwhile, in the third embodiment, the explanation is given for an example in which the substitution with respect to the indirect access expression "*p" is monitored by the insertion performed by the dependency-existence-information updating interface 1611. However, it is not the only possible case. Alternatively, it is possible to monitor the reference with respect to the indirect access expression "*p" or to monitor the substitution as well as the reference with respect to the indirect access expression "*p".

The commands post_sync( ) and wait_sync( ) constituting the synchronization interface 1610 are synchronization interfaces for controlling inter-task synchronization. When there exists an edge starting from a particular access node, the command post_sync( ) is inserted immediately after the code statement specifying that access. In contrast, when there exists an edge leading to a particular access node, the command wait_sync( ) is inserted immediately prior to the code statement specifying that access.

In comparison with the first-type dependency relationship information 112 illustrated in FIG. 43 or in FIG. 45; in the example of the parallel program 116" illustrated in FIG. 44, a command post_sync(VAR_ID_1, NODE_ID_1) is inserted immediately after an access with respect to the data "a" by a direct access expression as written in the 15-th line. Moreover, commands post_sync(VAR_ID_3, NODE_ID_1), post_sync(VAR_ID_1, NODE_ID_2), and post_sync (VAR_ID_2, NODE_ID_1) are inserted immediately after an access with respect to the data "c" by the indirect access expression "*p" as written in the 17-th line.

Regarding the command wait_sync( ), immediately prior to an access with respect to the data "c" by a direct access expression as written in the 24-th line, a command wait_sync (VAR_ID_3, NODE_ID_2) is inserted. Similarly, immediately prior to an access with respect to the data "b" by a direct access expression as written in the 26-th line, a command wait_sync(VAR_ID_2, NODE_ID_2) is inserted. Moreover, immediately prior to an access with respect to data "t" by the indirect access expression "*p" as written in the 33-rd line, a command wait_sync(VAR_ID_1, NODE_ID_3) and a command wait_sync(VAR_ID_2, NODE_ID_3) are inserted.

Explained below in a schematic manner are the functions performed by each command constituting the interface 1210.

(a) Command valid_node( ):

Sends, to the converting unit 1203 via the information generating unit 1501 and the instructing unit 1204 of the runtime library unit 1221, the conversion information 107 used in changing the node specified in the argument into a reliable access node.

More particularly, when the command valid_node( ) is executed in the interface 1210; to the information generating unit 1501 are delivered an argument containing an identifier that identifies data and a node and an identifier that identifies the node, and an instruction for changing the node that has been specified in the argument into a reliable access node. The information generating unit 1501 refers to the information received from the command valid_node( ) and generates the dependency existence information 115. The instructing unit 1204 refers to the dependency existence information 115 and generates the conversion information 107 that is used in changing the node that has been specified in the argument into a reliable access node, and sends that conversion information 107 to the converting unit 1203. Meanwhile, in an identical manner, execution results of the commands invalid_node( ), post_sync( ), and wait_sync( ), described later, are also sent to the converting unit 1203.

The converting unit 1203 refers to the conversion information 107 sent thereto and accordingly updates the second-type dependency relationship information 113. In a case such as at the time of executing the parallel program 116" for the first time when the second-type dependency relationship information 113 does not exist, the second-type dependency relationship information 113 can be generated on the basis of the first-type dependency relationship information 112 read from the first-type-dependency-relationship-information file 1202. Meanwhile, when there is an access with respect to an indirect access expression, the command valid_node( ) is inserted for a number of times that is equal to the number of unreliable task-border nodes corresponding to the data set in that indirect access expression. In the command valid_node( ), the unreliable task-border nodes corresponding to the data set in the indirect access expression are specified in the arguments.

(b) Command invalid_node( ):

Sends, to the converting unit 1203 via the information generating unit 1501 and the instructing unit 1204 of the runtime library unit 1221, the conversion information 107 used in deleting the node specified in the argument. The converting unit 1203 refers to the conversion information 107 and deletes unreliable access nodes from the second-type dependency relationship information 113. In a case such as at the time of executing the parallel program 116" for the first time when the second-type dependency relationship information 113 does not exist, the second-type dependency relationship information 113 can be generated on the basis of the first-type dependency relationship information 112 read from the first-type-dependency-relationship-information file 1202. Meanwhile, when there is an access with respect to an indirect access expression, the command invalid_node( ) is inserted for a number of times that is equal to the number of unreliable task-border nodes corresponding to the data not set in that indirect access expression. In the command invalid_node( ), the unreliable task-border nodes corresponding to the data not set in the indirect access expression are specified in the arguments.

(c) Command post_synch( ):

Checks the second-type dependency relationship information 113 and, when a node specified in the argument is present, sends the conversion information 107 used in deleting the edge starting from that particular node to the converting unit 1203 via the information generating unit 1501 and the instructing unit 1204 of the runtime library unit 1221. In a case such as at the time of executing the parallel program 116" for the first time when the second-type dependency relationship information 113 does not exist, the second-type dependency relationship information 113 can be generated on the basis of the first-type dependency relationship information 112 read from the first-type-dependency-relationship-information file 1202. Meanwhile, the command post_sync( ) is inserted when the edge starting from the target node is a reliable task-border edge or an unreliable task-border edge.

(d) Command wait_sync( ):

Refers to the second-type dependency relationship information 113; checks, when the node specified in the argument is present, whether or not there exists an edge reaching that node; and sends, to the converting unit 1203 via the information generating unit 1501 and the instructing unit 1204 of the runtime library unit 1221, a request to determine whether to start execution or to wait for synchronization. In response to that request, the converting unit 1203 refers to the second-type dependency relationship information 113 based on the conversion information 107. At that time, the converting unit 1203 uses the conversion information 107 only for the purpose of referring to the second-type dependency relationship information 113, and does not make any changes in the dependency relationship information. In a case such as at the time of executing the parallel program 116" for the first time when the second-type dependency relationship information 113 does not exist, the second-type dependency relationship information 113 can be generated on the basis of the first-type dependency relationship information 112 read from the first-type-dependency-relationship-information file 1202. Meanwhile, the command wait_sync( ) is inserted when the edge leading to the target node is a reliable task-border edge or an unreliable task-border edge.

With the commands inserted into the parallel program 116" by the dependency-existence-information updating interface inserting unit 1601, the execution results of the dependency-existence-information updating interface 1611 are delivered to the information generating unit 1501. Based on those execution results, the information generating unit 1501 generates the dependency existence information 115. By referring to the dependency existence information 115, the data accesses in the running parallel program 116" are monitored. In other words, it can be said that the dependency-existence-information updating interface inserting unit 1601, the dependency-existence-information updating interface 1611, and the information generating unit 1501 constitute a monitoring unit for monitoring the data accesses in the parallel program 116". Meanwhile, in the case of instructing the OS to monitor the data accesses as described above, the functional components constituting a monitoring unit are different than in the third embodiment.

Figure 51:
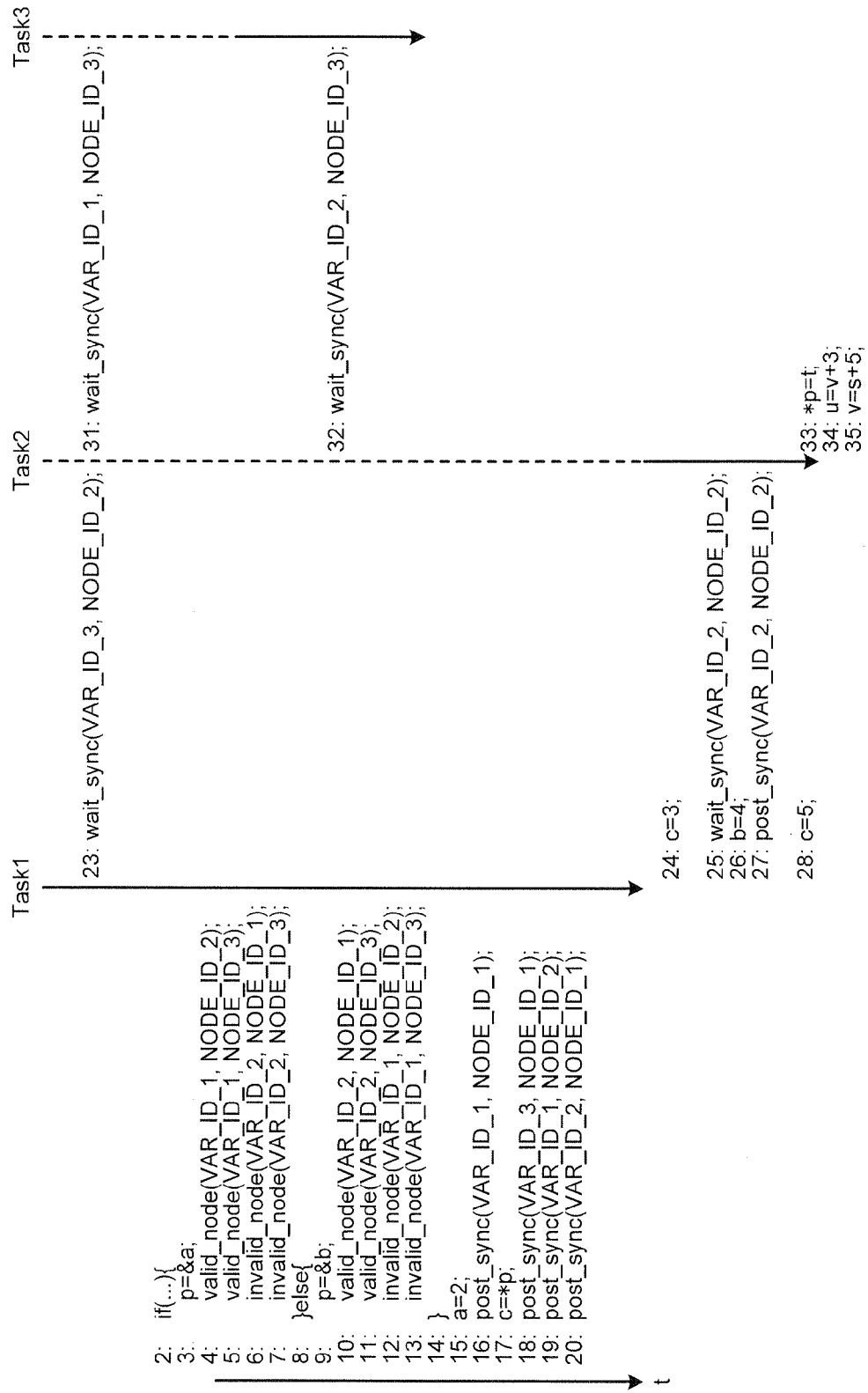
FIG. 51 is a diagram illustrating an execution image of the program code according to the third embodiment.

FIG. 47 and FIG. 51 illustrate execution images of the parallel program 116" illustrated in FIG. 44. FIG. 47 illustrates an execution example the if statement starting at the second line in the parallel program 116" illustrated in FIG. 44 yields "true"; while FIG. 51 illustrates an execution example when the same if statement yields "false". In FIGS. 47 and 51, the vertical axis represents time that progresses downward from above in the diagrams. Moreover, solid arrows indicate execution of the computer program, while dotted arrows indicate waiting for synchronization. Besides, the program code specified on the left side of the arrows represents the processing image of each task.

Firstly, explained below with reference to FIG. 47 is an execution image in chronological order when the if statement yields "true".

(1) Each of the task Task1, the task Task2, and the task Task3 starts execution. The task Task1 need not wait for synchronization and thus starts operations. The task Task2 executes the command wait_sync(VAR_ID_3, NODE_ID_2). Herein, as illustrated in FIG. 45, the node specified in the argument is present. Thus, firstly, it is checked whether there exists an edge starting from the node specified in the argument. Since such an edge exists, the task Task2 falls into a synchronization waiting mode. The task Task3 executes the command wait_sync(VAR_ID_1, NODE_ID_3). In this case, since the node specified in the argument is present, it is checked whether there exists an edge leading to that node. Since such an edge exists, the task Task3 also falls into the synchronization waiting mode. Meanwhile, the tasks Task2 and Task3, which cannot start operations while in the synchronization waiting mode, perform polling and repeatedly check the respective conditions.

(2) The task Task1 continues with the processing of the computer program and finishes processing of the if statement. In this example, it is assumed that the if statement yields "true". There, the task Task1 executes the commands valid_node(VAR_ID_1, NODE_ID_2) and valid_node(VAR_ID_1, NODE_ID_3) written in the fourth and fifth lines, respectively, and updates the target nodes to reliable access nodes in the second-type dependency relationship information 113. Moreover, the task Task1 executes the commands invalid_node(VAR_ID_2, NODE_ID_1) and invalid_node(VAR_ID_2, NODE_ID_3) written in the sixth and seventh lines, respectively, and deletes not only the target nodes but also the edges linked to those nodes.

Thus, for example, when the commands valid_node(VAR_ID_1, NODE_ID_2) and valid_node(VAR_ID_1, NODE_ID_3) are executed, the information generating unit 1501 generates the dependency existence information 115 according to the arguments. The conversion information 107, which is used in changing the nodes that are specified in the arguments into reliable access nodes, is sent to the converting unit 1203 via the instructing unit 1204 of the runtime library unit 1221.

The same is the case regarding the commands invalid_node(VAR_ID_2, NODE_ID_1) and invalid_node(VAR_ID_2, NODE_ID_3). The converting unit 1203 refers to the conversion information 107 sent thereto and updates the second-type dependency relationship information 113. The interface 1210 reflects the updated second-type dependency relationship information 113 in the execution of the parallel program 116".

Figure 48:
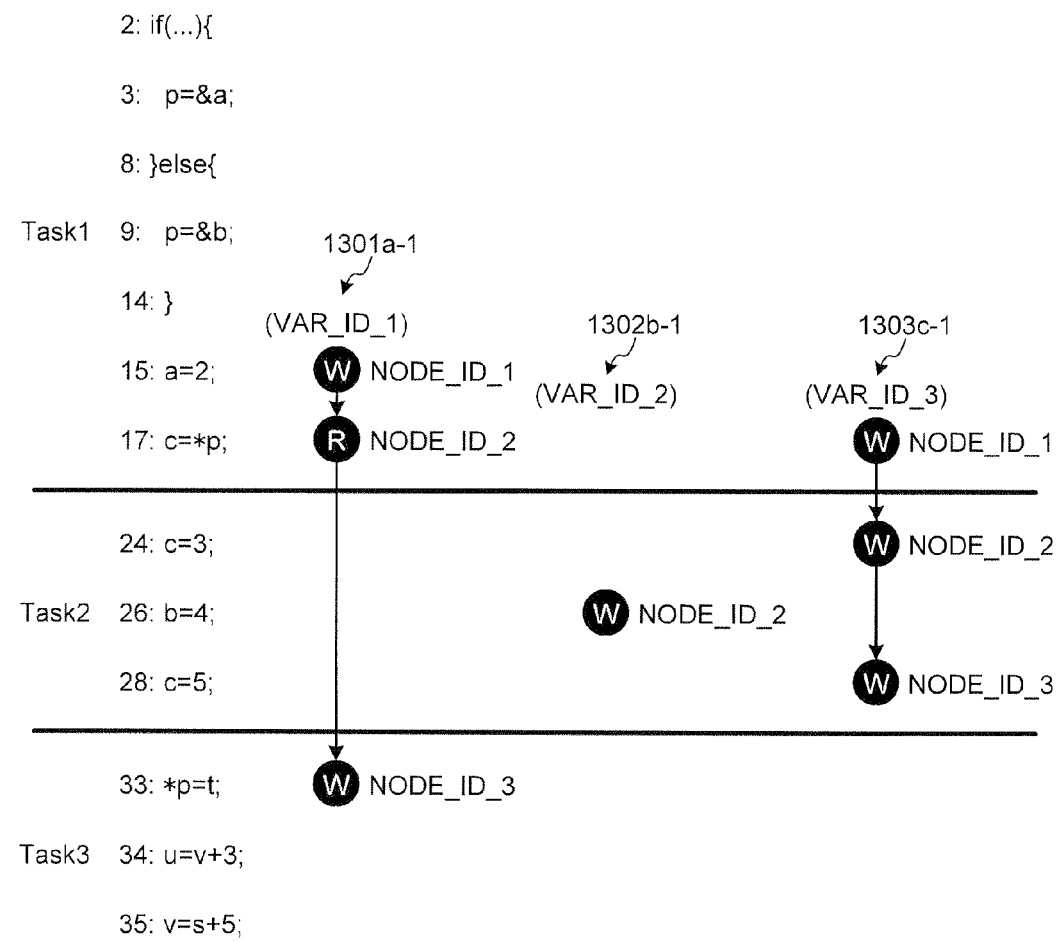
FIG. 48 is a diagram illustrating the second-type dependency relationship information that has been changed according to the third embodiment.

FIG. 48 illustrates an example of the second-type dependency relationship information 113 that has been changed due to the execution of the commands valid_node (VAR_ID_1, NODE_ID_2), valid_node(VAR_ID_1, NODE_ID_3), invalid node(VAR_ID_2, NODE_ID_1), and invalid_node(VAR_ID_2, NODE_ID_3). In comparison with the original dependency relationship information illustrated in FIG. 45, that is, in comparison with the first-type dependency relationship information 112; the nodes identified by the identifiers (VAR_ID_1, NODE_ID_2) and (VAR_ID_1, NODE_ID_3) are changed to reliable access nodes (dependency graph 1301*a*-1). Moreover, it can be seen that the nodes identified by the identifiers (VAR_ID_2, NODE_ID_1) and (VAR_ID_2, NODE_ID_3) are deleted, and the edge connected to the identifier (VAR_ID_2, NODE_ID_2) is deleted (dependency graph 1302*b*-1).

Figure 49:
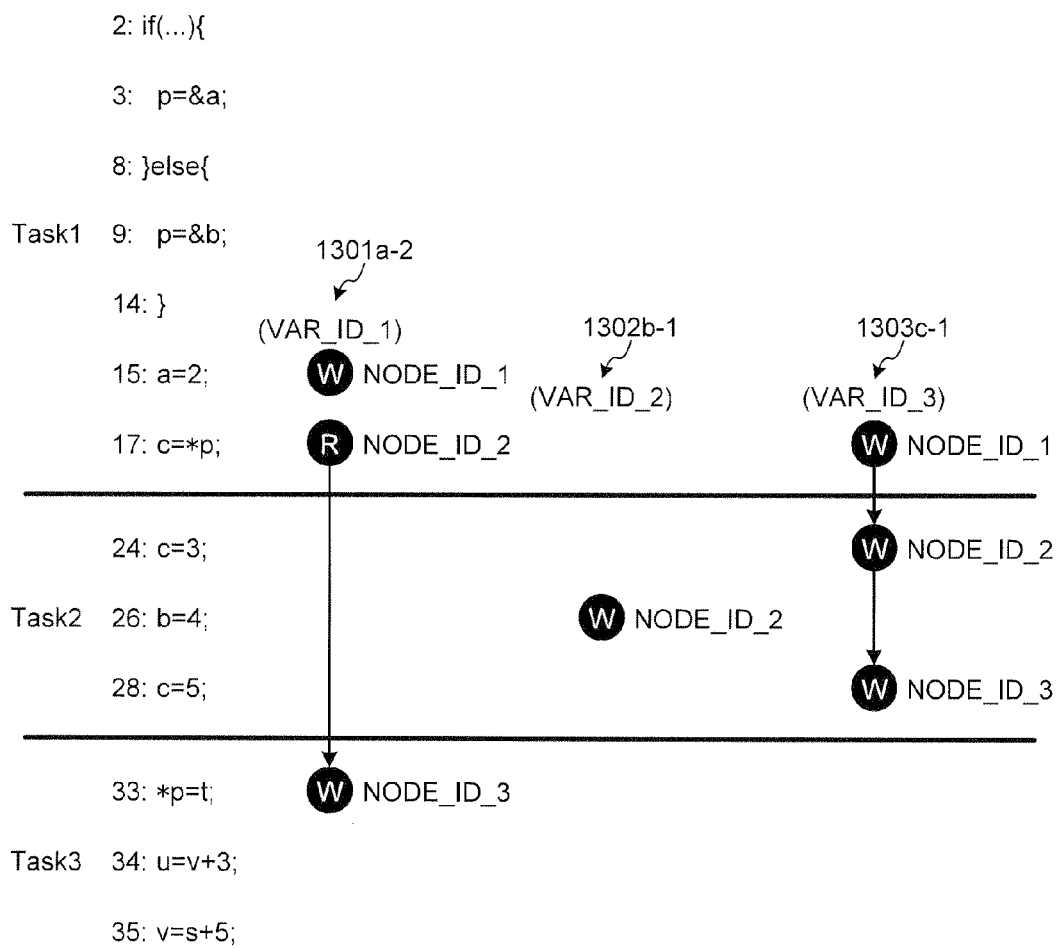
FIG. 49 is a diagram illustrating the second-type dependency relationship information that has been changed according to the third embodiment.

(3) The task Task1 continues with the execution and, after setting the value "2" in the direct access expression "a" written in the 15-th line, executes the command post_sync (VAR_ID_1, NODE_ID_1) written in the 16-th line. Since the target node (VAR_ID_1, NODE_ID_1) is present, the edge starting from that node (VAR_ID_1, NODE_ID_1) is deleted. FIG. 49 illustrates an example of the second-type dependency relationship information 113 after deleting that edge. In comparison with FIG. 48, it can be seen that the edge starting from the node (VAR_ID_1, NODE_ID_1) and leading to the node (VAR_ID_1, NODE_ID_2) is deleted (dependency graph 1301*a*-2).

(4) The task Task1 continues with the execution and sets the value of the indirect access expression "*p", that is, the value "2" of the data "a" in the data "c" written in the 17-th line. Subsequently, with respect to the node related to the indirect access expression "*p", the command post_sync (VAR_ID_3, NODE_ID_1) written in the 18-th line and the command post_sync(VAR_ID_1, NODE_ID_2) written in the 19-th line are executed. Since the target nodes (VAR_ID_3, NODE_ID_1) and (VAR_ID_1, NODE_ID_2) are present, the edges starting from those nodes are deleted. FIG. 50 is an example of the second-type dependency relationship information 113 after deleting those edges. In comparison with FIG. 49, it can be seen that the edge starting from the node (VAR_ID_3, NODE_ID_1) and leading to the node (VAR_ID_3, NODE_ID_2) as well as the edge starting from the node (VAR_ID_1, NODE_ID_2) and leading to the node (VAR_ID_1, NODE_ID_3) is deleted (dependency graph 1303*c*-1, dependency graph 1301*a*-3).

(5) The task Task1 continues with the execution, and executes the command post_sync(VAR_ID_2, NODE_ID_1) written in the 20-th line. In this case, since the target node (VAR_ID_2, NODE_ID_1) has already been deleted, no operation is performed in actuality.

(6) Meanwhile, the task Task2, which is performing polling in response to the command wait_sync(VAR_ID_3, NODE_ID_2), refers to the second-type dependency relationship information 113 illustrated in FIG. 50 and detects that the edge leading to the target node (VAR_ID_3, NODE_ID_2) has been deleted. Hence, the task Task2 starts the execution.

(7) In an identical manner, the task Task3, which is performing polling in response to the command wait_sync (VAR_ID_1, NODE_ID_3), refers to the second-type dependency relationship information 113 illustrated in FIG. 50 and detects that the edge leading to the target node (VAR_ID_1, NODE_ID_3) has been deleted. Thus, the task Taks3 also starts the execution.

(8) The task Task3 executes the command wait_sync (VAR_ID_2, NODE_ID_3) written in the 32-nd line. However, since the edge leading to the target node (VAR_ID_2, NODE_ID_3) has already been deleted, no operation is performed. Subsequently, according to the code written from the 33-rd line to the 35-th line, the task Task3 sets the value of the data "t" in the data accessed by the indirect access expression "*p" and sets a value obtained by adding the value of a direct access expression "v" and the value "3" in a direct access expression "u". Moreover, in the value of the direct access expression "v", the task Task3 sets a value obtained by adding the value of a direct access expression "s" and the value "5".

(9) The task Task2 sets the value "3" in the direct access expression "c" written in the 24-th line and executes the command wait_sync(VAR_ID_2, NODE_ID_2) written in the 25-th line. However, as illustrated in FIG. 50, since the edge leading to the target node (VAR_ID_2, NODE_ID_2) does not exist, the task Task2 continues with the execution.

(10) Subsequently, the task Task2 sets the value "4" in the direct access expression "b" written in the 26-th line and executes the command post_sync(VAR_ID_2, NODEID2). However, as illustrated in FIG. 50, since the edge leading to the target node (VAR_ID_2, NODE_ID_2) does not exist, no operation is performed in actuality. The task Task2 sets the value "5" in the direct access expression "c".

Explained below with reference to FIG. 51 is an execution image in chronological order when the if statement yields "false".

(1) Each of the task Task', the task Task2, and the task Task3 starts the execution. The task Task1 can start the operations. The task Task2 executes the command wait_sync (VAR_ID_3, NODE_ID_2). Herein, as illustrated in FIG. 45, since there exists an edge starting from the node specified in the argument, the task Task2 falls into the synchronization waiting mode. The task Task3 executes the command wait_sync(VAR_ID_1, NODE_ID_3). In that case too, since the node specified in the argument is present, it is checked whether there exists an edge leading to that node. Since such an edge exists, the task Task3 also falls into the synchronization waiting mode. The tasks Task2 and Task3, which cannot start operations while in the synchronization waiting mode, perform polling and repeatedly check the respective conditions.

(2) The task Task1 continues with the processing of the computer program and finishes processing of the if statement. In this example, it is assumed that the if statement yields "false". There, the task Task1 executes the commands valid_node(VAR_ID_2, NODE_ID_1) and valid_node (VAR_ID_2, NODE_ID_3) written in the 10-th and 11-th lines, respectively, and updates the target nodes to reliable access nodes in the second-type dependency relationship information 113. Moreover, the task Task1 executes the commands invalid_node(VAR_ID_1, NODE_ID_2) and invalid_node(VAR_ID_1, NODE_ID_3) written in the 12-th and 13-th lines, respectively, and deletes not only the target nodes but also the edges linked to those nodes. Subsequently, the task Task1 continues with the execution.

Figure 52:
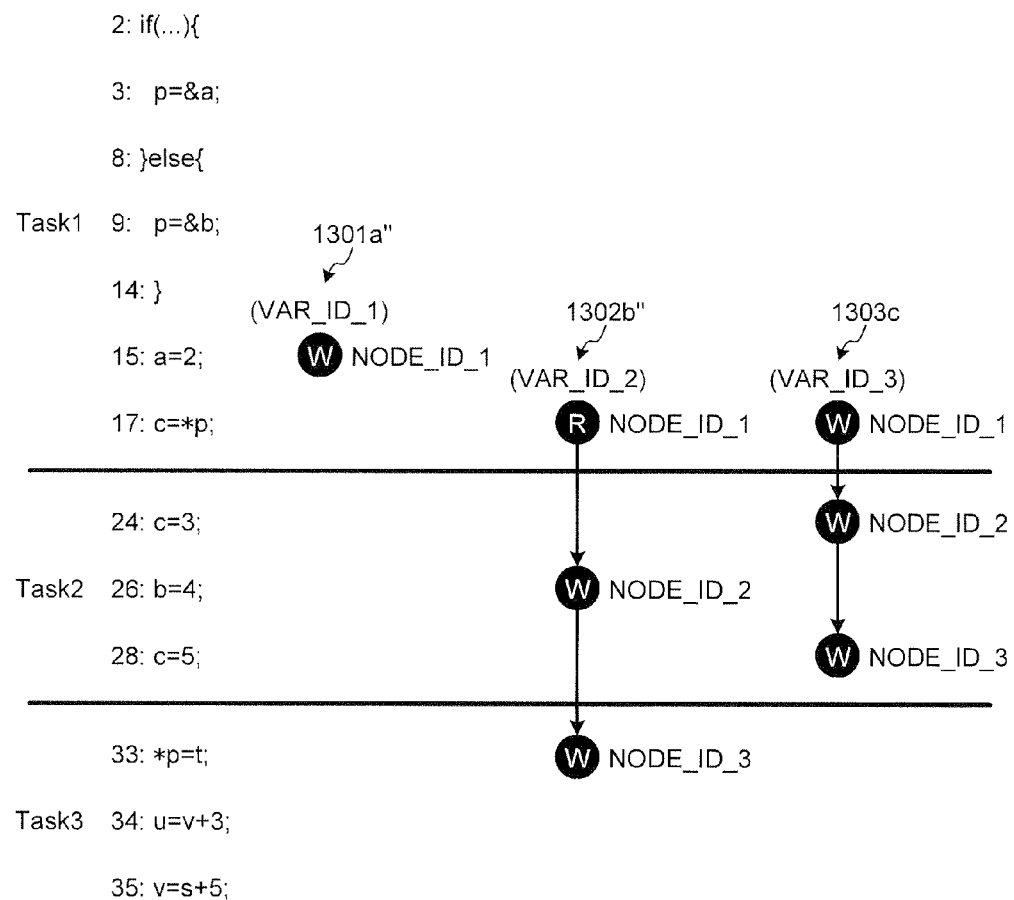
FIG. 52 is a diagram illustrating the second-type dependency relationship information that has been changed according to the third embodiment.

FIG. 52 illustrates an example of the second-type dependency relationship information 113 that has been changed due to the execution of the commands valid_node (VAR_ID_2, NODE_ID_1), valid_node(VAR_ID_2, NODE_ID_3), invalid node(VAR_ID_1, NODE_ID_2), and invalid_node(VAR_ID_1, NODE_ID_3). In comparison with the original dependency relationship information illustrated in FIG. 45, that is, in comparison with the first-type dependency relationship information 112; the nodes identified by the identifiers (VAR_ID_2, NODE_ID_1) and (VAR_ID_2, NODE_ID_3) are changed to reliable access nodes (dependency graph 1302b"). Moreover, it can be seen that the nodes identified by the identifiers (VAR_ID_1, NODE_ID_2) and (VAR_ID_1, NODE_ID_3) are deleted (dependency graph 1301a").

(3) Meanwhile, the task Task3, which is performing polling in response to the command wait_sync(VAR_ID_1, NODE_ID_3), refers to the second-type dependency relationship information 113 illustrated in FIG. 52 and confirms that no unreliable task-border edge exists related to the indirect access expression "*p" of the data "a". Hence, the task Task3 comes out of polling and starts operations.

(4) The task Task3 executes the command wait_sync (VAR_ID_2, NODE_ID_3) written in the 32-nd line. Since the node (VAR_ID_2, NODE_ID_3) that is specified in the argument is present, it is checked whether there exists an edge leading to that node. Since such an edge exists, the task Task3 falls in the synchronization waiting mode.

(5) The task Task1 sets the value "2" in the direct access expression "a" written in the 15-th line and executes the command post_sync(VAR_ID_1, NODE_ID_1) written in the 16-th line. However, since the target node (VAR_ID_1, NODE_ID_1) has already been deleted, no operation is performed.

Figure 53:
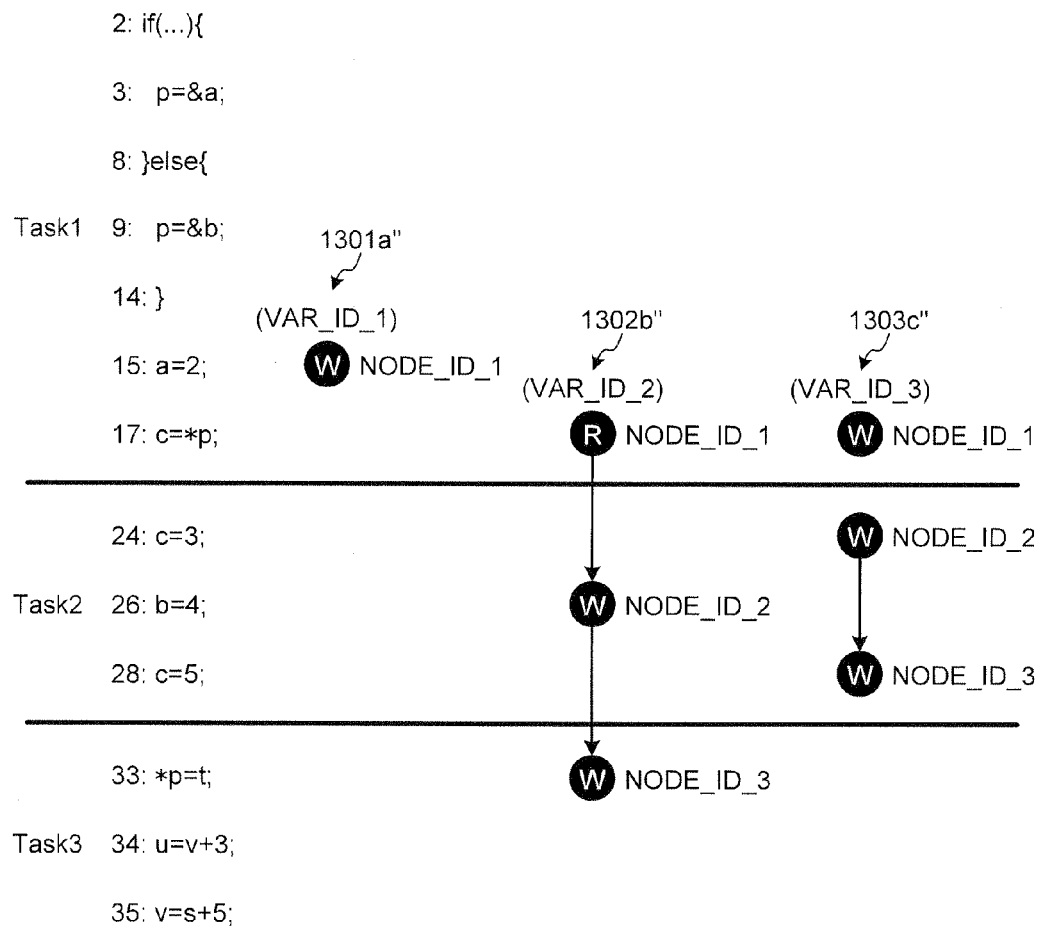
FIG. 53 is a diagram illustrating the second-type dependency relationship information that has been changed according to the third embodiment.

(6) In the data "c" written in the 17-th line, the task Task1 sets the value of the indirect access expression "*p", that is, the value of the data "b". Subsequently, the task Task1 executes the command post_sync(VAR_ID_3, NODE_ID_1) written in the 18-th line. Since the target node (VAR_ID_3, NODE_ID_1) is present, the task Task1 deletes the edge starting from that node (VAR_ID_3, NODE_ID_1). FIG. 53 illustrates an example of the second-type dependency relationship information 113 after deleting that edge. In comparison with FIG. 52, it can be seen that the edge linking the node (VAR_ID_3, NODE_ID_1) to the node (VAR_ID_3, NODE_ID_2) has been deleted (dependency graph 1303c").

(7) Meanwhile, the task Task2, which is performing polling in response to the command wait_sync(VAR_ID_3, NODE_ID_2), refers to the second-type dependency relationship information 113 illustrated in FIG. 53 and detects that the edge leading to the target node (VAR_ID_3, NODE_ID_2) has been deleted. Hence, the task Task2 starts the execution.

(8) The task Task1 executes the command post_sync (VAR_ID_1, NODE_ID_2) written in the 19-th line. However, since the target node (VAR_ID_1, NODE_ID_2) has already been deleted, no operation is performed.

Figure 54:
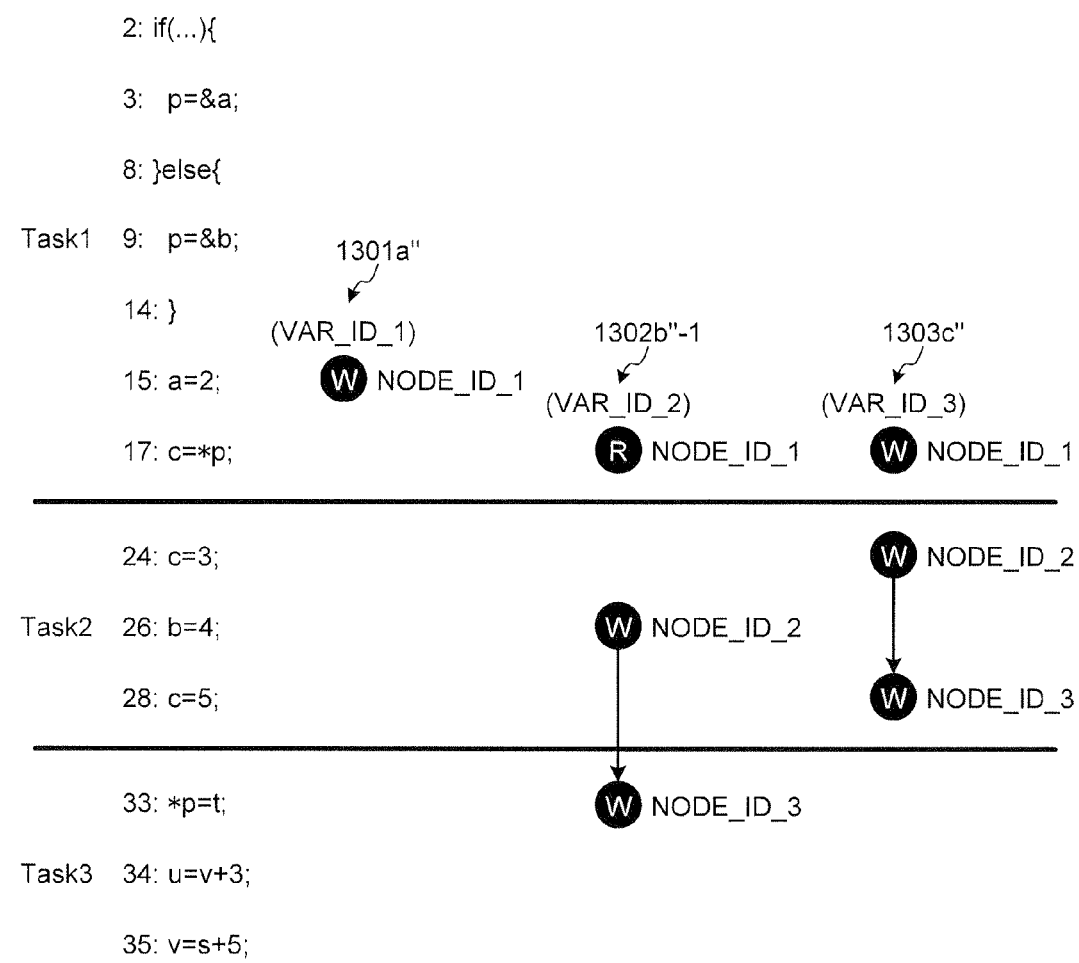
FIG. 54 is a diagram illustrating the second-type dependency relationship information that has been changed according to the third embodiment.

(9) The task Task1 executes the command post_sync (VAR_ID_2, NODE_ID_1) written in the 20-th line. Since the target node (VAR_ID_2, NODE_ID_1) is present, the task Task1 deletes the edge starting from that node (VAR_ID_2, NODE_ID_1). FIG. 54 illustrates an example of the second-type dependency relationship information 113 after deleting that edge. In comparison with FIG. 53, it can be seen that the edge linking the node (VAR_ID_2, NODE_ID_1) to the node (VAR_ID_2, NODE_ID_2) has been deleted (dependency graph 1302b"-1. The task Task1 ends the execution.

(10) The task Task2 sets the value "3" in the direct access expression "c" written in the 24-th line and executes the command wait_sync(VAR_ID_2, NODE_ID_2) written in the 25-th line. Since the edge leading to the target node (VAR_ID_2, NODE_ID_2) does not exist, the task Task2 continues with the execution.

Figure 55:
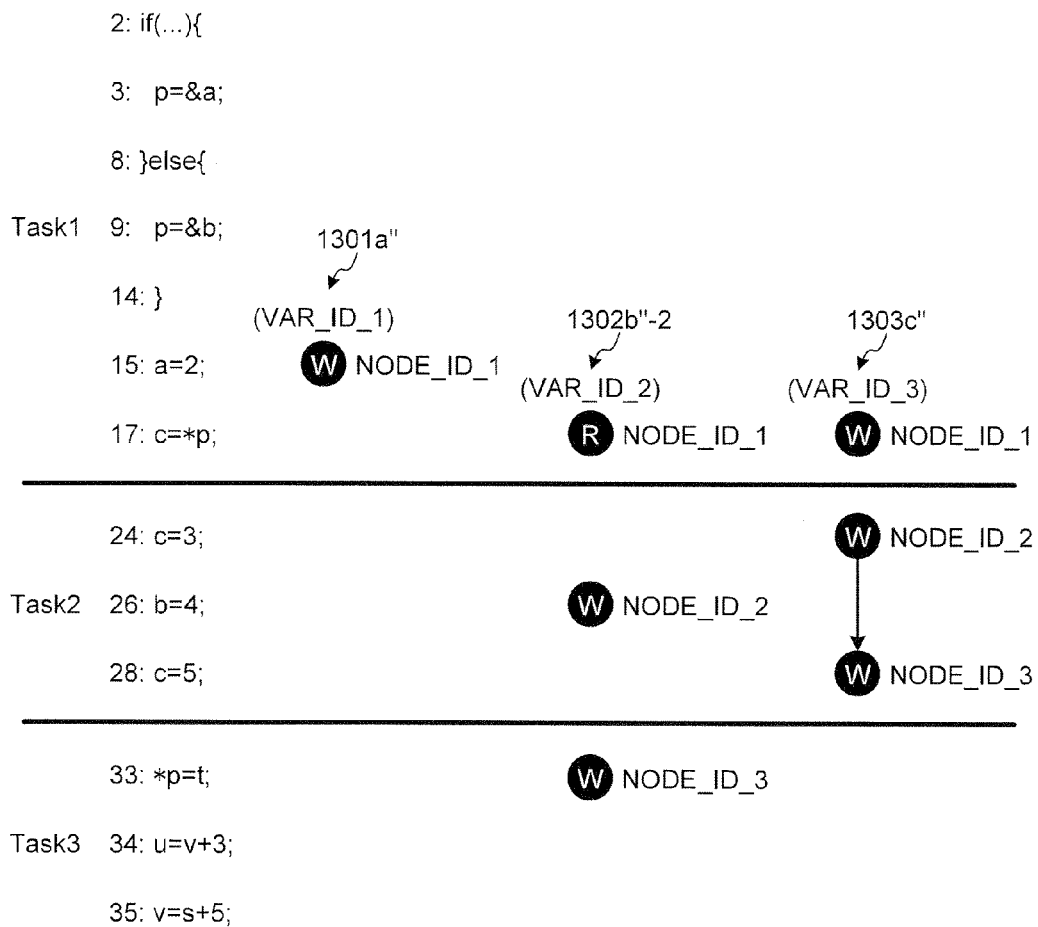
FIG. 55 is a diagram illustrating the second-type dependency relationship information that has been changed according to the third embodiment.

(11) The task Task2 sets the value "4" in the direct access expression "b" written in the 26-th line and executes the command post_sync(VAR_ID_2, NODE_ID_2) written in the 27-th line. Since the target node (VAR_ID_2, NODE_ID_2) is present, the task Task2 deletes the edge starting from the node (VAR_ID_2, NODE_ID_2). FIG. 55 is an example of the second-type dependency relationship information 113 after deleting that edge. In comparison with FIG. 54, it can be seen that the edge linking the node (VAR_ID_2, NODE_ID_2) to the node (VAR_ID_2, NODE_ID_3) has been deleted (dependency graph 1302b"-2). The task Task2 sets the value "5" in the direct access expression "c" written in the 28-th line and ends the execution.

(12) Meanwhile, the task Task3, which is performing polling in response to the command wait_sync(VAR_ID_2, NODE_ID_3), refers to the second-type dependency relationship information 113 illustrated in FIG. 55 and detects that the edge leading to the target node (VAR_ID_2, NODE_ID_3) has been deleted. Hence, the task Task3 starts the execution. Subsequently, according to the code written from the 33-rd line to the 35-th line, the task Task3 sets the value of the data "t" in the data accessed by the indirect access expression "*p" and sets a value obtained by adding the value of the direct access expression "v" and the value "3" in the direct access expression "u". Moreover, in the value of the direct access expression "v", the task Task3 sets a value obtained by adding the value of the direct access expression "s" and the value "5".

In this way, according to the third embodiment, the runtime library unit 1221 modifies the parallel execution status of the tasks in accordance with the execution result of the parallel program 116". As far as the execution image illustrated in FIG. 47 is concerned, the unreliable access nodes are updated during the execution. Hence, it becomes possible to perform a greater number of parallel executions as compared to the execution image illustrated in FIG. 51. Meanwhile, although not explained in this example, depending on the parallel program, it is necessary to insert synchronizations also with respect to the inter-task dependency in the dynamic data that is used in deciding the access destinations of indirect access expressions.

According to the method explained in the third embodiment, the runtime library unit 1221 refers to the dependency relationship information of the parallel program 116"; and, depending on the reference result, can control the parallel execution status. Moreover, by updating the dependency relationship on the access-by-access basis of data, the parallel execution management can be performed at a granular level.

The configuration of the parallelization system 1230 according to the third embodiment is not limited to the configuration illustrated in FIG. 37. Rather, there are various other configurations that can be implemented. For example, the code converting unit 1220 can be partially or entirely incorporated in the runtime library unit 1221.

Moreover, regarding the program code 111", the task border information 110", the input unit 101, the analyzing unit 102, and the first-type dependency relationship information 112, as well as all of the above-mentioned information and the information generated and used by the components; a number of variations are possible in a similar manner as already described in the first embodiment.

Besides, regarding the method of transferring the first-type dependency relationship information 112 between the code converting unit 1220 and the runtime library unit 1221, various methods can be implemented other than transferring the first-type dependency relationship information 112 using the first-type-dependency-relationship-information file 1202.

For example, to the code converting unit 1220 can be appended a binary converting unit that converts the parallel program 116" into a binary code, and the first-type dependency relationship information 112 can be embedded in the binary code of the parallel program 116". Moreover, even in the case of transferring the first-type dependency relationship information 112 in a file, various methods such as using a normal text file or expressing the information in the binary form are possible.

Furthermore, regarding the insertion of the interface 1210 in the parallel program 116", various methods can be implemented. Moreover, regarding the functions provided in the runtime library unit 1221 or regarding the interfaces (APIs), a number of variations are possible. For example, in the third embodiment, the operation for updating the second-type dependency relationship information 113 or dissolving synchronizations is carried out by inserting an API in the parallel program 116". However, alternatively, a program code written to perform those operations can be directly inserted in the parallel program 116". Besides, as far as the insertion of APIs for achieving synchronization is concerned, it is not the only option to insert an API on a variable-by-variable basis. Rather, various methods of insertion can be implemented. For example, only the requisite minimum APIs can be inserted so as to satisfy the dependency relationship between threads. Moreover, the two APIs corresponding to the commands valid_node( ) and invalid_node( ) can be combined into a single API. Similarly, for example, the same API that is inserted in succession in the fourth and fifth lines illustrated in FIG. 44 can also be combined into a single API.

Meanwhile, the entire system or the individual functional blocks constituting the system can be implemented using hardware, using software, or using a combination of hardware and software.

As described above, in contrast to the case when the task border information is not referred to and when the dependency existence information 115 is updated regarding all unreliable access nodes including those unreliable access nodes which do not exert any influence on the task borders; according to the third embodiment, the dependency existence information is updated regarding only those unreliable access nodes which are linked to the task border edges. For that reason, it becomes possible to curb updating overhead at runtime, thereby enabling achieving reduction in the runtime overhead. Besides, since the dependency relationship information is updated by referring to the latest information during the execution and since the analysis is performed by referring to the updated dependency relationship information, it becomes possible to perform parallelization that is determined to be the most appropriate at that point of time during the execution.

Fourth Embodiment

In a fourth embodiment, while the sequential program is running, a runtime library is configured to change the dependency relationship information that indicates the dependency relationship of data accesses. That makes it possible to perform detailed analysis of reliable dependency relationship.

Figure 56:
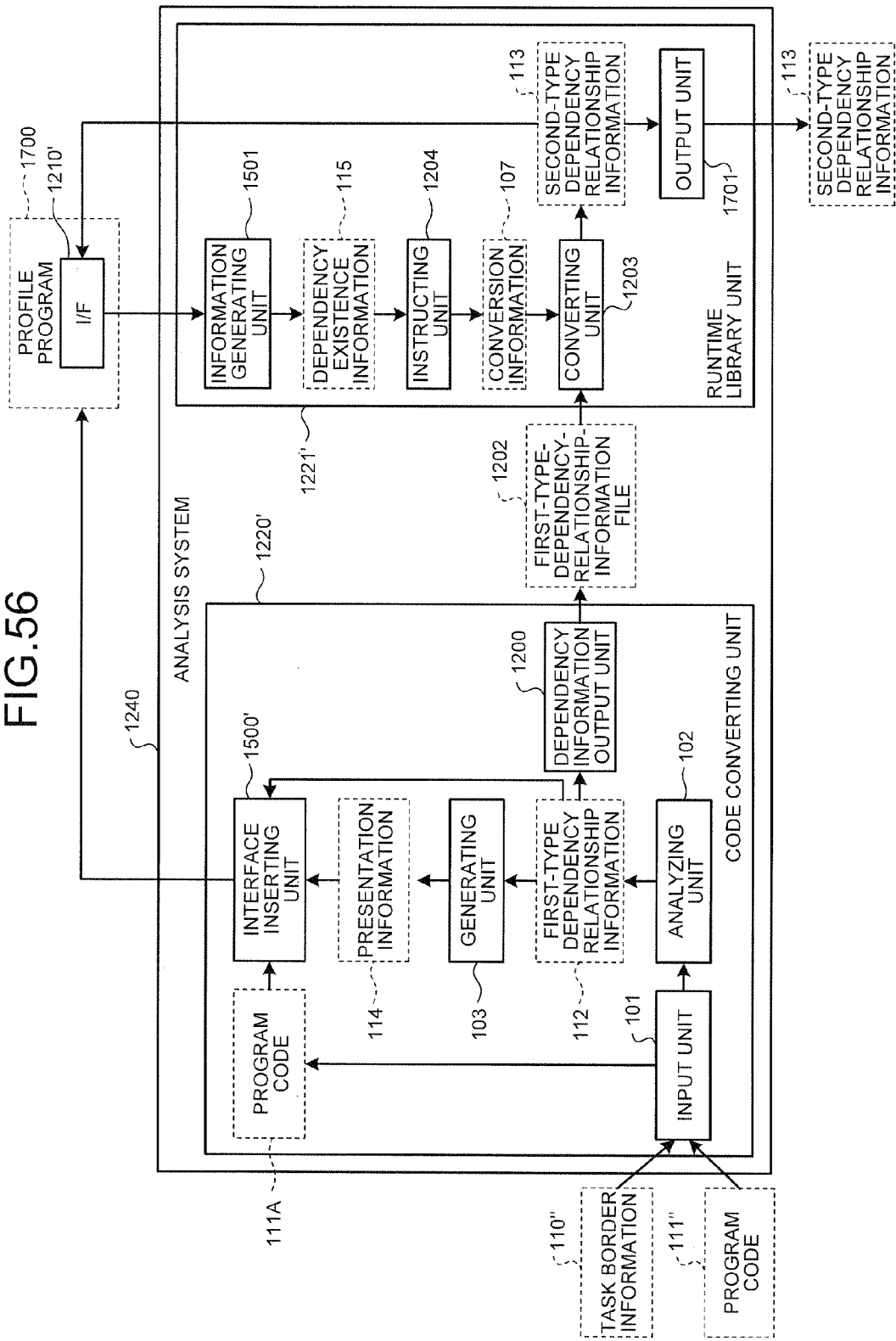
FIG. 56 is a functional block diagram of an analysis system according to a fourth embodiment.

FIG. 56 illustrates an exemplary configuration of an analysis system 1240 functioning as an information processing apparatus according to the fourth embodiment. In FIG. 56, the common constituent elements with FIG. 37 are referred to by the same reference numerals, and the detailed explanation thereof is not repeated.

Explained below in a schematic manner are the differences between the analysis system 1240 according to the fourth embodiment and the parallelization system 1230 according to the third embodiment. In the parallelization system 1230 according to the third embodiment, the code converting unit 1220 outputs the parallel program 116". In contrast, in the analysis system 1240 according to the fourth embodiment, a code converting unit 1220' outputs a program code referred to as a profile program 1700. Moreover, in the parallelization system 1230 according to the third embodiment, the second-type dependency relationship information 113 output by the runtime library unit 1221 is input to the interface 1210 in the parallel program 116". In contrast, in the analysis system 1240 according to the fourth embodiment, a runtime library unit 1221' outputs the second-type dependency relationship information 113 to the outside and does not include it to the profile program 1700.

More specifically, in the analysis system 1240 according to the fourth embodiment, an interface inserting unit 1500' in the code converting unit 1220' receives a program code 111A from the input unit 101. The interface inserting unit 1500' generates an interface 1210' by referring to the program code 111A and generates the profile program 1700 by inserting the interface 1210' in the program code 111A. Herein, the interface 1210' in the profile program 1700 does not receive the second-type dependency relationship information 113.

The runtime library unit 1221' includes an output unit 1701 for outputting the second-type dependency relationship information 113 to the outside. Thus, the output unit 1701 outputs the second-type dependency relationship information 113, which is input thereto from the converting unit 1203, to the outside of the runtime library unit 1221' (i.e., to the outside of the analysis system 1240). Meanwhile, there is no particular restriction on the data format of the second-type dependency relationship information 113 that is output. That is, the second-type dependency relationship information 113 can be in any of the various data formats such the text data format, the binary data format, the image data format, or the XML format.

In an identical manner to the interface inserting unit 1500 according to the third embodiment, the interface inserting unit 1500' analyzes the presentation information 114 and the program code 111A, and generates relationship information that holds a dependency-existence-information updating interface in a corresponding manner with monitoring position information indicating the positions for inserting the dependency-existence-information updating interface.

FIG. 57 illustrates an example of relationship information 1602' that is generated by the interface inserting unit 1500' according to the fourth embodiment. The relationship information 1602' contains monitoring position information indicating the positions for inserting the command valid_node( ) in the program code 111A and contains arguments to be assigned to those commands. An argument contains identifiers for identifying the node to which the corresponding command points to. In an identical manner to the third embodiment, the command valid_node( ) generates conversion information that is used in converting the unreliable access nodes specified in the arguments during the execution into reliable access nodes. However, the fourth embodiment differs from the third embodiment in the fact that the relationship information 1602' does not contain the command invalid_node( ) that generates conversion information used in deleting the nodes specified in the arguments. Thus, in the fourth embodiment, the command invalid_node( ) is not executed. That is because, in the fourth embodiment, the object is to collect the dependency relationship information that has been generated in a reliable manner.

The interface inserting unit 1500' generates the profile program 1700 by inserting the interface 1210', which is generated by referring to the relationship information 1602', into the program code 111A that is a sequential program. FIG. 58 illustrates an example of the program code of the profile program 1700 generated in the abovementioned manner.

The example in FIG. 58 is for the profile program 1700 generated by inserting the interface 1210' in the program code 111" illustrated in FIG. 39. In the profile program 1700 illustrated in FIG. 58, a task border 1800 is defined between the 11-th line and the 12-th line, and a task border 1801 is defined between the 14-th line and the 15-th line. The code from the first line to the 11-th line is referred to as the task Task1, the code from the 12-th line to the 14-th line is referred to as the task Task2, and the code from the 15-th line to the 17-th line is referred to as the task Task3.

As illustrated in FIG. 58, the profile program 1700 is generated in the following manner. According to the relationship information 1602' illustrated in FIG. 57, at the position of the code "p=&a, the commands valid_node(VAR_ID_1, NODE_ID_2) and valid_node(VAR_ID_1, NODE_ID_3) are inserted as the interface 1210'. Similarly, at the position of the code "p=&b", the commands valid_node(VAR_ID_2, NODE_ID_1) and valid_node(VAR_ID_2, NODE_ID_3) are inserted as the interface 1210'.

Meanwhile, in the fourth embodiment, although the explanation is given for the example of inserting an interface for monitoring only the substitution in the pointer variable "p", it is not the only possible case. Alternatively, it is also possible to monitor the access to the other pointer variables "p". For example, it is also possible to monitor the access to the pointer variable "p" written as "c=*p" in the 11-th line in FIG. 58.

Figure 59:
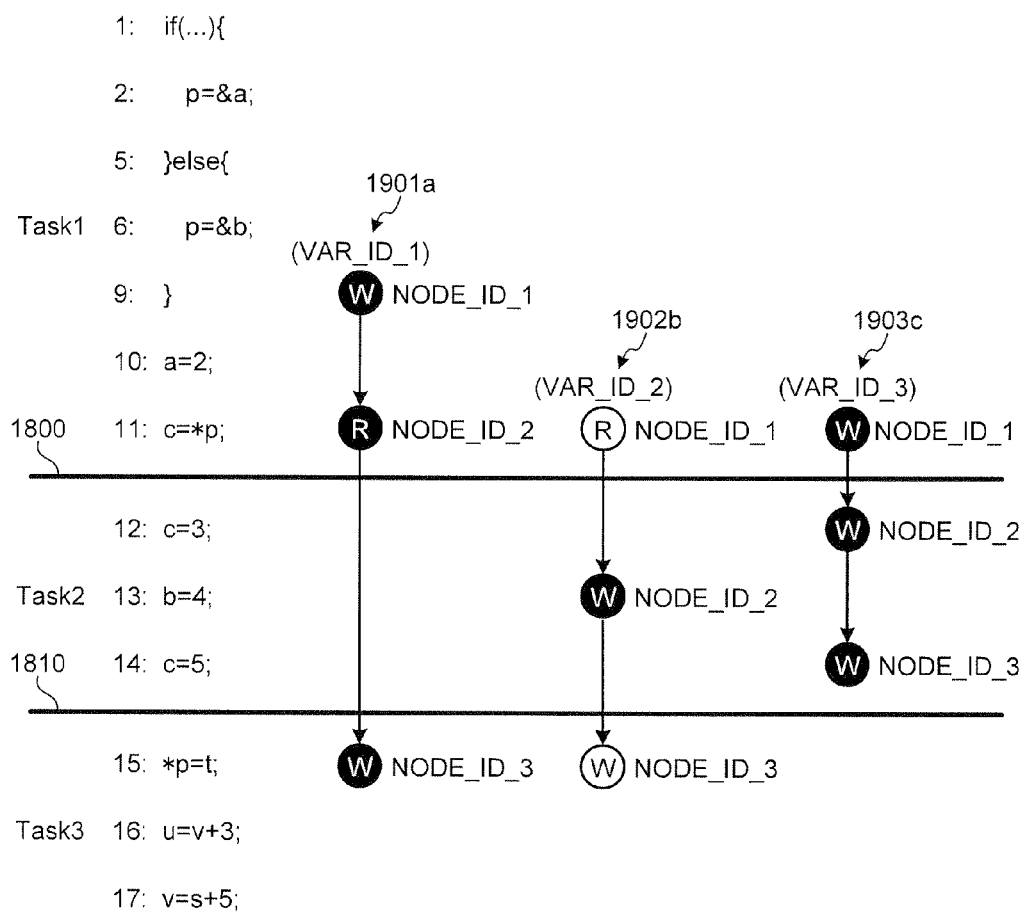
FIG. 59 is a diagram illustrating an example of the second-type dependency relationship information according to the fourth embodiment.

When the profile program 1700 has the program code illustrated in FIG. 58, the first-type dependency relationship information 112 that is not yet changed due to the execution of the profile program 1700 is explained above with reference to FIG. 41. FIG. 59 illustrates an example of the second-type dependency relationship information 113 that is output as a result of executing the profile program 1700. The dependency relationship is analyzed regarding each of the data "a", the data "b", and the data "c" in the first-type dependency relationship information 112; and dependency graphs 1901a, 1902b, and 1903c, respectively, are obtained. Meanwhile, FIG. 59 illustrates an example in which the if statement that is written in the profile program 1700 illustrated in FIG. 58 yields "true".

In the profile program 1700 illustrated in FIG. 58, the commands valid_node(VAR_ID_1, NODE_ID_2) and valid_node(VAR_ID_1, NODE_ID_3) that constitute the interface 1210' are executed, and the unreliable access nodes identified by the identifiers (VAR_ID_1, NODE_ID_2) and (VAR_ID_1, NODE_ID_3) are changed to reliable access nodes. Meanwhile, if a node specified in an argument is already changed to a reliable access node, no operation is performed in response to the command valid_node( ).

In the third embodiment described earlier, the interface inserting unit 1500 analyzes the parallel program 116A for generating and inserting the relationship information. Alternatively, as described in the fourth embodiment, a sequential program can be configured to analyze the program code for generating and analyzing the relationship information.

As described above, in contrast to the case when the task border information is not referred to and when the dependency existence information 115 is updated regarding all unreliable access nodes including those unreliable access nodes which do not exert any influence on the task borders; according to the fourth embodiment, the dependency existence information is updated regarding only those unreliable access nodes which are linked to the task border edges. For that reason, it becomes possible to curb updating overhead at runtime, thereby enabling achieving reduction in the runtime overhead.

If the computer program is optimized by referring to the dependency relationship information in which the information during the execution is reflected, it becomes possible to generate a computer program having superior performance. For example, as the first-type dependency relationship information 112 of the parallelization apparatus 10 according to the first embodiment, it is possible to use the second-type dependency relationship information 113 that is output by the output unit 1701 in the analysis system 1240 according to the fourth embodiment. With that, the unreliable access nodes can be changed to reliable access nodes by reflecting the information during the execution, and the presentation information 114 can be reduced. Along with that, a decrease in the dependency existence information can also be expected. As a result, the first-type dependency relationship information can be converted into the second-type dependency relationship information with fewer operations.

Figure 60:
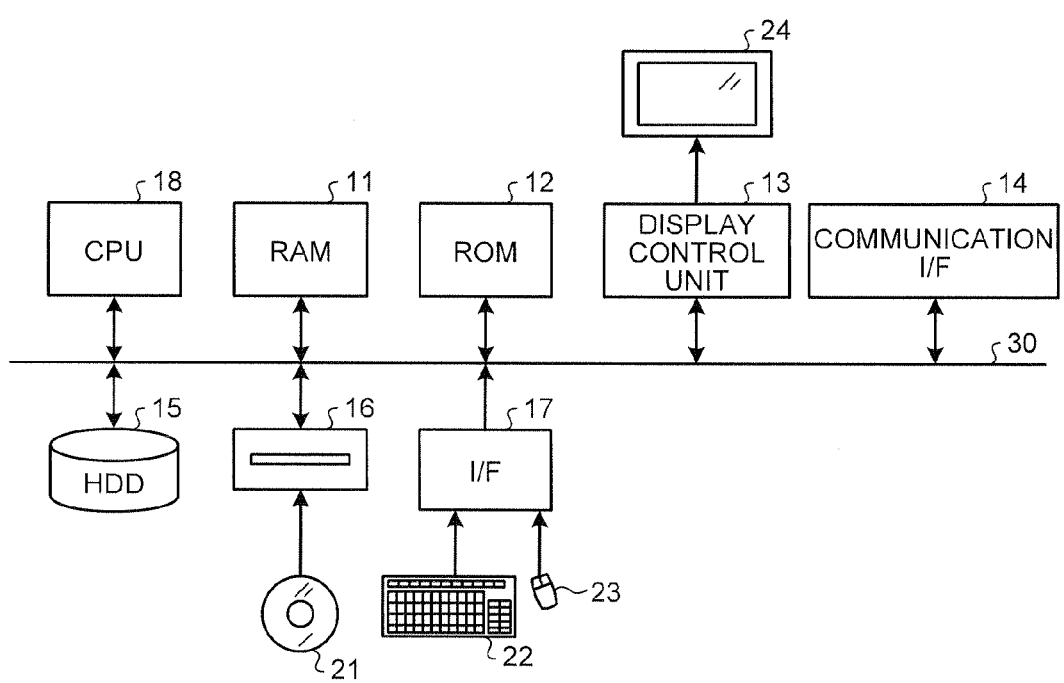
FIG. 60 is a diagram illustrating a hardware configuration that can be commonly implemented in all embodiments.

Explained below with reference to FIG. 60 is a configuration that can be commonly implemented in the first to four embodiments. As illustrated in FIG. 60, the information processing apparatus according to the first to fourth embodiments can be put to practice with, for example, a commonly-used computer.

With reference to FIG. 60; a CPU 18, a random access memory (RAM) 11, a read only memory (ROM) 12, a display control unit 13, and a communication interface (I/F) 14 are connected to a bus 30. In addition, a hard disk drive (HDD) 15, a drive device 16, and an input I/F 17 are also connected to the bus 30.

The CPU 18 follows instructions from computer programs stored in the ROM 12 or the HDD 15, and controls the entire computer while using the RAM 11 as the work memory. The display control unit 13 converts display control signals, which are generated by the CPU 18, into signals displayable on a display device 24 and outputs those signals to the display device 24.

The HDD 15 is used to store the computer programs executed by the CPU 18 or to store the data referred to by the computer programs. The drive device 16 can have a recording medium 21 attached thereto in a detachable manner and is configured to perform reading and writing of data with respect to the recording medium 21. Herein, the recording medium 21 compatible to the drive device 16 can be a disk recording medium such as a compact disk (CD), a digital versatile disk (DVD), or a flexible disk, or can be a readable/writable and nonvolatile semiconductor memory.

The input I/F 17 receives data from the outside. For example, the input I/F 17 has a predetermined interface such as a universal serial bus (USB) or an IEEE1394 interface (IEEE1394 stands for Institute of Electrical and Electronics Engineers 1394), through which data is received from an external device. To the input I/F 17 is connected an input device such as a keyboard 22 or a mouse 23. For example, in response to the display on the display device 24, the user can operate the input device and issue instructions to the computer.

The communication interface 14 communicates with an external communication network using a predetermined protocol.

Meanwhile, with the computer programs running in the CPU 18, it is possible to implement the functional blocks constituting the parallelization apparatus 10 according to the first embodiment; implement the functional blocks constituting the synchronization optimization apparatus 20 according to the second embodiment; implement the functional blocks constituting the parallelization system 1230 according to the third embodiment; and implement the functional blocks constituting the analysis system 1240 according to the fourth embodiment. The computer programs for implementing the abovementioned embodiments can be provided in the form of installable or executable files on a computer-readable recording medium such as a compact disk read only memory (CD-ROM), a flexible disk, or a DVD. Alternatively, computer programs for implementing a program parallelization system can be stored in advance in the ROM 12.

Still alternatively, the computer programs for implementing the abovementioned embodiments can be saved on a computer connected to a network and downloaded from that computer via the network. Moreover, the computer programs for implementing the program parallelization system can be made available for distribution through the network such as the Internet.

Herein, the computer programs for implementing the abovementioned embodiments contain units for implementing the functions of the abovementioned constituent elements (for example, with reference to the first embodiment, the input unit 101, the analyzing unit 102, the generating unit 103, the instructing unit 104, the converting unit 105, and the parallelizing unit 106). Regarding the actual hardware, the CPU 18 retrieves the computer programs from, for example, the HDD 15 and runs them so that the computer programs are loaded in the RAM 11. As a result, the functions of the abovementioned constituent elements are implemented in the RAM 11.

Meanwhile, in the embodiments described above, it is only a single computer in which the functional blocks of the apparatus or the system according to the embodiments are implemented. However, that is not the only possible case. Alternatively, for example, one or more of the functional blocks can be implemented in a different computer. In that case, the communication of data between the functional blocks can be performed using the recording medium 21 or via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a hardware processor;
an input unit, implemented by the processor, configured to receive task border information about task borders of a plurality of tasks and receive first-type dependency relationship information that contains N number of nodes (N is an integer equal to or greater than 1) corresponding to data accesses to a single set of data and that contains edges representing a first-type dependency relationship expressing restrictions on an order of data accesses between the nodes, at least one of the nodes having an access reliability flag that indicates whether corresponding data access is reliable or unreliable;
a generating unit, implemented by the processor, configured to, based on the first-type dependency relationship information, identify task border edges, out of edges extending over the task borders, which have an unreliable access node with unreliable data access linked to at least one end thereof, and configured to generate presentation information containing at least one of the unreliable access nodes that are linked to the task border edges;
an instructing unit, implemented by the processor, configured to receive dependency existence information, which indicates existence of a dependency relationship among the data accesses corresponding to the single set of data, and configured to, according to the dependency existence information, output, to the unreliable access node, conversion information that contains information indicating absence of data access to the unreliable access node; and
a converting unit, implemented by the processor, configured to, according to the conversion information, convert the first-type dependency relationship information into second-type dependency relationship information that contains M number of nodes (0M≤N) corresponding to the data accesses to the single set of data and contains edges representing a second dependency relationship between the nodes.

2. The apparatus according to claim 1, wherein the generating unit further identifies at least one node and, depending on whether the identified node is present on at least one of the paths leading to the task border edges from each node included in the first-type dependency relationship information, generates the presentation information for each node.

3. The apparatus according to claim 2, wherein the generating unit identifies a write node that has the least distance up to a task border in a direction of a task adjacent to the task border edge and that has the access reliability flag set to reliable.

4. The apparatus according to claim 1, wherein
the generating unit further reflects the conversion information in the presentation information, and
the instructing unit updates the conversion information depending on the dependency existence information input thereto.

5. The apparatus according to claim 1, wherein:
the input unit is configured to receive a program code and the task border information, and
the apparatus further comprises:
an analyzing unit, implemented by the processor, configured to analyze the program code and output the first-type dependency relationship information; and
a parallelizing unit, implemented by the processor, configured to generate a parallel program from the program code, wherein
when it can be regarded that at least one external input value accesses the single set of data, the analyzing unit sets the access reliability flag to reliable, but when it cannot be regarded that the external input value accesses the single set of data, the analyzing unit sets the access reliability flag to unreliable, and outputs the first-type dependency relationship information, where the external input value is written in the program code, is determined to have a possibility of accessing the single set of data, and is able to receive nodes corresponding to the data accesses, and
the parallelizing unit refers to the task borders and divides the operations of the program code in parallel execution units, and generates the parallel program by inserting synchronization with respect to the parallel execution units using the task border edges from among edges specified in the second dependency relationship information.

6. The apparatus according to claim 1, wherein
the input unit is configured to receive a program code and the task border information, and
the apparatus further comprises:
an analyzing unit, implemented by the processor, configured to analyze the program code and output the first-type dependency relationship information;
a relationship information generating unit, implemented by the processor, configured to generate relationship information by analyzing the presentation information and by analyzing an equivalent access program code that performs equivalent data accesses to the program code; and
a monitoring unit, implemented by the processor, configured to receive the relationship information and output the dependency existence information, wherein
when it can be regarded that at least one external input value accesses the single set of the data, the analyzing unit sets the access reliability flag to the reliable, but when it cannot be regarded that the external input value accesses the single set of data, the analyzing unit sets the access reliability flag to the unreliable, and outputs the first-type dependency relationship information, where the external input value is written in the program code, is determined to have a possibility of accessing the single set of data, and is able to receive a nodes corresponding to the data accesses,
the relationship information generating unit generates the relationship information that represents a correspondence relation about existence of accesses between unreliable access nodes specified in the presentation information and data accesses specified in the equivalent access program code that determine existence of accesses to the unreliable access nodes, and
during execution of the equivalent access program code, the monitoring unit monitors, based on the relationship information, the data accesses that determine existence of accesses to the unreliable access nodes, and generates the dependency existence information based on a monitoring result regarding the data accesses.

7. The apparatus according to claim 1, wherein the task border information contains information about task borders that, when the first-type dependency relationship indicated by the first-type dependency relationship information is divided into tasks, identify task border edges that are edges to each of which are linked to nodes belonging to different tasks.

8. A computer program product comprising a non-transitory computer readable storage medium including programmed instructions, wherein the instructions, when executed by a computer, cause the computer to perform:
receiving task border information about task borders of a plurality of tasks and receiving first-type dependency relationship information that contains N number of nodes (N is an integer equal to or greater than 1) corresponding to data accesses to a single set of data and that contains edges representing a first-type dependency relationship expressing restrictions on an order of data accesses between the nodes, at least one of the nodes having an access reliability flag that indicates whether corresponding data access is reliable or unreliable;
identifying, based on the first-type dependency relationship information, task border edges, out of edges extending over the task borders, which have an unreliable access node with unreliable data access linked to at least one end thereof, and generating presentation information containing at least one of the unreliable access nodes that are linked to the task border edges;
receiving dependency existence information, which indicates existence of a dependency relationship among the data accesses corresponding to the single set of data, and, according to the dependency existence information, outputting, to the unreliable access node, conversion information that contains information indicating absence of data access to the unreliable access node; and
converting, according to the conversion information, the first-type dependency relationship information into second-type dependency relationship information that contains M number of nodes ($0 \leq M \leq N$) corresponding to the data accesses to the single set of data and contains edges representing a second dependency relationship between the nodes.

* * * * *